(12) United States Patent
Kato et al.

(10) Patent No.: US 8,603,370 B2
(45) Date of Patent: *Dec. 10, 2013

(54) NEAR-INFRARED ABSORPTIVE COMPOSITION, NEAR-INFRARED ABSORPTIVE COATED MATERIAL, NEAR-INFRARED ABSORPTIVE LIQUID DISPERSION, NEAR-INFRARED ABSORPTIVE INK, PRINTED MATERIAL, AND NEAR-INFRARED ABSORPTIVE IMAGE-FORMING COMPOSITION

(75) Inventors: Shunya Kato, Minami-ashigara (JP); Kazumi Nii, Minami-ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 162 days.

This patent is subject to a terminal disclaimer.

(21) Appl. No.: 13/122,773

(22) PCT Filed: Oct. 8, 2009

(86) PCT No.: PCT/JP2009/067946
§ 371 (c)(1),
(2), (4) Date: Apr. 6, 2011

(87) PCT Pub. No.: WO2010/041769
PCT Pub. Date: Apr. 15, 2010

(65) Prior Publication Data
US 2011/0195235 A1 Aug. 11, 2011

(30) Foreign Application Priority Data

Oct. 9, 2008 (JP) .................. 2008-263220
Feb. 25, 2009 (JP) .................. 2009-042756
Mar. 31, 2009 (JP) .................. 2009-087585

(51) Int. Cl.
| | |
|---|---|
| *F21V 9/04* | (2006.01) |
| *F21V 9/06* | (2006.01) |
| *G02B 5/22* | (2006.01) |
| *G02B 5/26* | (2006.01) |
| *B41M 5/00* | (2006.01) |
| *B44C 1/17* | (2006.01) |
| *G03G 7/00* | (2006.01) |

(52) U.S. Cl.
USPC ........ 252/587; 427/256; 427/385.5; 427/487; 428/172; 428/195.1; 430/320; 524/701; 546/256; 548/110; 548/181

(58) Field of Classification Search
USPC ........... 106/311, 400, 401; 252/587; 546/256; 548/181, 110; 427/256, 385.5, 487; 428/172, 195.1; 430/320; 524/701
See application file for complete search history.

(56) References Cited

U.S. PATENT DOCUMENTS

| | | | | |
|---|---|---|---|---|
| 8,303,863 | B2 * | 11/2012 | Nii et al. ................. | 252/587 |
| 2001/0053034 | A1 | 12/2001 | Ikuhara et al. | |
| 2004/0151944 | A1 | 8/2004 | Onikubo et al. | |
| 2007/0238802 | A1 * | 10/2007 | Harada et al. ............ | 522/75 |
| 2011/0070407 | A1 * | 3/2011 | Kato et al. .............. | 428/172 |

FOREIGN PATENT DOCUMENTS

| | | |
|---|---|---|
| EP | 2 272 849 A1 | 1/2011 |
| JP | 6-248213 A | 9/1994 |
| JP | 7-164729 A | 6/1995 |
| JP | 8-143853 A | 6/1996 |
| JP | 9-003448 A | 1/1997 |
| JP | 9-263717 A | 10/1997 |
| JP | 10-060409 A | 3/1998 |
| JP | 11-109126 A | 4/1999 |
| JP | 11-231126 A | 8/1999 |
| JP | 11-279465 A | 10/1999 |
| JP | 2001-228324 A | 8/2001 |
| JP | 2002-138203 A | 5/2002 |

(Continued)

OTHER PUBLICATIONS

Georg M. Fischer, Andreas P. Ehlers, Andreas Zumbusch, and Ewald Daltrozzo, Near-Infrared Dyes and Fluorophores Based on Diketopyrrolopyrroles, Angew. Chem. Int. Ed. 2007, 46, 3750-3753. 2007 Wiley-VCH Verlag GmbH & Co. KGaA, Weinheim.*
International Search Report (PCT/ISA/210) issued on Jan. 26, 2010, by Japanese Patent Office as the International Searching Authority for International Application No. PCT/JP2009/067946.
Written Opinion (PCT/ISA/237) issued on Jan. 26, 2010, by Japanese Patent Office as the International Searching Authority for International Application No. PCT/JP2009/067946.

(Continued)

Primary Examiner — Bijan Ahvazi
(74) Attorney, Agent, or Firm — Buchanan Ingersoll & Rooney PC

(57) ABSTRACT

A near-infrared absorptive liquid dispersion, which contains a near-infrared absorptive compound represented by formula (1) that is dispersed in a form of fine particles in a dispersing medium:

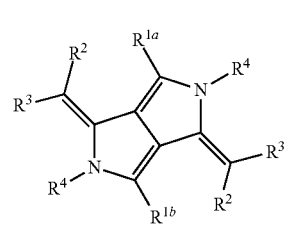

(1)

wherein $R^{1a}$ and $R^{1b}$ may be the same or different, and each independently represent an alkyl group, an aryl group, or a heteroaryl group; $R^2$ and $R^3$ each independently represent a hydrogen atom or a substituent, and at least one of $R^2$ and $R^3$ is an electron withdrawing group; $R^2$ may be bonded to $R^3$ to form a ring; and $R^4$ represents a hydrogen atom, an alkyl group, an aryl group, a heteroaryl group, a substituted boron, or a metal atom, and $R^4$ may be covalently bonded or coordinately bonded to at least one among $R^{1a}$, $R^{1b}$ and $R^3$.

28 Claims, 5 Drawing Sheets

(56) References Cited

FOREIGN PATENT DOCUMENTS

| | | | | |
|---|---|---|---|---|
| JP | 2002-146254 | * | 5/2002 | ............ C09D 11/00 |
| JP | 2002-146254 A | | 5/2002 | |
| JP | 2002-187955 A | | 7/2002 | |
| JP | 2002-309131 A | | 10/2002 | |
| JP | 2005-181966 A | | 7/2005 | |
| JP | 2006-078888 A | | 3/2006 | |
| JP | 2008-291072 A | | 12/2008 | |
| WO | WO 03/048268 A1 | | 6/2003 | |

OTHER PUBLICATIONS

Fischer et al., "Near-Infrared Dyes and Fluorophores Based on Diketopyrrolopyrroles", Angewandte Chemie, International Edition, 2007, pp. 3750-3753, vol. 46, No. 20.

"1.7.4 Lightfastness and Weatherfastness" In: W. Herbst, K. Hunger: "Industrial Organic Pigments", 1993, VCH, Weinheim, XP002677900, pp. 133-135.

Extended European Search Report dated Jul. 26, 2012, issued by the European Patent Office in corresponding European Application No. 09819298.2. (5 pages).

* cited by examiner

NEAR-INFRARED ABSORPTIVE COMPOSITION, NEAR-INFRARED ABSORPTIVE COATED MATERIAL, NEAR-INFRARED ABSORPTIVE LIQUID DISPERSION, NEAR-INFRARED ABSORPTIVE INK, PRINTED MATERIAL, AND NEAR-INFRARED ABSORPTIVE IMAGE-FORMING COMPOSITION

TECHNICAL FIELD

The present invention relates to a near-infrared absorptive liquid dispersion, a near-infrared absorptive ink prepared from the liquid dispersion, and a printed material using the same.

The present invention also relates to a near-infrared absorptive composition, and a near-infrared absorptive coated material. In particular, the present invention relates to a near-infrared absorptive composition and a near-infrared absorptive coated material which each have high visible ray transmittance besides light resistance and humidity and heat resistance.

Furthermore, the present invention relates to a near-infrared absorptive image-forming composition that is readable through near-infrared absorptive rays.

BACKGROUND ART

Near-infrared absorptive dyes are used for various purposes in wide fields. The dyes are used in, for example, infrared-cutting films for plasma display panels (PDP) or CCDs, optical filters in heat ray shield films, or photothermal conversion materials in write once optical disks (CD-R) or flash-meltable and fixable materials. Moreover, the dyes are used as information displaying materials for security inks or invisible bar code inks. This security ink gives an image that is hardly colored by rays in the visible range and shows a large absorption for rays in the near infrared range. By use of this property, the security inks are utilized to print encrypted data (such as a bar code, a two-dimensional code, or OCR characters) detectable through near infrared rays (wavelength: 700 to 1800 nm) on prepaid cards, paper moneys, vouchers, valuable instruments (securities), plastic financial cards, bankbooks, insurance policies, any other certificates, or the like, in order to prevent forgery. Alternatively, the security inks are printed in the same manner, and used for reading with OCR on the basis of detection through near infrared rays, for location identification, for preventing malfunction of instruments, or for some other purpose. The inks are used also as hidden inks, which are inconspicuous and not to damage the design of a printed material, besides a forgery-preventing ink.

For near-infrared absorptive dyes, which are used for such information-display, it is very important that the dyes are excellent in invisibility, i.e., the property that the dyes are invisible, as well as the dyes show an intense absorption for rays in the near infrared range. Furthermore, for all dyes, a high durability (fastness) is required. Near-infrared absorptive dyes high in either of invisibility or high durability are disclosed (see JP-A-8-143853 ("JP-A" means unexamined published Japanese patent application), JP-A-10-60409, JP-A-7-164729, JP-A-11-279465, JP-A-2008-291072, JP-A-2002-146254, JP-A-2006-78888); however, near-infrared absorptive dyes made invisibility and durability compatible with each other are not developed. Thus, near-infrared absorptive dyes having both of these performances have been intensely desired.

As dyes which hardly show an absorption in the wavelength range of 400 to 700 nm and are excellent in invisibility, cyanine methine dyes or J associations thereof can be mentioned. However, their long methine conjugated chain is flexible; thus, the dyes are easily isomerized so that the absorption wavelengths are changed, or the dyes are easily decomposed by heat or by reaction with oxygen or a nucleophilic agent. Accordingly, the dyes are low in fastness.

As near-infrared absorptive dyes having a rigid skeleton and a high fastness, there are vanadylphthalocyanine dyes suggested by Nippon Shokubai Co., Ltd., and quaterrylene dyes suggested by BASF AG. However, vanadylphthalocyanine dyes are insufficient in invisibility. The quaterrylene dyes have good invisibility in a state of molecular dispersion, for example, in a state of a solution of the dyes; however, when the concentration is made high, an absorption is generated for rays in the visible range by the association of the molecules so that the invisibility is lost. Thus, the way of use thereof is restricted.

As dyes that are excellent in invisibility and have an absorption for rays in the infrared range widely, there are diimmonium dyes marketed by Nippon Kayaku Co., Ltd. However, the dyes are easily reducible and are insufficient in fastness. Thus, the way for use thereof is restricted.

As described above, near-infrared absorptive dyes having both excellent invisibility and fastness have not been marketed up to date. Thus, it has been desired to develop near-infrared absorptive dyes having these performances compatibly with each other.

In the meantime, JP-A-11-231126 and JP-A-2002-138203 describe, as an example of the application of near-infrared absorptive dyes, a film having a near-infrared absorptive filtering function and produced by dissolving or dispersing an organic pigment together with a binder resin into an organic solvent, and then applying the resultant solution or dispersion onto a film.

However, this mode of use has a drawback that the environment suffers adversely largely since organic solvents are used. Additionally, facilities for the production are required to be rendered explosion-preventing facilities. Thus, very large costs are required for facility investments.

Furthermore, as given as an example in JP-A-11-109126 and JP-A-2001-228324, the following is proposed: a water-soluble dye is dissolved together with a water-soluble binder, specifically gelatin, into water, and a film is coated with the resultant solution to produce a film having a near-infrared absorptive filtering function; and the resultant film is used in a PDP.

However, in connection with the water-soluble dyes coatable onto a film without using a large amount of organic solvents, there remains a problem that the resultant film coated with the dye is low in durability and the near-infrared absorptivity, in particular, at high temperature and high humidity, and other problems. Thus, the film product has been desired to be improved.

As a near-infrared absorptive ink, known is an organic-solvent-type ink, wherein a dissolvable near-infrared absorptive dye is dissolved in an organic solvent. However, the ink is low in durability. Thus, the ink has a problem that the ink decomposes in a short term so as not to show any absorption so that the ink comes not to be recognized. JP-A-7-164729 and JP-A-6-248213 propose a method of using an acrylic binder resin to improve the durability, or a method of adding an ultraviolet absorbent. However, the methods are insuffi cient. Additionally, the methods have a problem about safety or environmental hygiene since organic solvents are used. Thus, aqueous inks have been desired.

JP-A-2002-146254, JP-A-2002-187955, JP-A-9-263717, and JP-A-2002-309131 describe examples of aqueous near-infrared absorptive-paint and -ink. However, the examples each have problems about durability or invisibility, since naphthalocyanine, diimmonium, or croconium dyes are used.

It is proposed that an infrared absorbing ink containing an inorganic ion (such as a copper, iron, or ytterbium ion) be used to form an infrared absorbing image (see JP-A-8-143853 and JP-A-10-60409). However, the ink is sufficient in the infrared absorbency of the image but is insufficient in invisibility. When the invisibility is made high, the infrared absorbency conversely becomes insufficient. Thus, when the invisible image is intermingled with a visible image, the discriminatability of the ink becomes insufficient. Furthermore, the heavy metal contained in the ink imposes a heavy load on the environment.

Furthermore, known are examples wherein an infrared absorbing ink containing a phthalocyanine dye, a dithiol compound dye, a squarylium dye, a croconium dye, or a nickel complex dye is used, to form an infrared absorbing image (see JP-A-7-164729, JP-A-11-279465, JP-A-2008-291072, and JP-A-2002-146254). A toner containing an infrared absorbent composed of a diimmonium compound is also investigated (see JP-A-2006-78888). A toner containing a near infrared absorbent can be used as an invisible toner. The toner may be used to form an invisible image, such as a code pattern as described above. However, the inks or toners disclosed in JP-A-7-164729, JP-A-11-279465, JP-A-2008-291072, JP-A-2002-146254, and JP-A-2006-78888 are still insufficient in compatibility of invisibility with durability.

SUMMARY OF INVENTION

The present invention provides a near-infrared absorptive fine-particle liquid dispersion which is high in invisibility, near-infrared absorptivity, light resistance, and storage stability; an aqueous near-infrared absorptive ink and an inkjet printing ink that are each prepared from this liquid dispersion and less cause an adverse effect on the environment; and a printed material wherein printing is made by use of any one of these inks.

The present invention also provides a near-infrared absorptive composition having a high invisibility and near-infrared absorptivity while having a sufficient light resistance and humidity-and-heat resistance and less causing an adverse effect on the environment; and a coated material containing the near-infrared absorptive composition.

The present invention further provides a near-infrared absorptive image-forming composition, which exhibits high invisibility and near-infrared absorptivity and further realizes a high durability when a print is made from the composition; an ink composition suitable for a lithographic or gravure ink and an electrophotographic toner, which are each for forming a near-infrared absorptive image and prepared from this composition; and a printed material wherein a near-infrared absorptive image is printed by use of any one of these image-forming substances.

The inventors of the present invention, having made eager investigations, have found out that by incorporating a near-infrared absorptive compound into a matrix comprised of a hydrophobic polymer (preferably, an aqueous dispersion of organic resin), it is possible to restrain the near-infrared absorptive compound from being decomposed and to improve the durability. Further, the inventors have found when the near-infrared absorptive compound is used in a state of being dispersed in a fine-particle form, the fastness can be improved. Furthermore, the inventors have found out that by conducting drying by heating at the time of preparation of a coated film containing the near-infrared absorptive composition, the fastness of the coated film can be improved. On the basis of these findings, the inventors have attained the present invention.

According to the present invention, there is provided the following means:

<1-1> A near-infrared absorptive liquid dispersion, which contains a near-infrared absorptive compound represented by formula (1) that is dispersed in a form of fine particles in a dispersing medium:

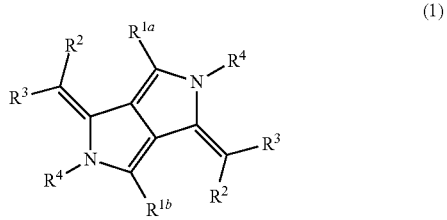

wherein $R^{1a}$ and $R^{1b}$ may be the same or different, and each independently represent an alkyl group, an aryl group, or a heteroaryl group; $R^2$ and $R^3$ each independently represent a hydrogen atom or a substituent, and at least one of $R^2$ and $R^3$ is an electron withdrawing group; $R^2$ may be bonded to $R^3$ to form a ring; and $R^4$ represents a hydrogen atom, an alkyl group, an aryl group, a heteroaryl group, a substituted boron, or a metal atom, and $R^4$ may be covalently bonded or coordinately bonded to at least one among $R^{1a}$, $R^{1b}$ and $R^3$.

<1-2> The near-infrared absorptive liquid dispersion according to item <1-1>, wherein $R^4$ in formula (1) is a substituted boron.

<1-3> The near-infrared absorptive liquid dispersion according to item <1-1> or <1-2>, wherein the dispersing medium is an aqueous solvent.

<1-4> The near-infrared absorptive liquid dispersion according to any one of items <1-1> to <1-3>, wherein the average particle diameter of the fine particles is 0.5 µm or less.

<1-5> The near-infrared absorptive liquid dispersion according to any one of items <1-1> to <1-4>, which has a maximum absorption wavelength for rays in a range of 700 nm to 1000 nm.

<1-6> The near-infrared absorptive liquid dispersion according to any one of items <1-1> to <1-5>, wherein the absorbance at 550 nm is ⅕ or less of the absorbance at the maximum wavelength.

<1-7> An aqueous ink, which contains the near-infrared absorptive liquid dispersion according to any one of items <1-1> to <1-6>.

<1-8> An aqueous ink for inkjet recording, which contains the near-infrared absorptive liquid dispersion according to any one of items <1-1> to <1-6>.

<1-9> A printed material, which has a near-infrared absorptive image printed with the aqueous ink according to item <1-7>.

<1-10> A printed material, which has a near-infrared absorptive image printed with the aqueous ink for inkjet recording according to item <1-8>.

<2-1> A near-infrared absorptive composition, at least containing a near-infrared absorptive compound represented by formula (1) and a hydrophobic polymer:

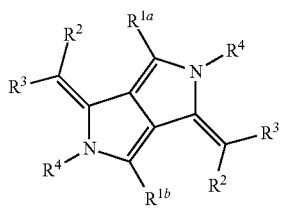
(1)

wherein $R^{1a}$ and $R^{1b}$ may be the same or different, and each independently represent an alkyl group, an aryl group, or a heteroaryl group; $R^2$ and $R^3$ each independently represent a hydrogen atom or a substituent, and at least one of $R^2$ and $R^3$ is an electron withdrawing group; $R^2$ may be bonded to $R^3$ to form a ring; and $R^4$ represents a hydrogen atom, an alkyl group, an aryl group, a heteroaryl group, a substituted boron, or a metal atom, and $R^4$ may be covalently bonded or coordinately bonded to at least one among $R^{1a}$, $R^{1b}$ and $R^3$.

<2-2> The near-infrared absorptive composition according to item <2-1>, wherein the near-infrared absorptive compound is present in a state of aqueous fine-particle dispersion.

<2-3> The near-infrared absorptive composition according to item <2-1> or <2-2>, wherein the hydrophobic polymer is an organic resin forming an aqueous fine-particle dispersion.

<2-4> The near-infrared absorptive composition according to any one of items <2-1> to <2-3>, wherein the hydrophobic polymer comprises an acrylic resin or a urethane resin.

<2-5> A near-infrared absorptive coated material, having a substrate, and a near-infrared absorptive layer formed on the substrate with the near-infrared absorptive composition according to any one of items <2-1> to <2-4>.

<2-6> The near-infrared absorptive coated material according to item <2-5>, wherein in the course of forming the near-infrared absorptive layer, drying by heating is performed.

<2-7> The near-infrared absorptive coated material according to item <2-5> or <2-6>, wherein the absorptivity of visible rays is 30% or less.

<3-1> A near-infrared absorptive image-forming composition, comprising a near-infrared absorptive compound represented by formula (1):

Formula (1)

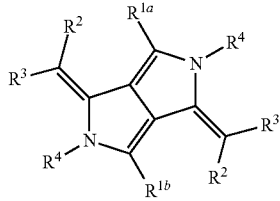

wherein $R^{1a}$ and $R^{1b}$ may be the same or different, and each independently represent an alkyl group, an aryl group, or a heteroaryl group; $R^2$ and $R^3$ each independently represent a hydrogen atom or a substituent, and at least one of $R^2$ and $R^3$ is an electron withdrawing group; $R^2$ may be bonded to $R^3$ to form a ring; and $R^4$ represents a hydrogen atom, an alkyl group, an aryl group, a heteroaryl group, a substituted boron, or a metal atom, and $R^4$ may be covalently bonded or coordinately bonded to at least one among $R^{1a}$, $R^{1b}$ and $R^3$.

<3-2> The near-infrared absorptive image-forming composition according to item <3-1>, which is substantially invisible.

<3-3> The near-infrared absorptive image-forming composition according to item <3-1> or <3-2>, wherein $R^4$ in formula (1) is a substituted boron.

<3-4> The near-infrared absorptive image-forming composition according to any one of items <3-1> to <3-3>, wherein the compound represented by formula (1) is contained in a dispersion state of fine particles of the compound.

<3-5> The near-infrared absorptive image-forming composition according to any one of items <3-1> to <3-4>, which has a maximum absorption wavelength for rays in a range of 700 nm to 1000 nm.

<3-6> An ink composition, which contains the near-infrared absorptive image-forming composition according to any one of items <3-1> to <3-5>.

<3-7> The ink composition according to item <3-6>, which further contains at least one vehicle and at least one organic solvent.

<3-8> The ink composition according to item <3-6> or <3-7>, which is a lithographic ink.

<3-9> The ink composition according to item <3-6> or <3-7>, which is a gravure ink.

<3-10> A printed material, which has a substrate on which a near-infrared absorptive image is formed with the ink composition according to any one of items <3-6> to <3-9> adhered on the substrate.

<3-11> An electrophotographic toner, comprising the near-infrared absorptive image-forming composition according to any one of items <3-1> to <3-5>.

<3-12> The electrophotographic toner according to item <3-11>, which contains at least one binder resin.

<3-13> A printed material according to electrophotographic system, which has a substrate on which a near-infrared absorptive image is formed with the electrophotographic toner according to item <3-11> or <3-12> adhered on the substrate.

Hereinafter, a first embodiment of the present invention means to include the near-infrared absorptive liquid dispersions described in the above items <1-1> to <1-6>, the aqueous ink described in the above item <1-7>, the aqueous ink for inkjet recording described in the above item <1-8>, and the printed materials described in the above items <1-9> to <1-10>.

A second embodiment of the present invention means to include the near-infrared absorptive compositions described in the above items <2-1> to <2-4>, and the near-infrared absorptive coated materials described in the above items <2-5> to <2-7>.

A third embodiment of the present invention means to include the near-infrared absorptive image-forming compositions described in the above items <3-1> to <3-5>, the ink compositions described in the above items <3-6> to <3-9>, the printed material described in the above item <3-10>, the electrophotographic toners described in the above items <3-11> to <3-12>, and the printed materials described in the above item <3-13>.

Herein, the present invention means to include all of the above first, second, and third embodiments, unless otherwise specified.

Advantageous Effects of Invention

The near-infrared absorptive liquid dispersion of the present invention has a high invisibility and near-infrared absorptivity, and a sufficient dispersion stability. Moreover, the liquid dispersion less produces an adverse effect on the environment since no organic solvent is used. Furthermore, images formed by use of an ink containing the liquid dispersion have a high invisibility and light resistance.

According to the present invention, there can be provided a near-infrared absorptive composition having a high invisibility and near-infrared absorptivity while having a sufficient light resistance and humidity-and-heat resistance and less producing an adverse effect on the environment; and a coated material containing the near-infrared absorptive composition.

In the near-infrared absorptive composition of the present invention, an aqueous dispersion of the near-infrared absorptive compound and the hydrophobic polymer is used, whereby a facility for coating an organic solvent system and any other complicated facility are not required for the coating of the composition. Additionally, the composition can be produced by use of a remarkably reduced amount of an organic solvent or no organic solvent. Thus, in the production, a load on the environment can be made smaller than in any production based on the coating of an organic solvent system.

In the near-infrared absorptive coated material of the present invention, a deterioration in the near-infrared absorptivity after the material is stored at high temperature and high humidity, or a deterioration in the near-infrared absorptivity through light can be restrained.

The near-infrared absorptive coated material of the present invention can give an optical filter excellent in durability at low costs.

The near-infrared absorptive image-forming composition of the present invention exhibits excellent effects and advantages that when a print is formed from the composition, the print does not substantially show any absorption in the visible region, exhibits near-infrared absorptivity and realizes a high durability. Moreover, about printed materials formed by use of an ink composition including this composition, which is particularly suitable for lithographic ink or gravure ink, or by use of an electrophotographic toner including this composition, the light resistance of their images is excellent. These images are outwardly inconspicuous, and can be read through near infrared rays.

Other and further features and advantages of the invention will appear more fully from the following description, appropriately referring to the accompanying drawings.

MODE FOR CARRYING OUT INVENTION

Figure 1:
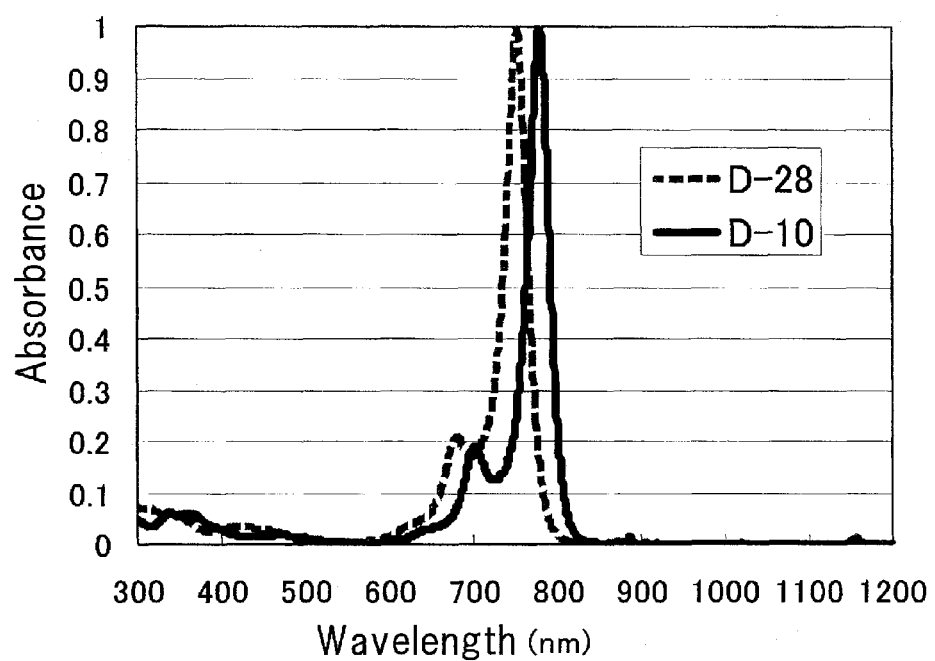
FIG. 1 is a graph showing solution absorption spectra of Exemplified compounds D-10 and D-28.

The near-infrared absorptive liquid dispersion of the present invention contains a near-infrared absorptive compound represented by formula (1) in the state that fine-particles of the compound are dispersed in a dispersing medium (in a state of fine-particle dispersion state). The liquid dispersion may appropriately contain one or more other materials. The dispersing medium is preferably an aqueous solvent.

By dispersing the near-infrared absorptive compound by use of the dispersing medium (preferably, by conducting aqueous dispersion), a near-infrared absorptive liquid dispersion excellent in dispersion stability and high in invisibility and fastness can be prepared.

The near-infrared absorptive composition of the present invention contains at least a near-infrared absorptive compound represented by formula (1) and a hydrophobic polymer. The composition may appropriately contain one or more other materials. By incorporating the near-infrared absorptive compound into a matrix comprised of the hydrophobic polymer, the decomposition of the near-infrared absorptive compound is restrained and this near-infrared absorptive composition having a high fastness can be obtained.

The near-infrared absorptive image-forming composition of the present invention contains a near-infrared absorptive compound represented by formula (1), and may appropriately contain one or more other functional materials. By subjecting the near-infrared absorptive compound to dispersing operation using an appropriate dispersing agent, the compound can be preferably used for lithographic ink, gravure ink or electrophotographic toner.

(i) Near-Infrared Absorptive Compound

The near-infrared absorptive compound represented by formula (1) for use in the first, second, or third embodiment of the present invention will be described hereinafter.

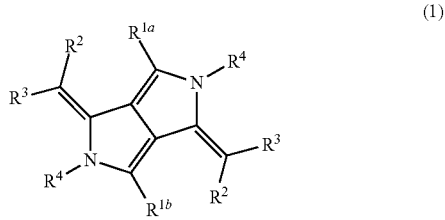

(1)

In the formula, $R^{1a}$ and $R^{1b}$ may be the same as or different from each other, and each independently represent an alkyl group, an aryl group, or a heteroaryl group; $R^2$ and $R^3$ each independently represent a hydrogen atom or a substituent, and at least one of $R^2$ and $R^3$ is an electron withdrawing group; $R^2$ may be bonded to $R^3$ to form a ring; and $R^4$ represents a hydrogen atom, an alkyl group, an aryl group, a heteroaryl group, a substituted boron, or a metal atom, and $R^4$ may be covalently bonded or coordinately bonded to $R^{1a}$, $R^{1b}$ and/or $R^3$.

In formula (1), the alkyl group represented by each of $R^{1a}$ and $R^{1b}$ is an alkyl group having preferably 1 to 30 carbon atoms, more preferably 1 to 20 carbon atoms, and in particular preferably 1 to 10 carbon atoms (in any description for the present invention, the expression "A to B" wherein A and B each represent a number means numbers of "A or more and B or less"). Examples thereof include methyl, ethyl, iso-propyl, tert-butyl, n-octyl, n-decyl, n-hexadecyl, cyclopropyl, 2-methylbutyl, 2-ethylcyclohexyl, cyclopentyl, and cyclohexyl.

The aryl group represented by each of $R^{1a}$ and $R^{1b}$ is an aryl group having preferably 6 to 30 carbon atoms, more preferably 6 to 20 carbon atoms, and in particular preferably 6 to 12 carbon atoms. Examples thereof include phenyl, o-methylphenyl, p-methylphenyl, biphenyl, naphthyl, anthranyl, and phenanthryl.

The heteroaryl group represented by $R^{1a}$ and $R^{1b}$ is a heteroaryl group having preferably 1 to 30 carbon atoms (more preferably 1 to 12 carbon atoms) and having, as hetero atom(s), a nitrogen atom, an oxygen atom and/or a sulfur atom. Examples thereof include imidazolyl, pyridyl, quinolyl, furyl, thienyl, benzoxazolyl, benzimidazolyl, benzothiazolyl, naphthothiazolyl, m-carbazolyl, and azepinyl.

In formula (1), $R^{1a}$ and $R^{1b}$ may be the same as or different from each other.

$R^2$ and $R^3$ each independently represent a hydrogen atom or a substituent T provided that at least one of $R^2$ and $R^3$ is an electron withdrawing group. $R^2$ may be bonded to $R^3$ to form a ring. Examples of the substituent T include an alkyl group (having preferably 1 to 30 carbon atoms, more preferably 1 to 20 carbon atoms, and particularly preferably 1 to 10 carbon atoms, such as methyl, ethyl, iso-propyl, tert-butyl, n-octyl, n-decyl, n-hexadecyl, cyclopropyl, 2-methylbutyl, cyclopentyl, cyclohexyl, and 2-ethylcyclohexyl), an alkenyl group (having preferably 2 to 30 carbon atoms, more preferably 2 to 20 carbon atoms, and particularly preferably 2 to 10 carbon atoms, such as vinyl, allyl, 2-butenyl, and 3-pentenyl), an alkynyl group (having preferably 2 to 30 carbon atoms, more preferably 2 to 20 carbon atoms, and particularly preferably 2 to 10 carbon atoms, such as propargyl and 3-pentynyl), an aryl group (having preferably 6 to 30 carbon atoms, more preferably 6 to 20 carbon atoms, and particularly preferably 6 to 12 carbon atoms, such as phenyl, p-methylphenyl, biphenyl, naphthyl, anthranyl, and phenanthryl), an amino group (having preferably 0 to 30 carbon atoms, more preferably 0 to 20 carbon atoms, and particularly preferably 0 to 10 carbon atoms, including alkylamino, arylamino, and heterocyclic amino group, such as amino, methylamino, dimethylamino, diethylamino, dibenzylamino, diphenylamino, and ditolylamino), an alkoxy group (having preferably 1 to 30 carbon atoms, more preferably 1 to 20 carbon atoms, and particularly preferably 1 to 10 carbon atoms, such as methoxy, ethoxy, butoxy, and 2-ethylhexyloxy), an aryloxy group (having preferably 6 to 30 carbon atoms, more preferably 6 to 20 carbon atoms, and particularly preferably 6 to 12 carbon atoms, such as phenyloxy, 1-naphthyloxy, and 2-naphthyloxy), an aromatic heterocyclic oxy group (having preferably 1 to 30 carbon atoms, more preferably 1 to 20 carbon atoms, and particularly preferably 1 to 12 carbon atoms, such as pyridyloxy, pyrazyloxy, pyrimidyloxy, quinolyloxy), an acyl group (having preferably 1 to 30 carbon atoms, more preferably 1 to 20 carbon atoms, and particularly preferably 1 to 12 carbon atoms, such as acetyl, benzoyl, formyl, and pivaloyl), an alkoxycarbonyl group (having preferably 2 to 30 carbon atoms, more preferably 2 to 20 carbon atoms, and particularly preferably 2 to 12 carbon atoms, such as methoxycarbonyl and ethoxycarbonyl), an aryloxycarbonyl group (having preferably 7 to 30 carbon atoms, more preferably 7 to 20 carbon atoms, and particularly preferably 7 to 12 carbon atoms, such as phenyloxycarbonyl), an acyloxy group (having preferably 2 to 30 carbon atoms, more preferably 2 to 20 carbon atoms, and particularly preferably 2 to 10 carbon atoms, such as acetoxy and benzoyloxy), an acylamino group (having preferably 2 to 30 carbon atoms, more preferably 2 to 20 carbon atoms, and particularly preferably 2 to 10 carbon atoms, such as acetylamino and benzoylamino), an alkoxycarbonylamino group (having preferably 2 to 30 carbon atoms, more preferably 2 to 20 carbon atoms, and particularly preferably 2 to 12 carbon atoms, such as methoxycarbonylamino), an aryloxycarbonylamino group (having preferably 7 to 30 carbon atoms, more preferably 7 to 20 carbon atoms, and particularly preferably 7 to 12 carbon atoms, such as phenyloxycarbonylamino), a sulfonylamino group (having preferably 1 to 30 carbon atoms, more preferably 1 to 20 carbon atoms, and particularly preferably 1 to 12 carbon atoms, such as methanesulfonylamino and benzenesulfonylamino), a sulfamoyl group (having preferably 0 to 30 carbon atoms, more preferably 0 to 20 carbon atoms, and particularly preferably 0 to 12 carbon atoms, such as sulfamoyl, methylsulfamoyl, dimethylsulfamoyl, and phenylsulfamoyl), a carbamoyl group (having preferably 1 to 30 carbon atoms, more preferably 1 to 20 carbon atoms, and particularly preferably 1 to 12 carbon atoms, such as carbamoyl, methylcarbamoyl, diethylcarbamoyl, and phenylcarbamoyl), an alkylthio group (having preferably 1 to 30 carbon atoms, more preferably 1 to 20 carbon atoms, and particularly preferably 1 to 12 carbon atoms, such as methylthio and ethylthio), an arylthio group (having preferably 6 to 30 carbon atoms, more preferably 6 to 20 carbon atoms, and particularly preferably 6 to 12 carbon atoms, such as phenylthio), an aromatic heterocyclic thio group (having preferably 1 to 30 carbon atoms, more preferably 1 to 20 carbon atoms, and particularly preferably 1 to 12 carbon atoms, such as pyridylthio, 2-benzimizolylthio, 2-benzoxazolylthio, 2-benzothiazolylthio), a sulfonyl group (having preferably 1 to 30 carbon atoms, more preferably 1 to 20 carbon atoms, and particularly preferably 1 to 12 carbon atoms, such as mesyl and tosyl), a sulfinyl group (having preferably 1 to 30 carbon atoms, more preferably 1 to 20 carbon atoms, and particularly preferably 1 to 12 carbon atoms, such as methanesulfinyl and benzenesulfinyl), a ureido group (having preferably 1 to 30 carbon atoms, more preferably 1 to 20 carbon atoms, and particularly preferably 1 to 12 carbon atoms, such as ureido, methylureido, and phenylureido), a phosphoric acid amide group (having preferably 1 to 30 carbon atoms, more preferably 1 to 20 carbon atoms, and particularly preferably 1 to 12 carbon atoms, such as diethylphosphoric acid amide and phenylphosphoric acid amide), a hydroxyl group, a mercapto group, a halogen atom (such as a fluorine atom, a chlorine atom, a bromine atom, and an iodine atom), a cyano group, a sulfo group, a carboxyl group, a nitro group, a hydroxamic acid group, a sulfino group, a hydrazino group, an imino group, a heterocyclic group (having preferably 1 to 30 carbon atoms, and more preferably 1 to 12 carbon atoms where examples of the hetero atom are a nitrogen atom, an oxygen atom and a sulfur atom and, to be more specific, such as imidazolyl, pyridyl, quinolyl, furyl, thienyl, piperidyl, morpholino, benzoxazolyl, benzimidazolyl, benzothiazolyl, carbazolyl, and azepinyl group), and a silyl group (having preferably 3 to 40 carbon atoms, more preferably 3 to 30 carbon atoms, and particularly preferably 3 to 24 carbon atoms, such as trimethylsilyl and triphenylsilyl). These substituents may be further substituted.

The electron-withdrawing group represented by $R^2$ or $R^3$ is a substituent having a positive Hammett $\sigma_p$ value (sigma para value), and is preferably a substituent having a Hammett $\sigma_p$ value of 0.2 or more. Examples thereof include a cyano group, an acyl group, an alkyloxycarbonyl group, an aryloxycarbonyl group, a sulfamoyl group, a sulfinyl group, and a heterocyclic group. These electron-withdrawing groups may be further substituted.

The expression "Hammett substituent constant σ value" used herein will be described. Hammett's rule is a rule of thumb advocated by L. P. Hammett in 1935 for quantitatively considering the effect of substituents on the reaction or equilibrium of benzene derivatives, and the appropriateness thereof is now widely recognized. The substituent constant determined in the Hammett's rule involves $\sigma_p$ value and $\sigma_m$ value. These values can be found in a multiplicity of general publications, and are detailed in, for example, "Lange's Handbook of Chemistry" 12th edition by J. A. Dean, 1979 (McGraw-Hill), "Kagaku no Ryoiki" special issue, No. 122, pp. 96 to 103, 1979 (Nankodo) and Chem. Rev., vol. 91, pp. 165 to 195, 1991. In the present invention, the substituent having a Hammett substituent constant $\sigma_p$ value of 0.2 or more means that this substituent is an electron-withdrawing group. The $\sigma_p$ value is preferably 0.25 or more, more preferably 0.3 or more, and in particular preferably 0.35 or more. The upper limit thereof is not particularly limited, and is preferably 0.80.

Examples thereof include a cyano group (0.66), a carboxyl group (—COOH: 0.45), an alkoxycarbonyl group (e.g. —COOMe: 0.45), an aryloxycarbonyl group (e.g. —COOPh: 0.44), a carbamoyl group (—CONH$_2$: 0.36), an alkylcarbonyl group (e.g. —COMe: 0.50), an arylcarbonyl group (e.g. —COPh: 0.43), an alkylsulfonyl group (e.g. —SO$_2$Me: 0.72), and an arylsulfonyl group (e.g. —SO$_2$Ph: 0.68). Particularly preferred is a cyano group. In the present description, Me represents a methyl group and Ph represents a phenyl group. The values in parentheses are the $\sigma_p$ values of typical substituents, as extracted from Chem. Rev., 1991, vol. 91, p. 165 to 195.

When the compound represented by formula (1) is a compound where $R^2$ and $R^3$ in formula (1) are combined to form a ring, the ring formed is preferably a 5- to 7-membered ring (preferably 5- or 6-membered ring) which is usually used as an acidic nucleus in a merocyanine dye, and specific examples thereof include the followings:

(a) a 1,3-dicarbonyl nucleus, such as 1,3-indanedione nucleus, 1,3-cyclohexanedione, 5,5-dimethyl-1,3-cyclohexanedione, and 1,3-dioxane-4,6-dione, (b) a pyrazolinone nucleus, such as 1-phenyl-2-pyrazolin-5-one, 3-methyl-1-phenyl-2-pyrazolin-5-one, and 1-(2-benzothiazoyl)-3-methyl-2-pyrazolin-5-one, (c) an isoxazolinone nucleus, such as 3-phenyl-2-isoxazolin-5-one, and 3-methyl-2-isoxazolin-5-one, (d) an oxyindole nucleus, such as 1-alkyl-2,3-dihydro-2-oxyindole, (e) a 2,4,6-triketohexahydropyrimidine nucleus, such as barbituric acid, 2-thiobarbituric acid and a derivative thereof, examples of the derivative include a 1-alkyl form such as 1-methyl and 1-ethyl, a 1,3-dialkyl form such as 1,3-dimethyl, 1,3-diethyl and 1,3-dibutyl, a 1,3-diaryl form such as 1,3-diphenyl, 1,3-di(p-chlorophenyl) and 1,3-di(p-ethoxycarbonylphenyl), a 1-alkyl-1-aryl form such as 1-ethyl-3-phenyl, and a 1,3-diheterocyclic substitution form such as 1,3-di(2-pyridyl), (f) a 2-thio-2,4-thiazolidinedione nucleus, such as rhodanine and a derivative thereof; examples of the derivative include a 3-alkylrhodanine such as 3-methylrhodanine, 3-ethylrhodanine and 3-allylrhodanine, a 3-arylrhodanine such as 3-phenylrhodanine, and a 3-heterocyclic ring-substituted rhodanine such as 3-(2-pyridyl)rhodanine, (g) a 2-thio-2,4-oxazolidinedione (2-thio-2,4-(3H,5H)-oxazoledione) nucleus, such as 3-ethyl-2-thio-2,4-oxazolidinedione, (h) a thianaphthenone nucleus, such as 3(2H)-thianaphthenone-1,1-dioxide, (i) a 2-thio-2,5-thiazolidinedione nucleus, such as 3-ethyl-2-thio-2,5-thiazolidinedione, (j) a 2,4-thiazolidinedione nucleus, such as 2,4-thiazolidinedione, 3-ethyl-2,4-thiazolidinedione and 3-phenyl-2,4-thiazolidinedione, (k) a thiazolin-4-one nucleus, such as 4-thiazolinone and 2-ethyl-4-thiazolinone, (l) a 4-thiazolinone nucleus, such as 2-ethylmercapto-5-thiazolin-4-one and 2-alkylphenylamino-5-thiazolin-4-one, (m) a 2,4-imidazolidinedione (hydantoin) nucleus, such as 2,4-imidazolidinedione and 3-ethyl-2,4-imidazolidinedione, (n) a 2-thio-2,4-imidazolidinedione (2-thiohydantoin) nucleus, such as 2-thio-2,4-imidazolidinedione and 3-ethyl-2-thio-2,4-imidazolidinedione, (o) an imidazolin-5-one nucleus, such as 2-propylmercapto-2-imidazolin-5-one, (p) a 3,5-pyrazolidinedione nucleus, such as 1,2-diphenyl-3,5-pyrazolidinedione and 1,2-dimethyl-3,5-pyrazolidinedione, (q) a benzothiophen-3-one nucleus, such as benzothiophen-3-one, oxobenzothiophen-3-one and dioxobenzothiophen-3-one, and (r) an indanone nucleus, such as 1-indanone, 3-phenyl-1-indanone, 3-methyl-1-indanone, 3,3-diphenyl-1-indanone and 3,3-dimethyl-1-indanone.

When $R^2$ is bonded to $R^3$ to form a ring, the σp value of $R^2$ and $R^3$ cannot be specified. However, in the present invention, the σp values of $R^2$ and $R^3$ are defined with assuming that partial structures of the ring are substituted as $R^2$ and $R^3$. For example, when $R^2$ and $R^3$ form a 1,3-indandione ring, it is supposed that benzoyl groups are substituted as $R^2$ and $R^3$.

The ring formed by $R^2$ and $R^3$ is preferably a 1,3-dicarbonyl nucleus, a pyrazolinone nucleus, a 2,4,6-triketohexahydropyrimidine nucleus (including a thioketone form), a 2-thio-2,4-thiazolidinedione nucleus, a 2-thio-2,4-oxazolidinedione nucleus, a 2-thio-2,5-thiazolidinedione nucleus, a 2,4-thiazolidinedione nucleus, a 2,4-imidazolidinedione nucleus, a 2-thio-2,4-imidazolidinedione nucleus, a 2-imidazolin-5-one nucleus, a 3,5-pyrazolidinedione nucleus, a benzothiophen-3-one nucleus or an indanone nucleus; and more preferably a 1,3-dicarbonyl nucleus, a 2,4,6-triketohexahydropyrimidine nucleus (including a thioketone form), a 3,5-pyrazolidinedione nucleus, a benzothiophen-3-one nucleus or an indanone nucleus.

$R^3$ is in particular preferably a heteroring. The heteroring is in particular preferably a pyrazole ring, a thiazole ring, an oxazole ring, an imidazole ring, an oxadiazole ring, a thiadiazole ring, a triazole ring, a pyridine ring, a pyridazine ring, a pyrimidine ring, or a pyrazine ring; a benzo-condensed ring or a naphtho-condensed ring thereof; or a composite made from these condensed rings.

Two groups represented by $R^2$ in formula (1) may be the same as or different from each other, and two groups represented by $R^3$ may be the same as or different from each other.

The alkyl group, the aryl group and the heteroaryl group represented by $R^4$ have the same meanings of those described as $R^{1a}$ and $R^{1b}$, respectively. Preferred ranges thereof are also the same. The substituent in the substituted boron represented by $R^4$ has the same meaning as the substituent T described about $R^2$ and $R^3$. Preferred examples thereof include an alkyl group, an aryl group, and a heteroaryl group. The metal atom represented by $R^4$ is preferably a transition metal, magnesium, aluminum, calcium, barium, zinc or tin, more preferably aluminum, zinc, tin, vanadium, iron, cobalt, nickel, copper, palladium, iridium or platinum, and in particular preferably aluminum, zinc, vanadium, iron, copper, palladium, iridium or platinum.

$R^4$ is in particular preferably substituted boron.

$R^4$ may be covalently bonded or coordinately bonded to $R^{1a}$, $R^{1b}$ and/or $R^3$. In particular preferably, $R^4$ is coordinately bonded to the corresponding $R^3$.

In formula (1), two groups represented by $R^4$ may be the same as or different from each other.

The compound represented by formula (1) is preferably a near-infrared absorptive compound represented by any one of the following formulae (2), (3) and (4):

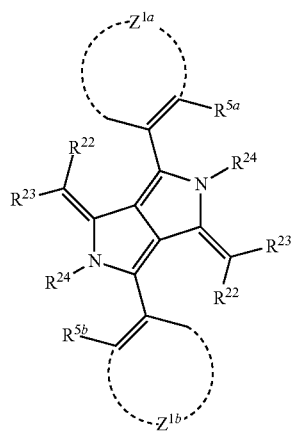

Formula (2)

In formula (2), $Z^{1a}$ and $Z^{1b}$ each independently represent an atomic group that forms an aryl ring or a heteroaryl ring. $R^{5a}$ and $R^{5b}$ each independently represent an aryl group having 6 to 20 carbon atoms, a heteroaryl group having 4 to 20 carbon atoms, an alkyl group having 1 to 20 carbon atoms, an alkoxy group having 1 to 20 carbon atoms, an alkoxycarbonyl group having 1 to 20 carbon atoms, a carboxyl group, a carbamoyl group having 1 to 20 carbon atoms, a halogen atom, or a cyano group. $R^{5a}$ or $R^{5b}$ may be bonded to $Z^{1a}$ or $Z^{1b}$ to form a condensed ring. $R^{22}$ and $R^{23}$ each independently represent a cyano group, an acyl group having 1 to 6 carbon atoms, an alkoxycarbonyl group having 1 to 6 carbon atoms, an alkylsulfinyl or arylsufinyl group having 1 to 10 carbon atoms, or a nitrogen-containing heteroaryl group having 3 to 20 carbon atoms, or $R^{22}$ and $R^{23}$ are bonded to each other to form a cyclic acidic nucleus. $R^{24}$ represents a hydrogen atom, an alkyl group having 1 to 20 carbon atoms, an aryl group having 6 to 20 carbon atoms, a heteroaryl group having 4 to 20 carbon atoms, a metal atom, or a substituted boron having at least one substituent selected from a halogen atom, an alkyl group having 1 to 10 carbon atoms, an aryl group having 6 to 20 carbon atoms, and a heteroaryl group having 4 to 20 carbon atoms. $R^{24}$ may be covalently bonded or coordinately bonded to $R^{23}$. The above compound may further be substituted.

Formula (3)

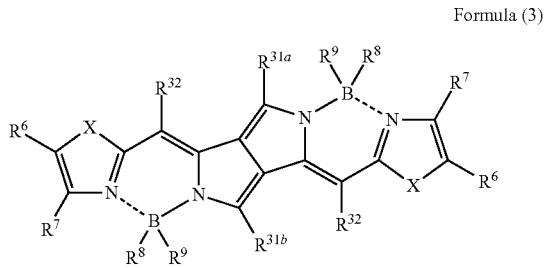

In formula (3), $R^{31a}$ and $R^{31b}$ each independently represent an alkyl group having 1 to 20 carbon atoms, an aryl group having 6 to 20 carbon atoms, or a heteroaryl group having 3 to 20 carbon atoms. $R^{32}$ represents a cyano group, an acyl group having 1 to 6 carbon atoms, an alkoxycarbonyl group having 1 to 6 carbon atoms, an alkylsulfinyl or arylsulfinyl group having 1 to 10 carbon atoms, or a nitrogen-containing heteroaryl group having 3 to 10 carbon atoms. $R^6$ and $R^7$ each independently represent a hydrogen atom, an alkyl group having 1 to 10 carbon atoms, an aryl group having 6 to 10 carbon atoms, or a heteroaryl group having 4 to 10 carbon atoms. $R^6$ may be bonded to $R^7$ to form a ring. The formed ring is an alicycle having 5 to 10 carbon atoms, an aryl ring having 6 to 10 carbon atoms, or a heteroaryl ring having 3 to 10 carbon atoms. $R^8$ and $R^9$ each independently represent an alkyl group having 1 to 10 carbon atoms, an alkoxy group having 1 to 10 carbon atoms, an aryl group having 6 to 20 carbon atoms, or a heteroaryl group having 3 to 10 carbon atoms. X represents an oxygen atom, a sulfur atom, —NR—, —CRR'—, or —CH═CH— wherein R and R' each independently represent a hydrogen atom, an alkyl group having 1 to 10 carbon atoms, or an aryl group having 6 to 10 carbon atoms.

Formula (4)

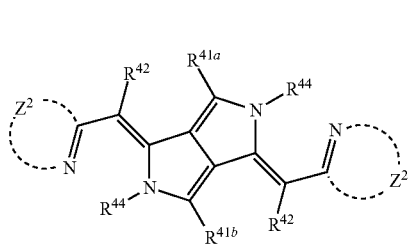

In formula (4), $R^{41a}$ and $R^{41b}$ represent groups different from each other and each represent an alkyl group having 1 to 20 carbon atoms, an aryl group having 6 to 20 carbon atoms, or a heteroaryl group having 3 to 20 carbon atoms. $R^{42}$ represent a cyano group, an acyl group having 1 to 6 carbon atoms, an alkoxycarbonyl group having 1 to 6 carbon atoms, an alkylsulfinyl or arylsulfinyl group having 1 to 10 carbon atoms, or a nitrogen-containing heteroaryl group having 3 to 10 carbon atoms. $Z^2$ represents an atomic group which is combined with —C═N— to form a nitrogen-containing, 5- or 6-membered heteroring. The nitrogen-containing heteroring may be a pyrazole ring, a thiazole ring, an oxazole ring, an imidazole ring, an oxadiazole ring, a thiadiazole ring, a triazole ring, a pyridine ring, a pyridazine ring, a pyrimidine ring, or a pyrazine ring; a benzo-condensed ring or a naphtho-condensed ring thereof; or a composite made from these condensed rings. $R^{44}$ represents a hydrogen atom, an alkyl group having 1 to 20 carbon atoms, an aryl group having 6 to 20 carbon atoms, a heteroaryl group having 4 to 20 carbon atoms, a metal atom, or a substituted boron having at least one substituent selected from a halogen atom, an alkyl group having 1 to 10 carbon atoms, an aryl group having 6 to 20 carbon atoms, and a heteroaryl group having 4 to 20 carbon atoms. $R^{44}$ may be covalently bonded or coordinately bonded to the nitrogen-containing heteroring which $Z^2$ forms. The above compound may further be substituted.

The compound represented by formula (2) will be described hereinafter.

In formula (2), $Z^{1a}$ and $Z^{1b}$ each independently represent an atomic group that forms an aryl ring or a heteroaryl ring. The formed aryl ring or heteroaryl ring has the same meaning as the aryl group or heteroaryl group described about the substituent as each of $R^2$ and $R^3$ in formula (1). A preferred range of the formed aryl ring or heteroaryl ring is also the same. $Z^{1a}$ and $Z^{1b}$ are preferably the same as each other.

$R^{5a}$ and $R^{5b}$ each independently represent an aryl group having 6 to 20 carbon atoms, a heteroaryl group having 4 to 20 carbon atoms, an alkyl group having 1 to 20 carbon atoms, an alkoxy group having 1 to 20 carbon atoms, an alkoxycarbonyl group having 1 to 20 carbon atoms, a carboxyl group, a carbamoyl group having 1 to 20 carbon atoms, a halogen atom, or a cyano group. Specific examples thereof are the same as described about $R^2$ and $R^3$ in formula (1). Preferred ranges thereof are also the same. $R^{5a}$ and $R^{5b}$ are preferably the same as each other.

$R^{5a}$ or $R^{5b}$ may be bonded to $Z^{1a}$ or $Z^{1b}$ to form a condensed ring. Examples of the condensed ring include a naphthyl ring and a quinoline ring.

By introducing the group represented by $R^{5a}$ or $R^{5b}$ into the aryl ring or heteroaryl ring that $Z^{1a}$ or $Z^{1b}$ forms, the invisibility can be largely improved.

$R^{22}$ and $R^{23}$ each independently represent a cyano group, an acyl group having 1 to 6 carbon atoms, an alkoxycarbonyl group having 1 to 6 carbon atoms, an alkylsufinyl or arylsufinyl group having 1 to 10 carbon atoms, or a nitrogen-containing heteroaryl group having 3 to 20 carbon atoms, or $R^{22}$ is bonded to $R^{23}$ to form a cyclic acidic nucleus. Specific examples thereof are the same as described about $R^2$ and $R^3$ in formula (1). Preferred ranges thereof are the same. $R^{24}$ has the same meaning as $R^4$ in formula (1). A Preferred range thereof is also the same. $R^{24}$ may be covalently bonded or coordinately bonded to $R^{23}$.

The compound represented by formula (2) may further have a substituent. The substituent has the same meaning as the substituent T as each of $R^2$ and $R^3$. A preferred range thereof is the same.

In formula (2), a preferred combination of $Z^{1a}$, $Z^{1b}$ and the like is as follows: $Z^{1a}$ and $Z^{1b}$ each independently form a benzene ring or a pyridine ring; $R^{5a}$ and $R^{5b}$ are each independently an alkyl group, an alkoxy group, a halogen atom, or a cyano group; $R^{22}$ and $R^{23}$ are each independently a heterocyclic group, a cyano group, an acyl group, or an alkoxycarbonyl group, or $R^{22}$ is bonded to $R^{23}$ to form a cyclic acidic nucleus; and $R^{24}$ is a hydrogen atom, a substituted boron, a transition metal atom, magnesium, aluminum, calcium, barium, zinc, or tin. A particularly preferred combination thereof is as follows: $Z^{1a}$ and $Z^{1b}$ each form a benzene ring; $R^{5a}$ and $R^{5b}$ are each an alkyl group, a halogen atom, or a cyano group; $R^{22}$ and $R^{23}$ are each independently a combination of a nitrogen-containing heterocyclic group with a cyano group or alkoxycarbonyl group, or $R^{22}$ is bonded to $R^{23}$ to form a cyclic acidic nucleus; and $R^{24}$ is a hydrogen atom, a substituted boron, aluminum, zinc, vanadium, iron, copper, palladium, iridium or platinum.

The compound represented by formula (3) will be described hereinafter.

In formula (3), $R^{31a}$ and $R^{31b}$ each independently represent an alkyl group having 1 to 20 carbon atoms, an aryl group having 6 to 20 carbon atoms, or a heteroaryl group having 3 to 20 carbon atoms. Specific examples thereof are the same as described about $R^{1a}$ and $R^{1b}$ in formula (1). Preferred ranges thereof are also the same. $R^{31a}$ and $R^{31b}$ are preferably the same as each other.

$R^{32}$ is a cyano group, an alkoxycarbonyl group having 1 to 6 carbon atoms, an alkylsulfinyl or arylsulfinyl group having 1 to 10 carbon atoms, or a nitrogen-containing heteroaryl group having 3 to 10 carbon atoms. Specific examples thereof are the same as described about $R^2$ in formula (1). A preferred range thereof is also the same.

$R^6$ and $R^7$ are each independently a hydrogen atom, an alkyl group having 1 to 10 carbon atoms, an aryl group having 6 to 10 carbon atoms, or a heteroaryl group having 4 to 10 carbon atoms. Specific examples thereof are the same as described about the substituents as $R^2$ and $R^3$ in formula (1). Preferred ranges thereof are also the same. $R^6$ may be bonded to $R^7$ to form a ring. The formed ring is an alicycle having 5 to 10 carbon atoms, an aryl ring having 6 to 10 carbon atoms, or a heteroaryl ring having 3 to 10 carbon atoms. Preferred examples thereof include a benzene ring, a naphthalene ring or a pyridine ring.

By introducing a 5-membered, nitrogen-containing heteroring substituted by $R^6$ and $R^7$, and further modifying the compound to a boron complex, a near-infrared absorptive dye having a high fastness and a high invisibility, which are compatible with each other, can be realized.

$R^8$ and $R^9$ are each independently an alkyl group having 1 to 10 carbon atoms, an alkoxy group having 1 to 10 carbon atoms, an aryl group having 6 to 20 carbon atoms, or a heteroaryl group having 3 to 10 carbon atoms. Specific examples thereof are the same as described about the substituents as $R^2$ and $R^3$ in formula (1). Preferred ranges thereof are also the same.

X represents an oxygen atom, a sulfur atom, —NR—, —CRR'—, or —CH═CH— wherein R and R' each independently represent a hydrogen atom, an alkyl group having 1 to 10 carbon atoms, or an aryl group having 6 to 10 carbon atoms, and are each preferably a hydrogen atom, an alkyl group having 1 to 6 carbon atoms, or a phenyl group.

In formula (3), a preferred combination of $R^{31a}$, $R^{31b}$ and the like is as follows: $R^{31a}$ and $R^{31b}$ are each independently an alkyl group having 1 to 10 carbon atoms, a benzene ring, or a pyridine ring; $R^{32}$ is a cyano group or an alkoxycarbonyl group; $R^6$ is bonded to $R^7$ to form a benzene ring, a pyridine ring, a pyrazine ring, or a pyrimidine ring; $R^8$ and $R^9$ are each independently an alkyl group having 1 to 6 carbon atoms, a phenyl group or a naphthyl group; and X is an oxygen atom, a sulfur atom, —NR—, —CRR', or —CH═CH— wherein R and R' each independently represent a hydrogen atom, an alkyl group having 1 to 6 carbon atoms, or a phenyl group. A particularly preferred combination thereof is as follows: $R^{31a}$ and $R^{31b}$ are each an alkyl group having 1 to 10 carbon atoms, or a benzene ring; $R^{32}$ is a cyano group; $R^6$ is bonded to $R^7$ to form a benzene ring, or a pyridine ring; $R^8$ and $R^9$ are each independently an alkyl group having 1 to 6 carbon atoms, a phenyl group or a naphthyl group; and X is oxygen or sulfur.

The compound represented by formula (4) will be described hereinafter.

In formula (4), $R^{41a}$ and $R^{41b}$ each represent an alkyl group having 1 to 20 carbon atoms, an aryl group having 6 to 20 carbon atoms, or a heteroaryl group having 3 to 20 carbon atoms. Specific examples thereof are the same as described about $R^{1a}$ and $R^{1b}$ in formula (1). Preferred ranges thereof are also the same. However, $R^{41a}$ and $R^{41b}$ represent a substituent different from each other.

$R^{42}$ is a cyano group, an alkoxycarbonyl group having 1 to 6 carbon atoms, an alkylsulfinyl or arylsulfinyl group having 1 to 10 carbon atoms, or a nitrogen-containing heteroaryl group having 3 to 10 carbon atoms. Specific examples thereof are the same as described about $R^2$ in formula (1). A preferred range thereof is also the same.

$Z^2$ represents an atomic group which is combined with —C═N— to form a nitrogen-containing, 5- or 6-membered heteroring. The nitrogen-containing heteroring may be a pyrazole ring, a thiazole ring, an oxazole ring, an imidazole ring, an oxadiazole ring, a thiadiazole ring, a triazole ring, a pyridine ring, a pyridazine ring, a pyrimidine ring, or a pyrazine ring; a benzo-condensed ring or a naphtho-condensed ring thereof; or a composite made from these condensed rings.

$R^{44}$ represents a hydrogen atom, an alkyl group having 1 to 20 carbon atoms, an aryl group having 6 to 20 carbon atoms, a heteroaryl group having 4 to 20 carbon atoms, a metal atom, or a substituted boron having at least one substituent selected from a halogen atom, an alkyl group having 1 to 10 carbon atoms, an aryl group having 6 to 20 carbon atoms, and a heteroaryl group having 4 to 20 carbon atoms. $R^{44}$ may be covalently bonded or coordinately bonded to the nitrogen-containing heterorring which $Z^2$ forms.

$R^{41a}$ and $R^{41b}$, which are different from each other, are introduced, and the nitrogen-containing, 5- or 6-membered heterorring, which is made from $Z^2$ and —C=N—, is introduced, whereby a high fastness, a high invisibility, an excellent dispersibility and a high solubility in organic solvent can be obtained.

In formula (4), a preferred combination of $R^{41a}$, $R^{41b}$ and the like are as follows: $R^{41a}$ and $R^{41b}$ are each independently an alkyl group having 1 to 10 carbon atoms, a benzene ring, or a pyridine ring; $R^{42}$ is a cyano group, an alkylsulfinyl group, arylsulfinyl group, or alkoxycarbonyl group, having 1 to 10 carbon atoms; $Z^2$ is combined with —C=N— to form a thiazole ring, an oxazole ring, an imidazole ring, a thiadiazole ring, a triazole ring, a pyridine ring, a pyrimidine ring or a pyrazine ring, or a benzo-condensed ring or a naphtho-condensed ring thereof; and $R^{44}$ is a hydrogen atom, a substituted boron, a transition metal atom, magnesium, aluminum, calcium, barium, zinc, or tin. A particularly preferred combination thereof is as follows: $R^{41a}$ and $R^{41b}$ are each independently an alkyl group having 1 to 10 carbon atoms, or a benzene ring; $R^{42}$ is a cyano group; $Z^2$ is combined with —C=N— to form a thiazole ring, an oxazole ring, an imidazole ring, a triazole ring, a pyridine ring or a pyrimidine ring, or a benzo-condensed ring or a naphtho-condensed ring thereof; and $R^{44}$ is a hydrogen atom, a substituted boron (its substituent is an alkyl group having 1 to 10 carbon atoms, a benzene ring, a pyridine ring, or a thiophene ring), aluminum, zinc, vanadium, iron, copper, palladium, iridium, or platinum.

Hereinafter, illustrated are specific examples of the compound (dye compound) represented by formula (1) (preferably, the compound represented by any one of formulae (2) to (4)). In the present invention, the dye compound is not limited to the specific examples. In the present specification, Me, Et, Bu, and Ph represent a methyl group, an ethyl group, a butyl group, and a phenyl group, respectively. In the chemical formula D-1 or D-17 and the like out of the chemical formulae illustrated below, the hydrogen atom corresponding to the substituent $R^4$ in formula (1) is combined with the nitrogen atom in the heterorring constituting the substituent $R^3$ to form a coordinate bond. In these chemical formulae, the above coordinate bond is omitted (see scheme 1 illustrated below).

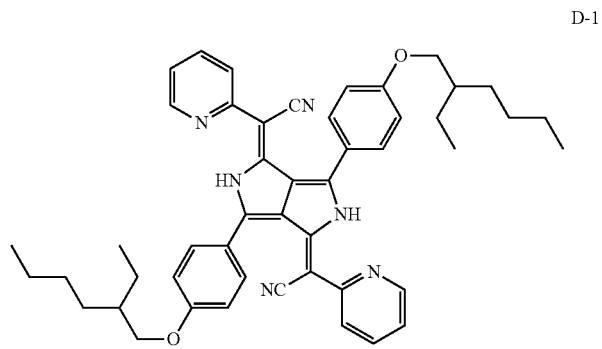

D-1

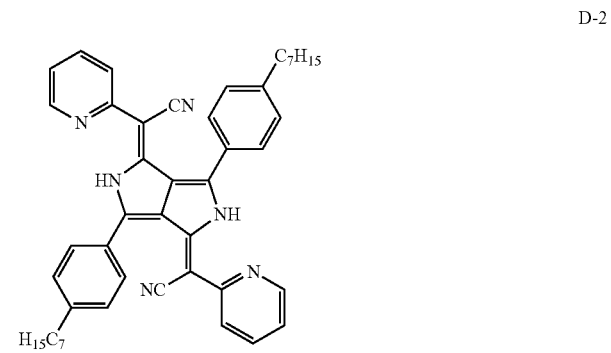

D-2

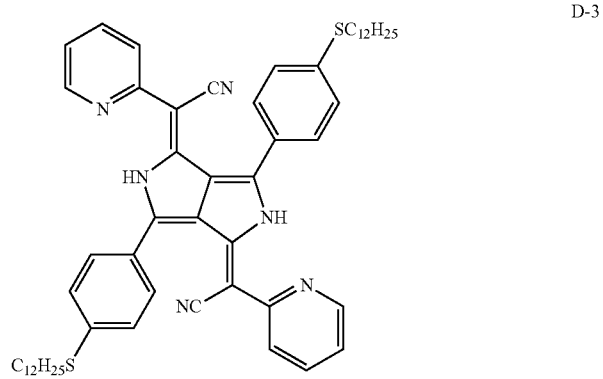

D-3

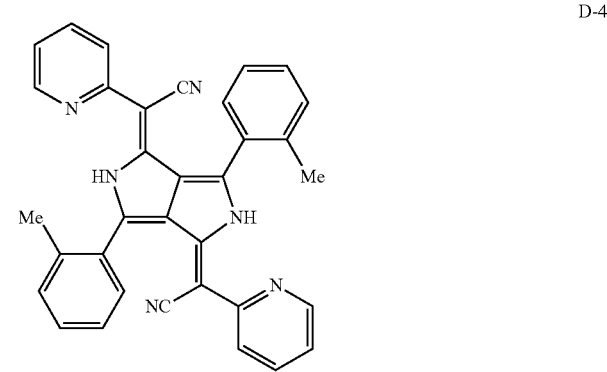

D-4

-continued
D-5
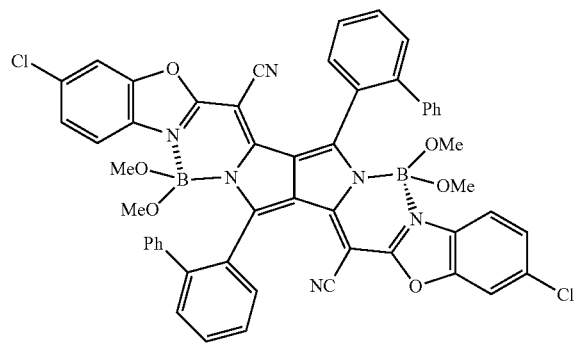
D-6
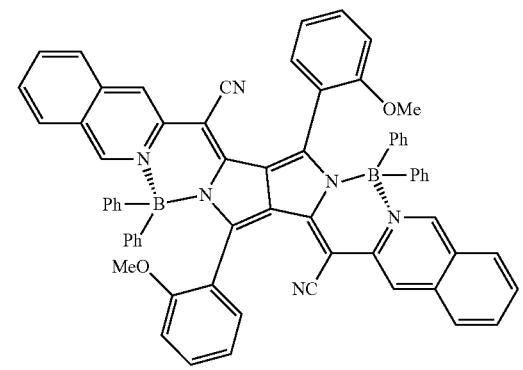
D-7
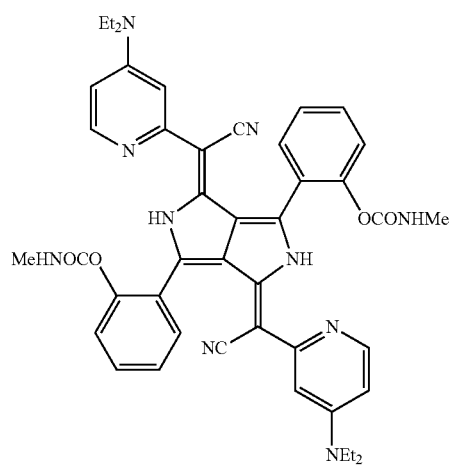
D-8
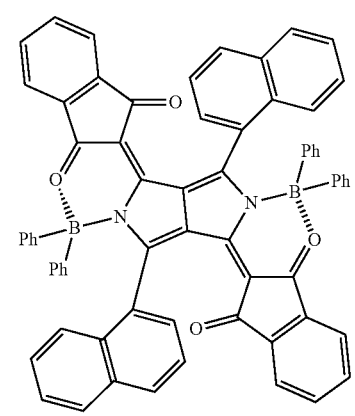
D-9
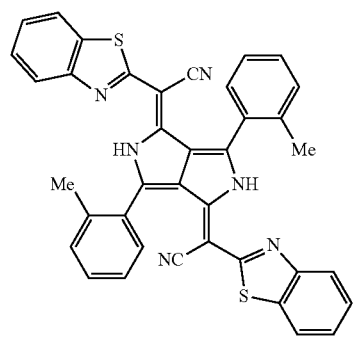
D-10
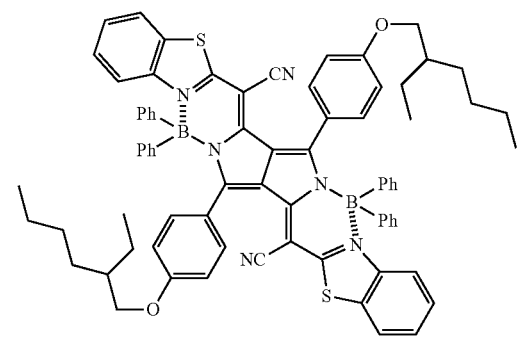
D-11
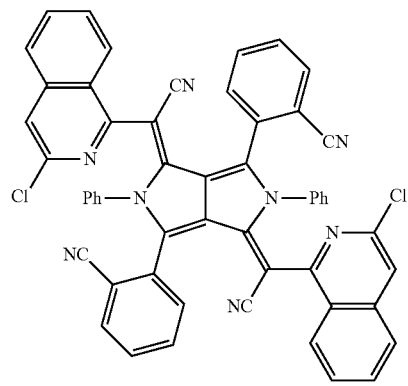
D-12
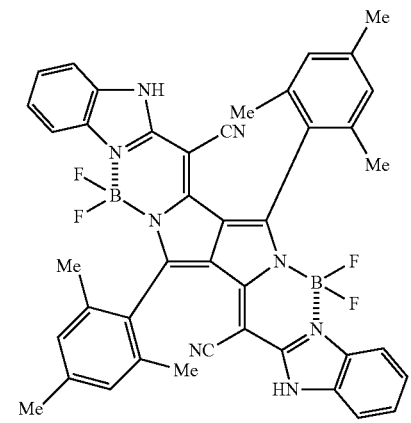

-continued
D-13
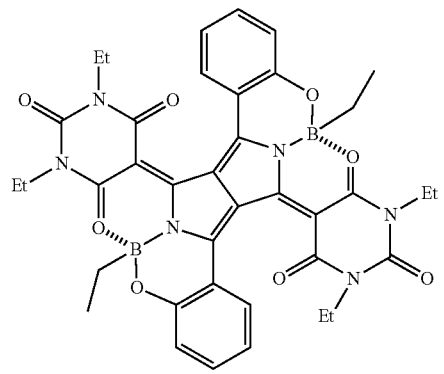
D-14
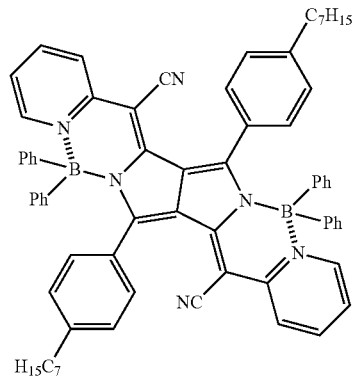
D-15
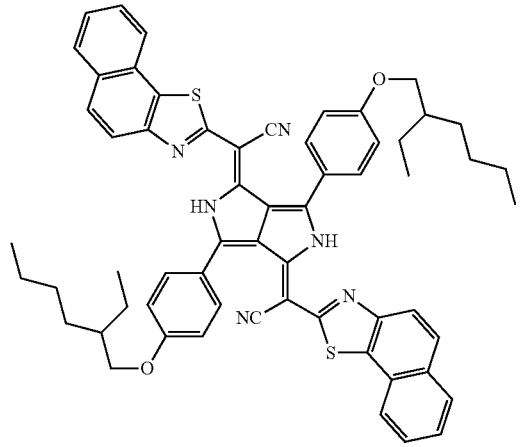
D-16
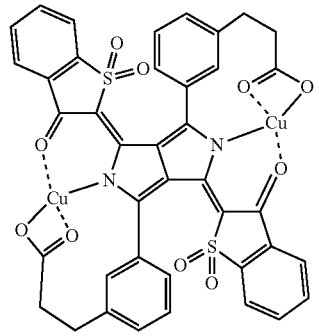
D-17
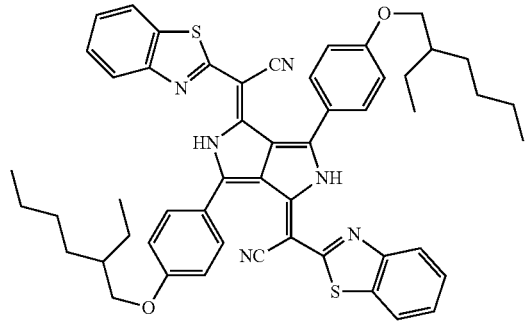
D-18
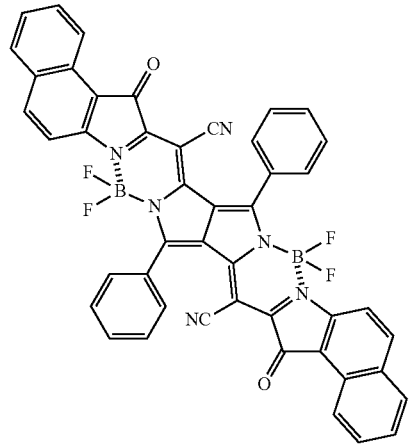
D-19
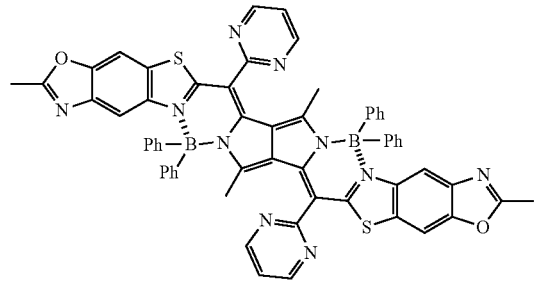
D-20
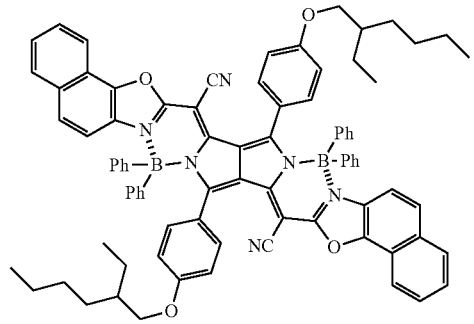

-continued
D-21
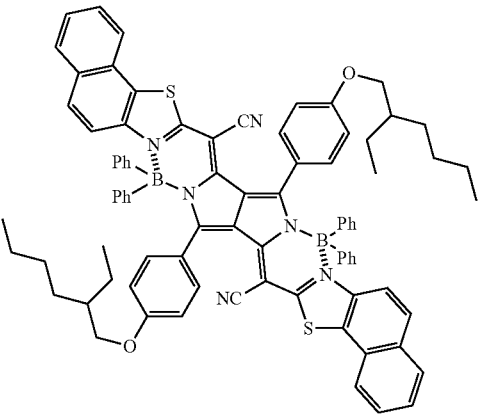
D-22
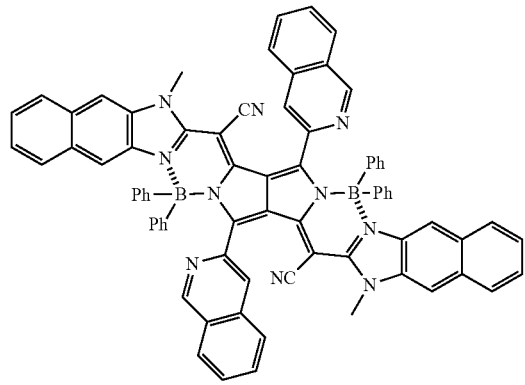
D-23
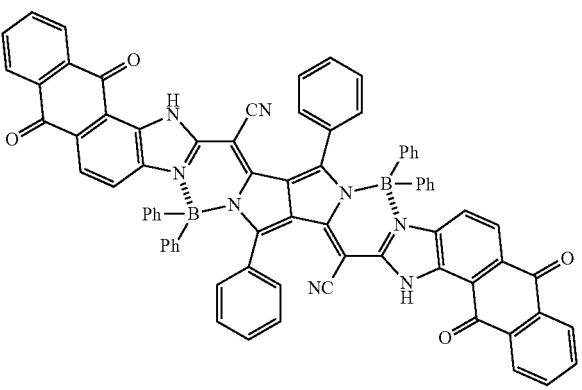
D-24
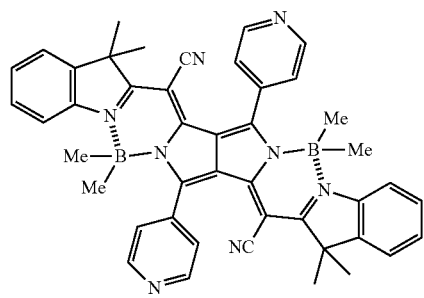
D-25
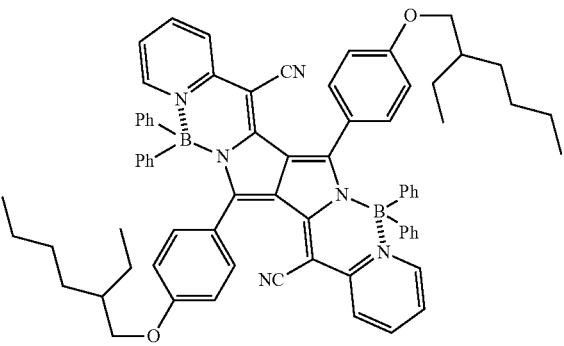
D-26
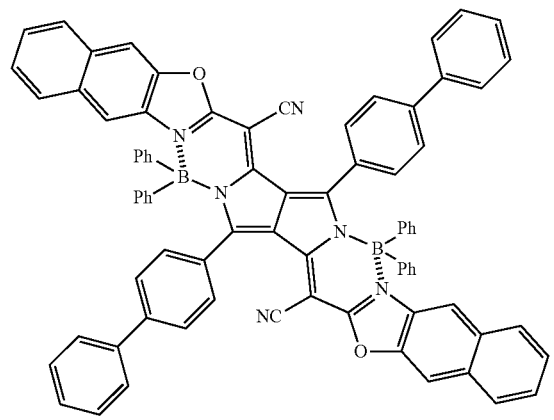
D-27
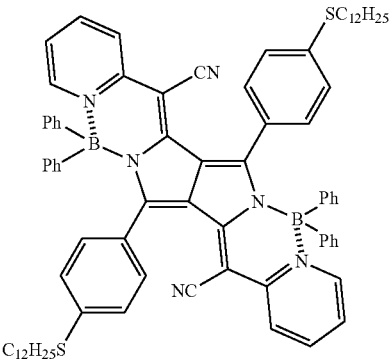
D-28
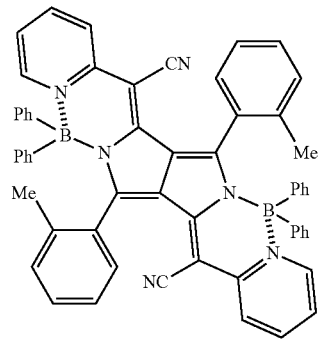

-continued
D-29
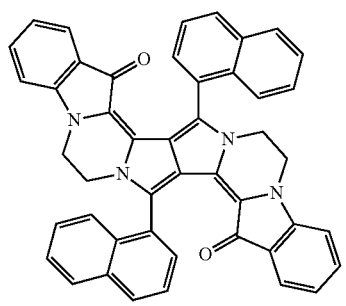
D-30
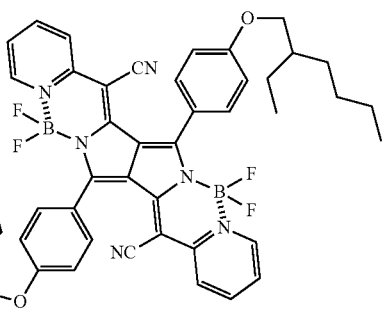
D-31
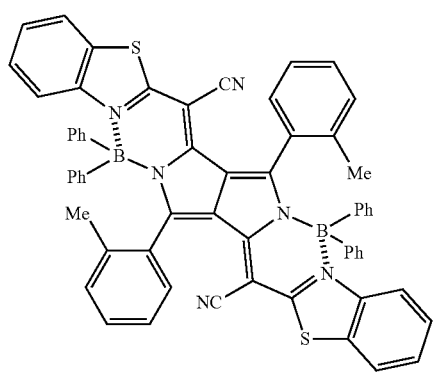
D-32
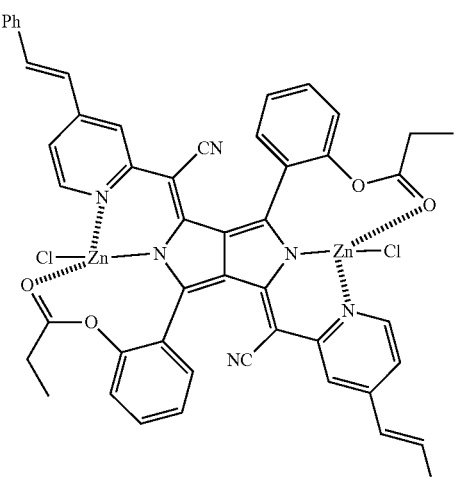
D-33
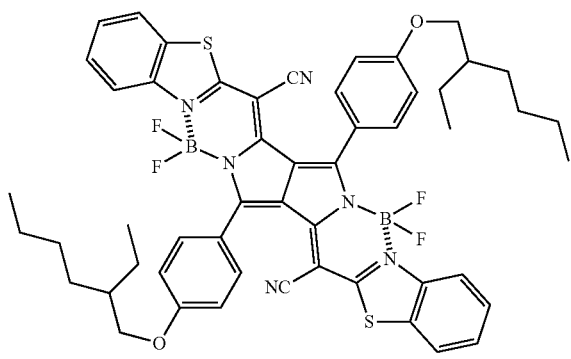
D-34
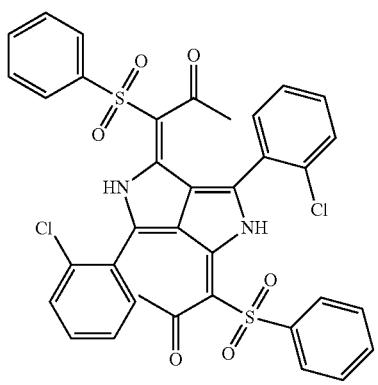
D-35
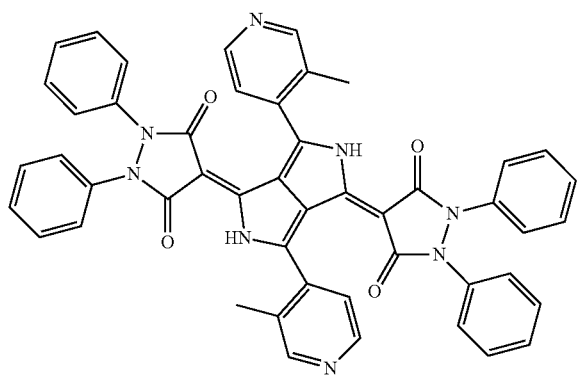
D-36
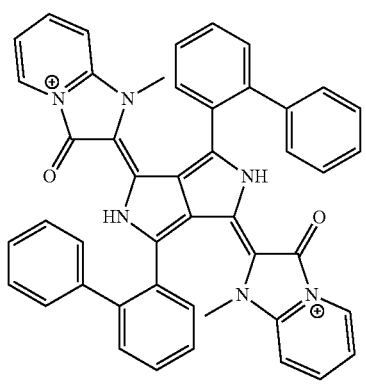

-continued
D-37
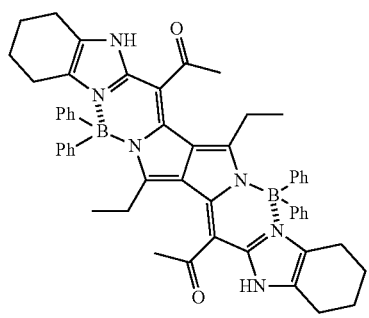
D-38
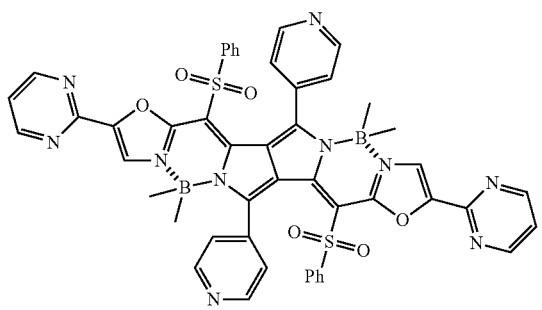
D-39
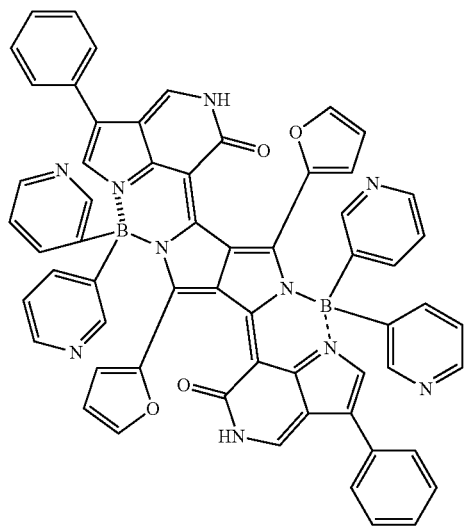
D-40
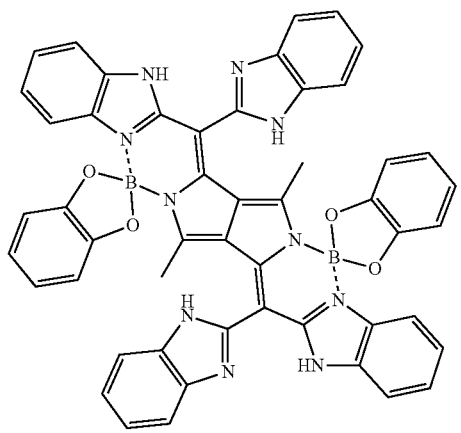
D-41
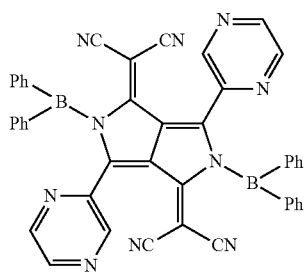
D-42
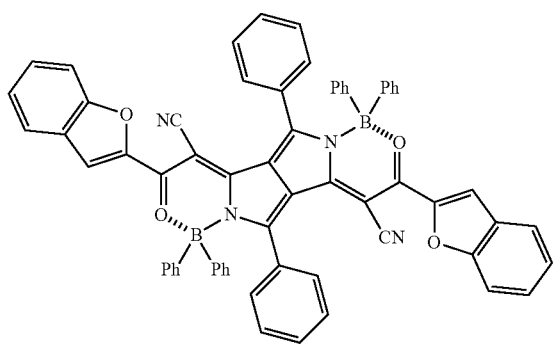

-continued
D-43
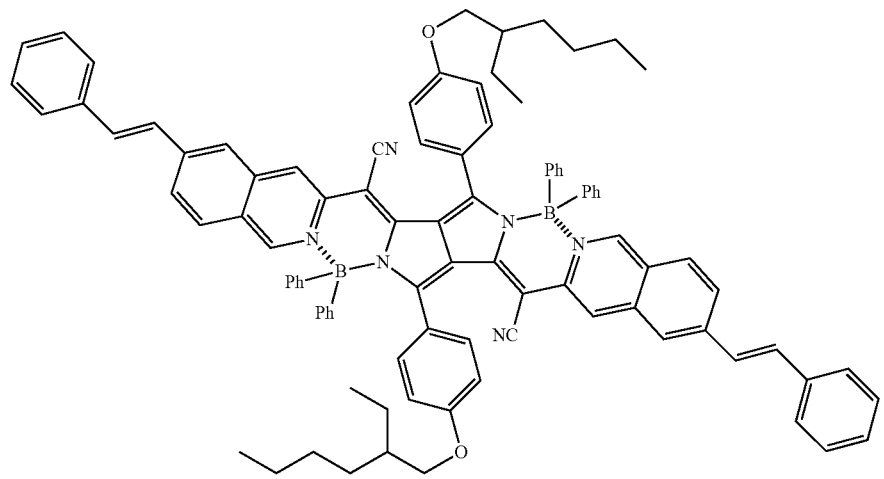
D-44
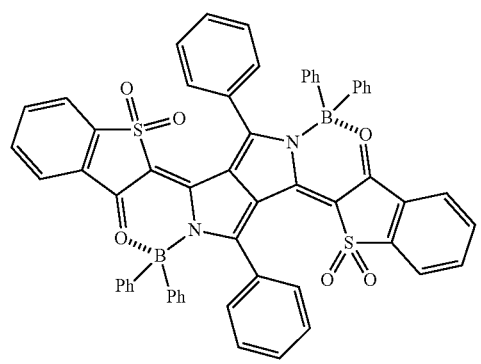
D-45
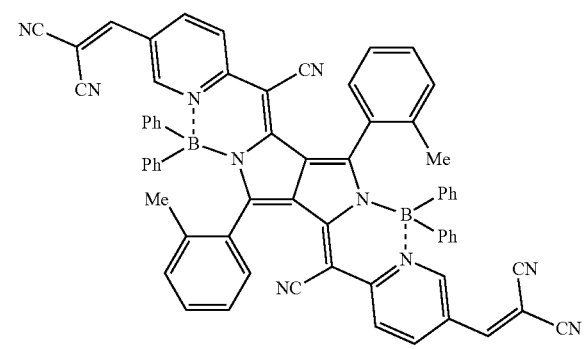
D-46
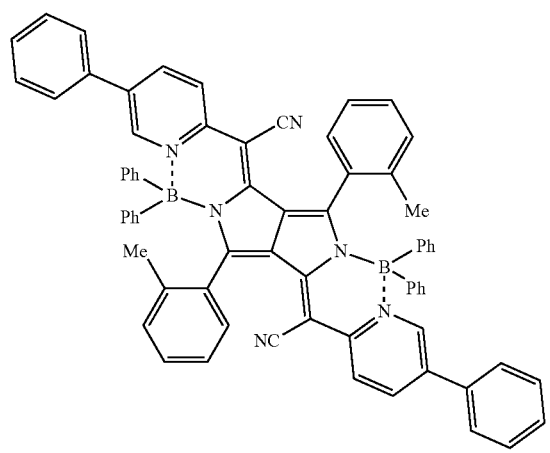
D-47
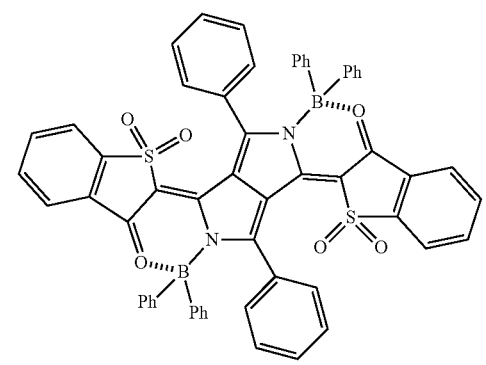

-continued
D-101
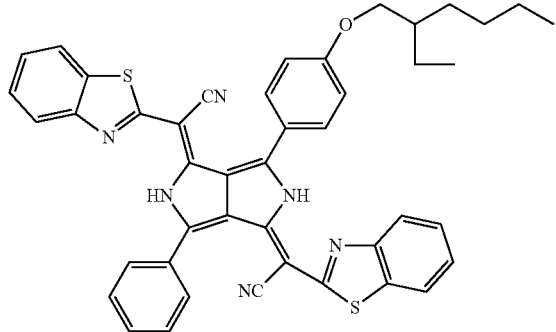
D-102
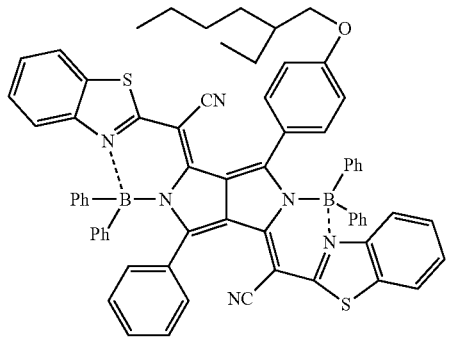
D-103
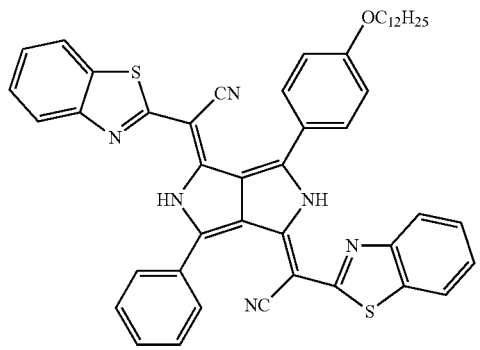
D-104
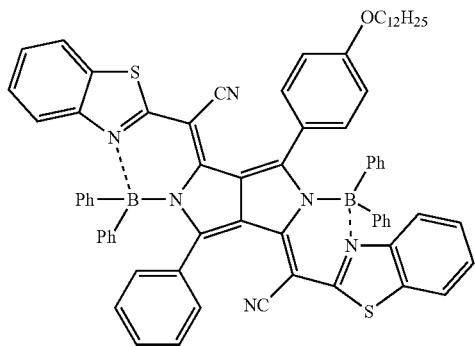
D-105
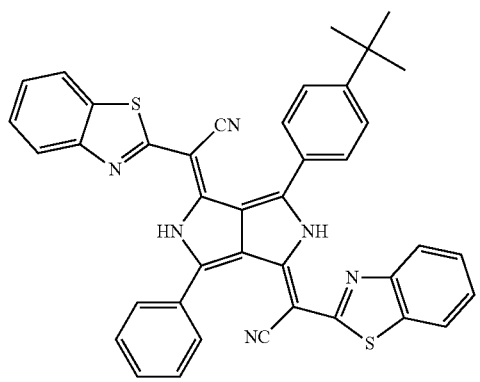
D-106
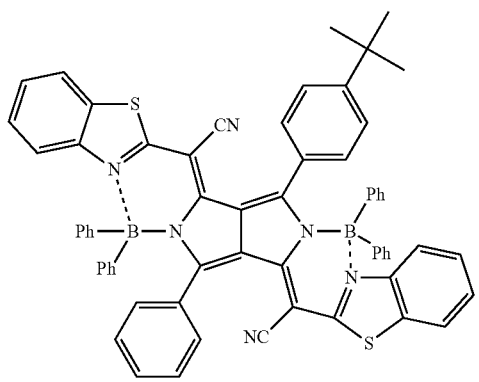
D-107
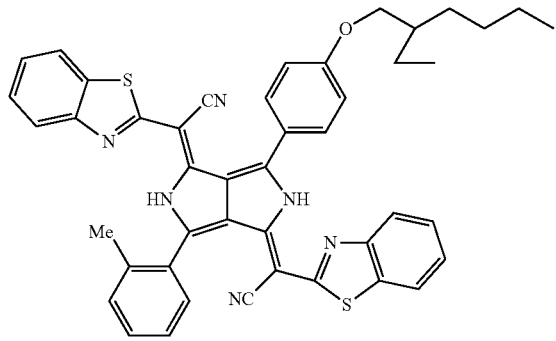
D-108
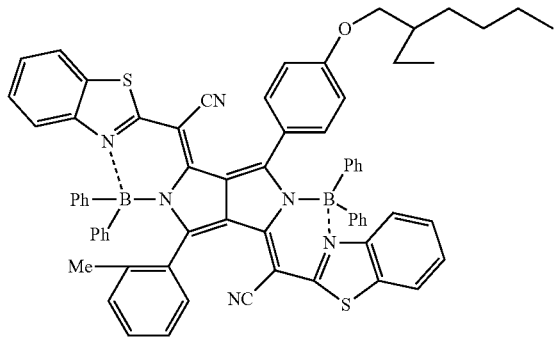

-continued
| | |
|---|---|
| 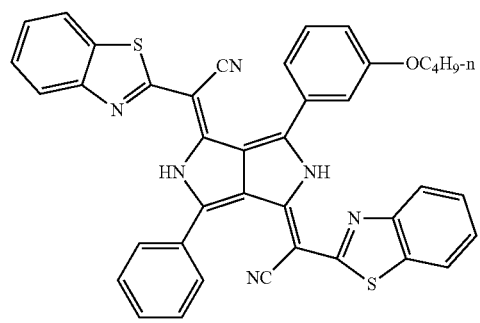 D-109 | 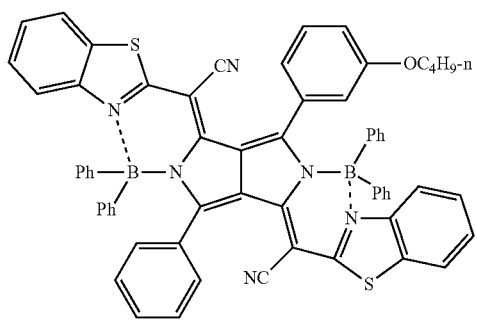 D-110 |
| 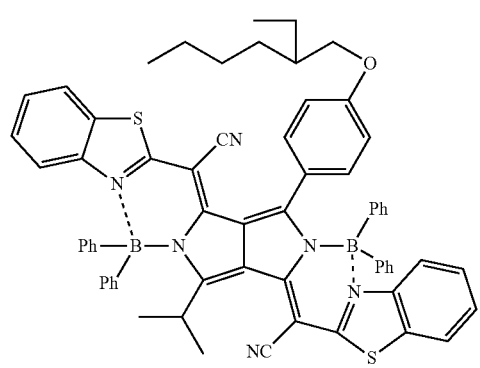 D-111 | 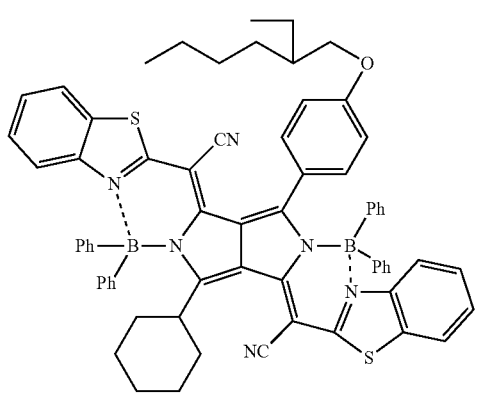 D-112 |
| 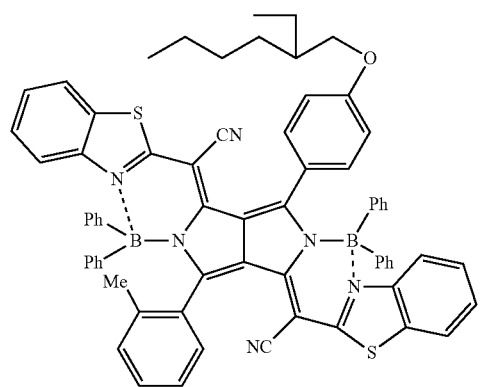 D-113 | 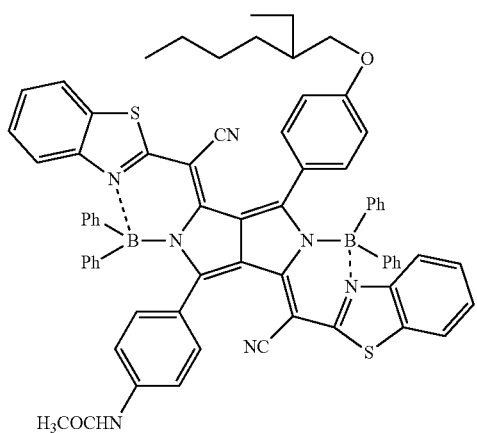 D-114 |
| 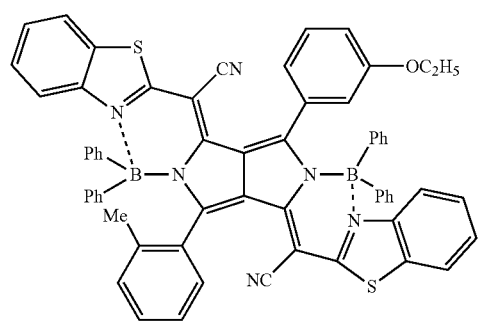 D-115 | 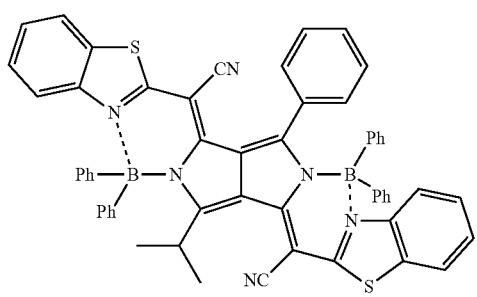 D-116 |

-continued
D-117
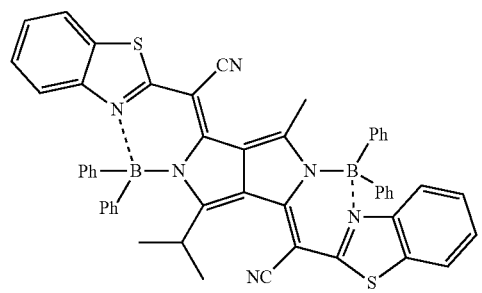
D-118
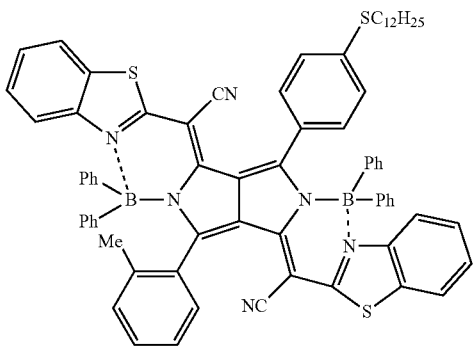
D-119
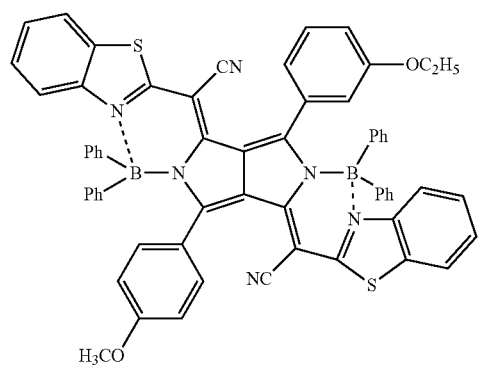
D-120
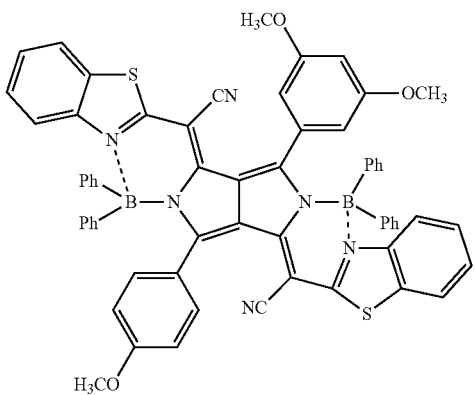
D-121
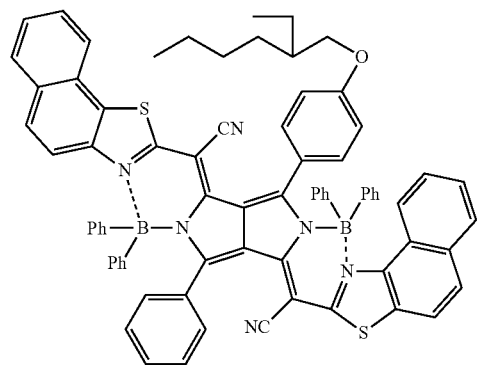
D-122
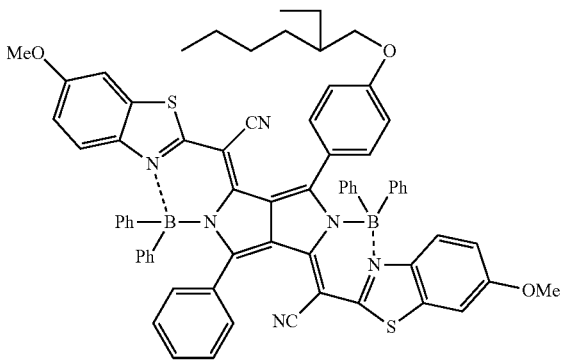
D-123
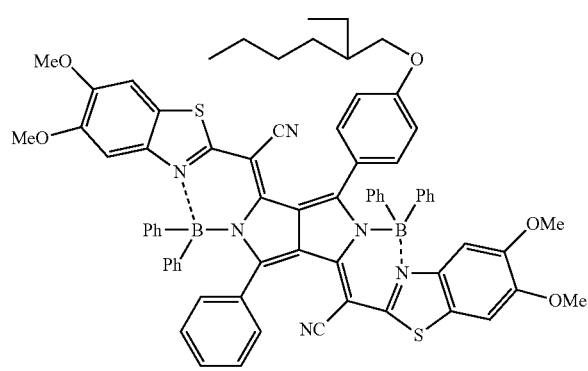
D-124
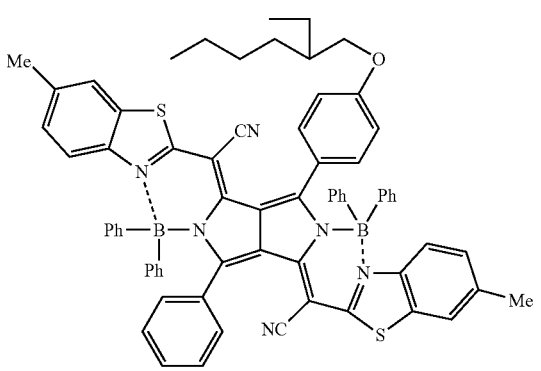

-continued
D-125
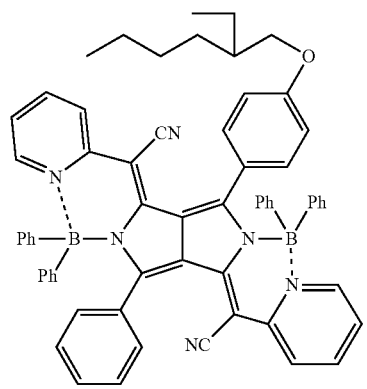
D-126
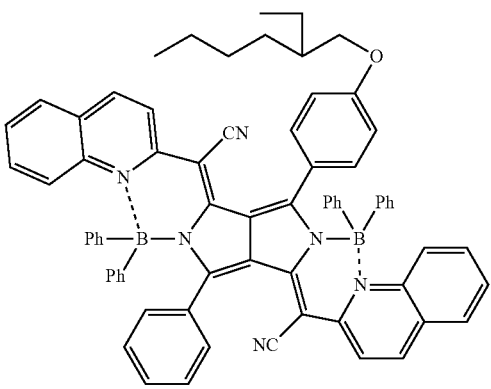
D-127
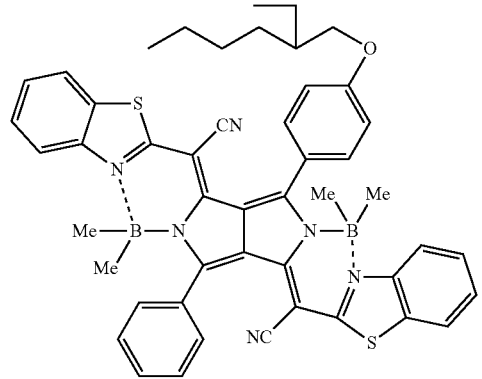
D-128
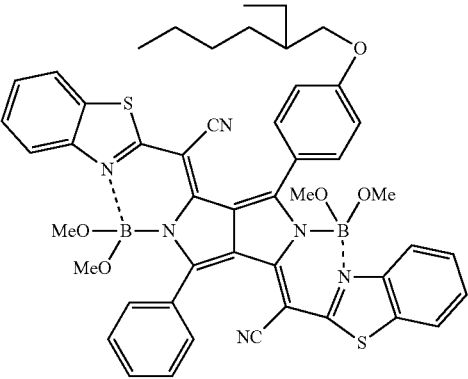
D-129
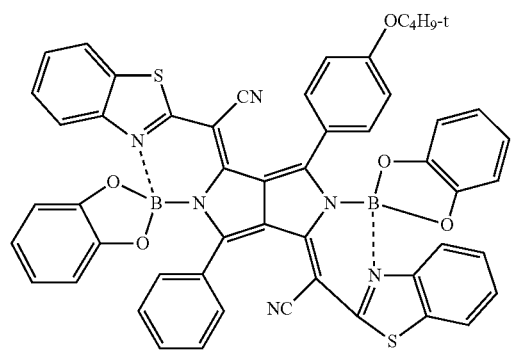
D-130
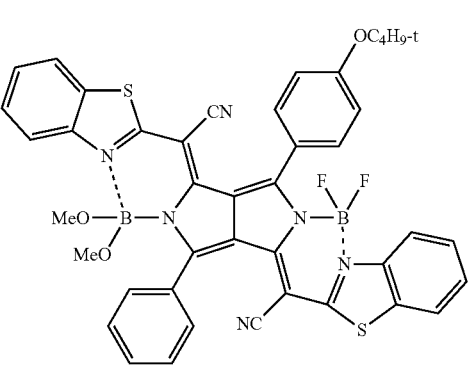
D-131
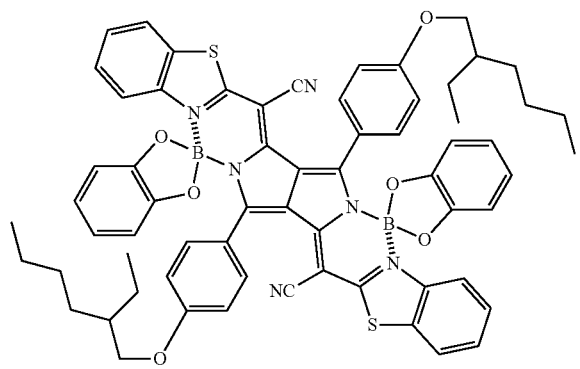
D-132
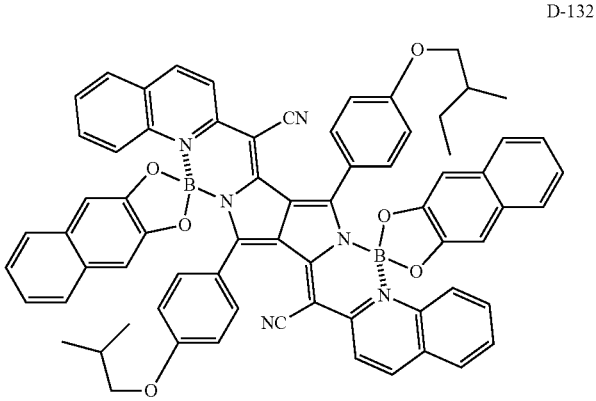

-continued
D-133
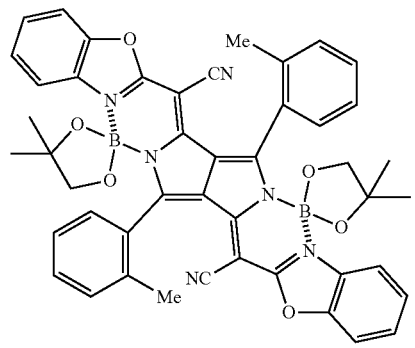
D-134
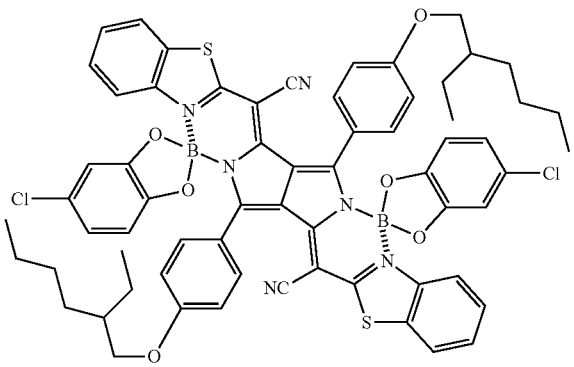
D-135
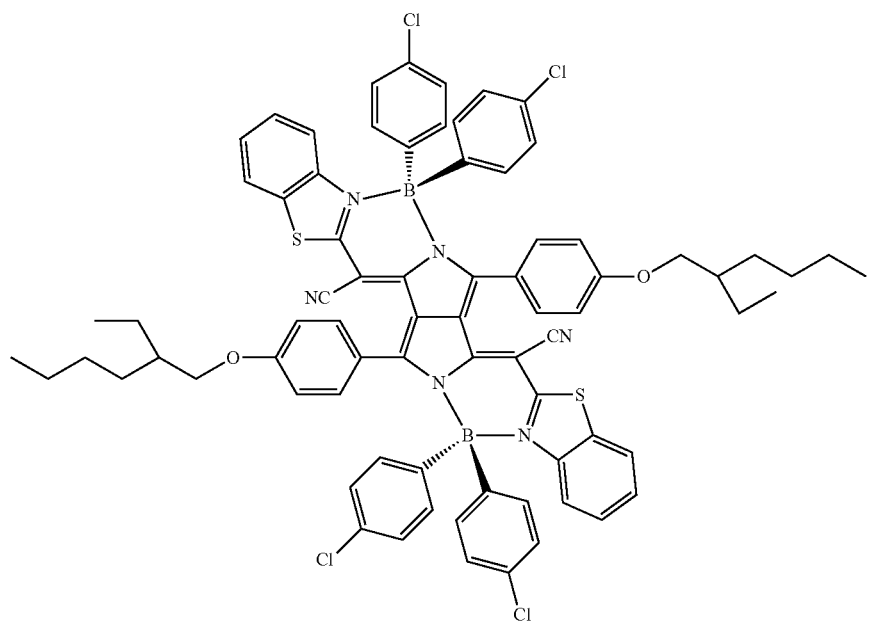
D-136
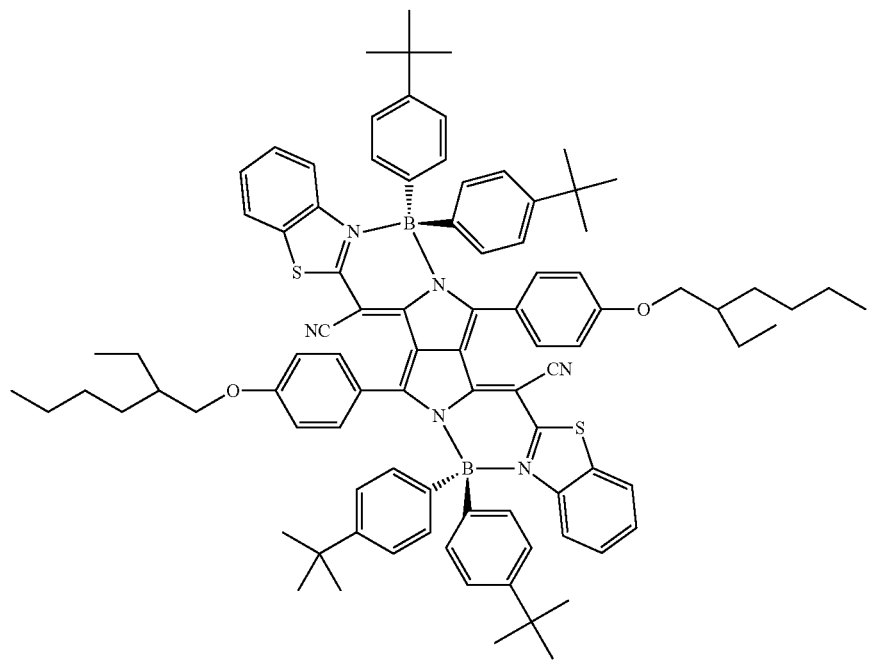

-continued
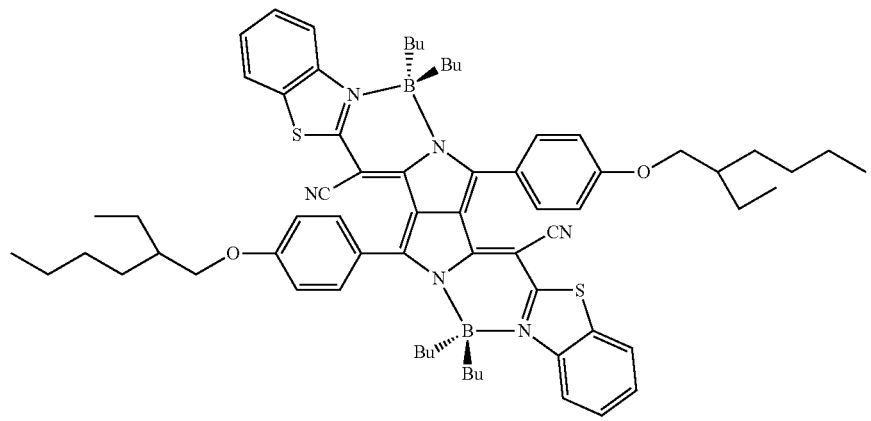
D-137
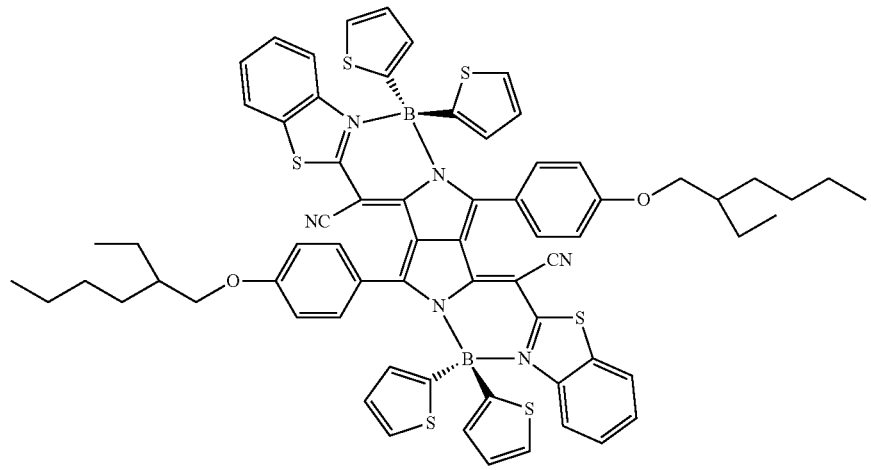
D-138
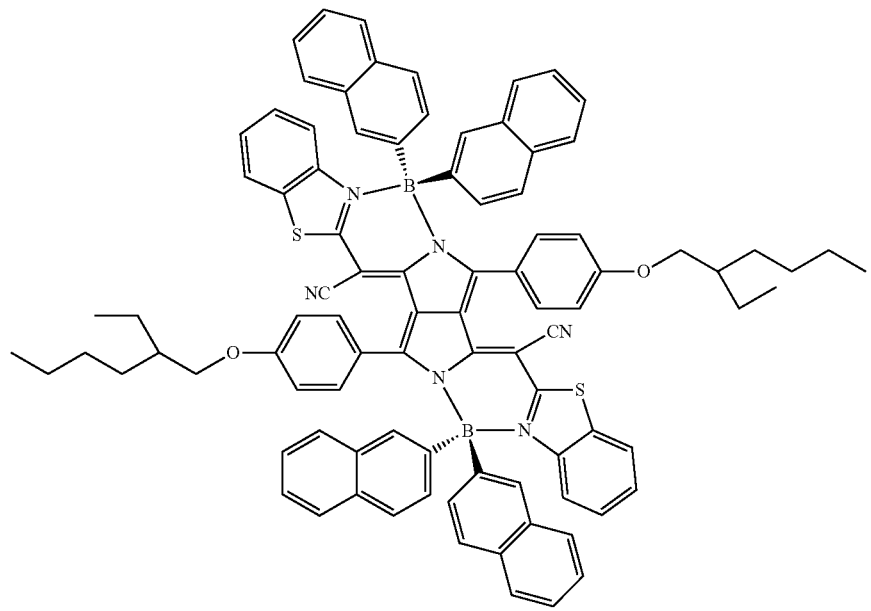
D-139

-continued
D-140
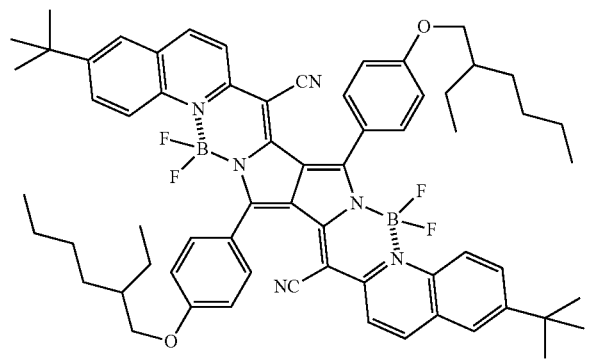
D-141
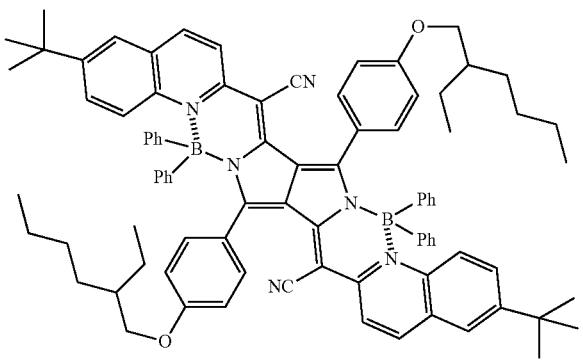
D-141A
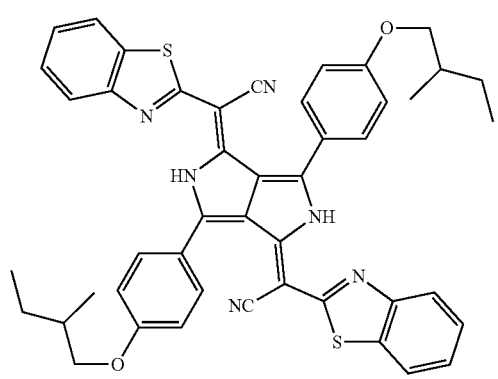
D-142
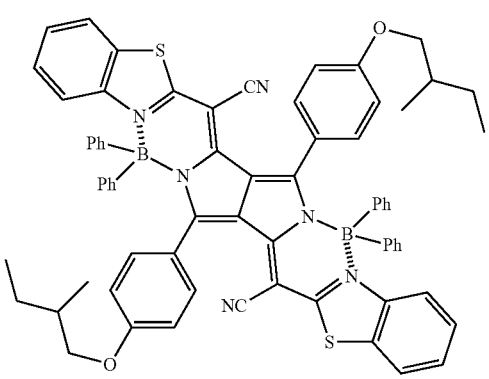
D-143
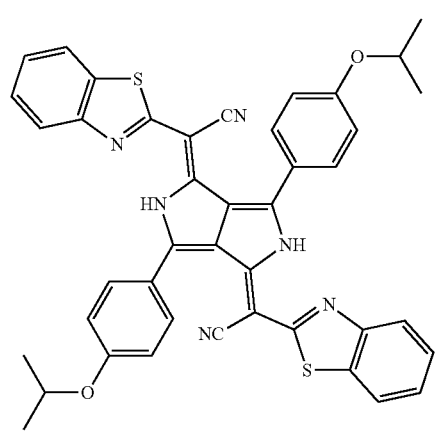
D-144
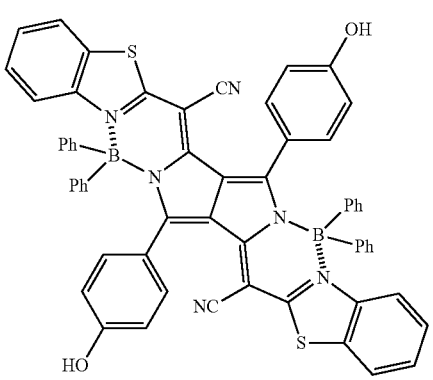
D-145
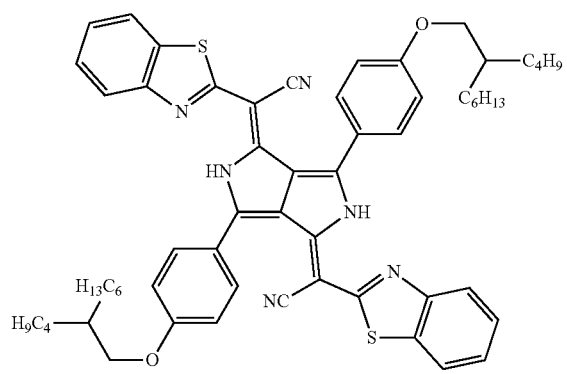
D-146
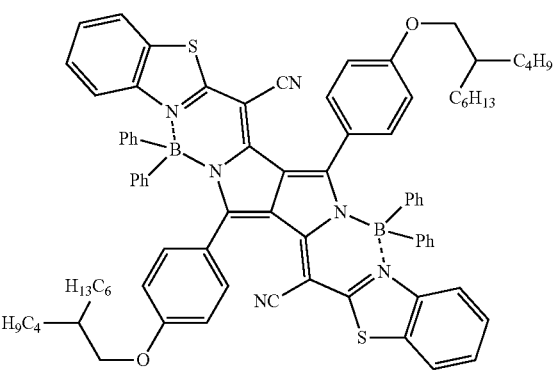

-continued
D-147
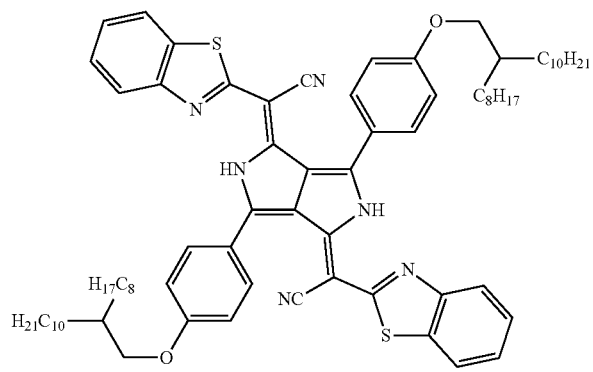
D-148
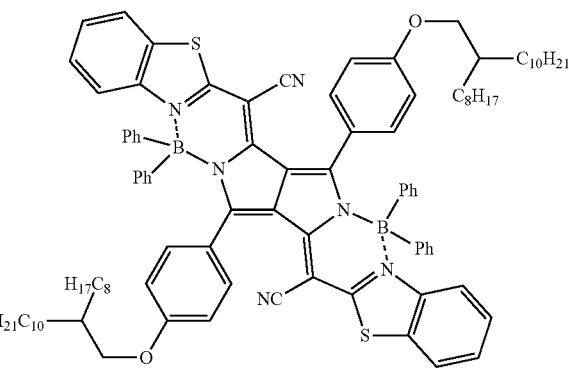
D-149
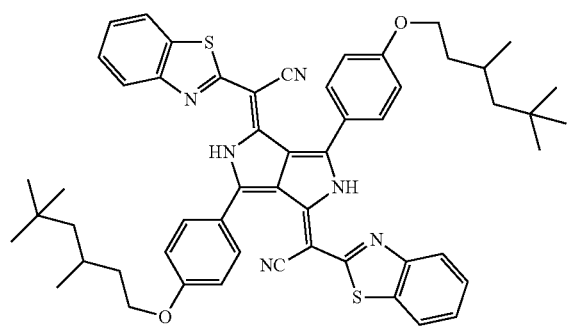
D-150
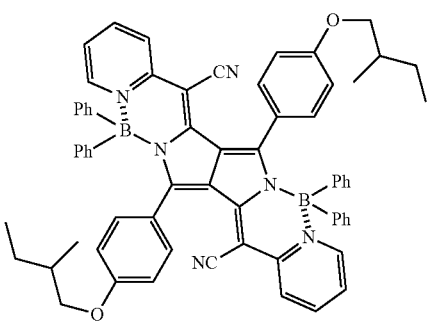
D-151
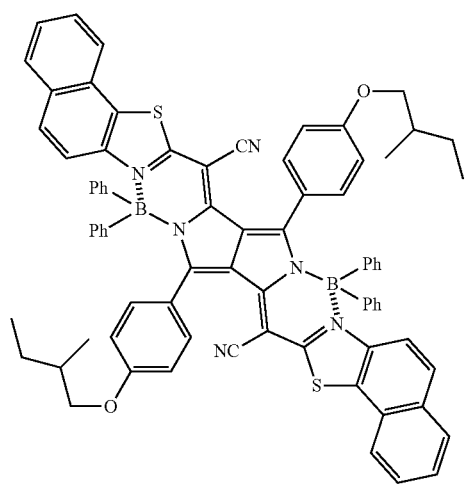
D-152
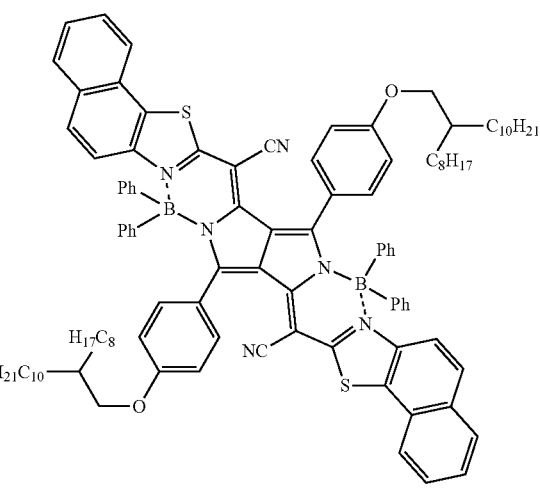
D-153
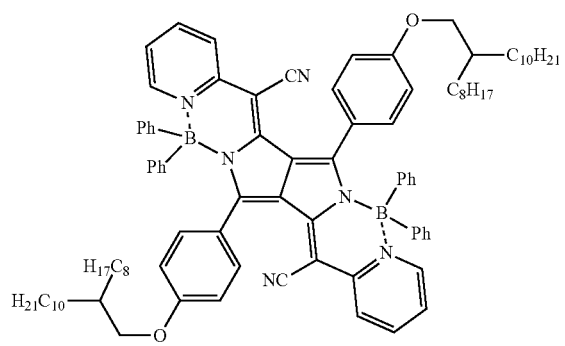
D-154
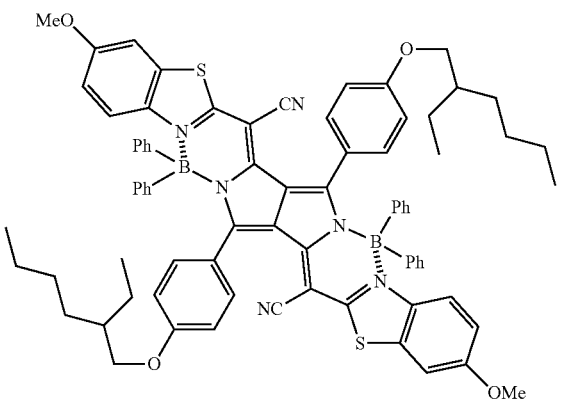

-continued

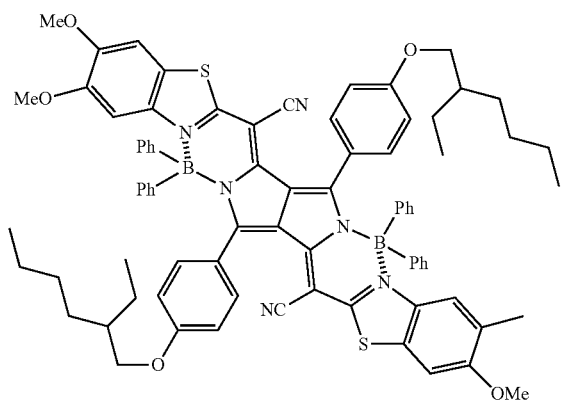
D-155

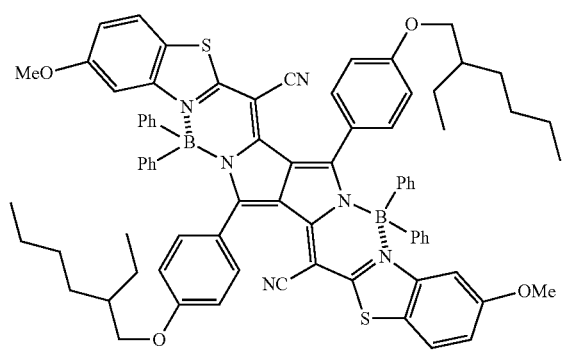
D-156

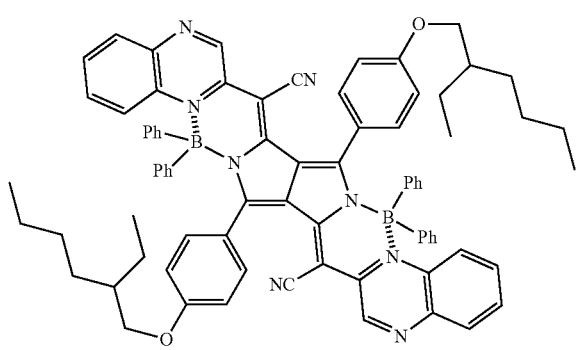
D-157

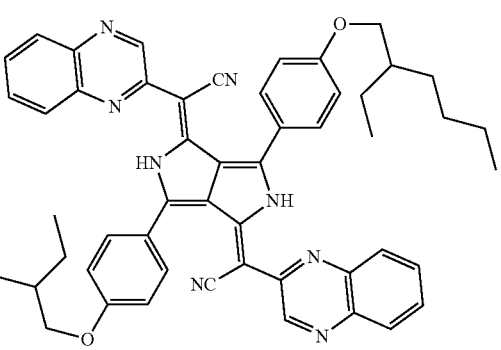
D-158

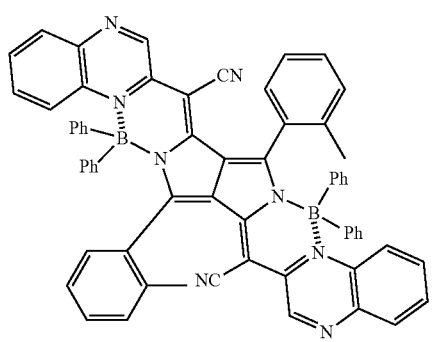
D-159

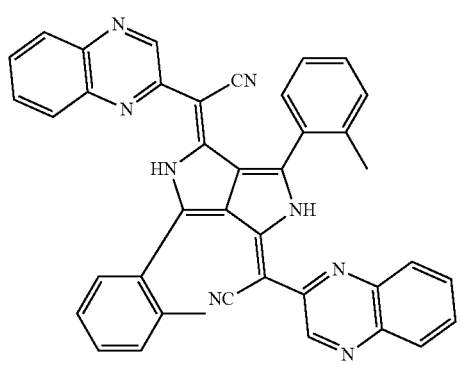
D-160

D-161

Hereinafter, a method for synthesizing the compound represented by any one of formulae (1) to (4) will be described.

The compound represented by any one of formulae (1) to (4) may be synthesized by condensing an active methylene compound with the corresponding diketopyrrolopyrrole compound and, as the case may be, further causing the resultant to react with a boron or a metal. The diketopyrrolopyrrole compound may be synthesized by a method described on pages 160 to 163 of "High Performance Pigments", Wiley-VCH, 2002. More specifically, the compound may be synthesized by a method in U.S. Pat. No. 5,969,154 or JP-A-9-323993. The condensation reaction between the diketopyrrolopyrrole compound and the active methylene compound or the subsequent boronization may be attained in accordance with the description of Non-Patent Document, Angewante Chemie International Edition of English, vol. 46, pp. 3750-3753 (2007). A reagent for the boronization may be synthesized with reference to J. Med. Chem. vol. 3, pp. 356-360 (1976). For example, bromocatechol borane may be commercially available from Tokyo Chemical Industry Co., Ltd.

In the second embodiment of the present invention, the compound represented by any one of formulae (1) to (4) have the absorption maximum of preferably from 700 to 1050 nm, more preferably from 700 to 1,000 nm, though it is not particularly limited. It is preferable that the compound represented by any one of formulae (1) to (4) selectively absorbs infrared rays having a wavelength of 700 nm or more and 1,000 nm or less.

In the first and third embodiments of the present invention, the compound represented by any one of formulae (1) to (4) have the absorption maximum of preferably from 700 to 1,200 nm, more preferably from 700 to 1,000 nm, though it is not particularly limited. It is preferable that the compound represented by any one of formulae (1) to (4) selectively absorbs infrared rays having a wavelength of 700 nm or more and 1,000 nm or less.

In the first and second embodiments of the present invention, the compound represented by any one of formulae (1) to (4) have the molar absorption coefficient $\epsilon$ of preferably from 50,000 to 300,000, more preferably from 100,000 to 250,000, though it is not particularly limited.

In the third embodiment of the present invention, the compound represented by any one of formulae (1) to (4) have the molar absorption coefficient $\epsilon$ of preferably from 50,000 to 500,000, more preferably from 100,000 to 300,000, though it is not particularly limited.

The compound represented by formula (1) can be preferably used as an IR dye. Since the compound should be invisible, the compound is preferably transparent. However, the compound may be colored into slight green or gray.

In the following, the near infrared absorptive liquid dispersion, aqueous ink, aqueous ink for inkjet recording, and printed material of the first embodiment of the present invention will be explained.

The following will describe the liquid dispersion of the present invention.

The dispersing medium of the near-infrared absorptive liquid dispersion of the present invention is preferably an aqueous solvent. The aqueous solvent herein means water, or a solvent comprised mainly of water (preferably in an amount of 60% or more by mass) and containing a water-soluble organic solvent such as an alcohol. Specific examples of the water-soluble organic solvent include methanol, ethanol, propanol, isopropanol, butanol, isobutanol, ethylene glycol, diethylene glycol, triethylene glycol, polyethylene glycol, propylene glycol, dipropylene glycol, polypropylene glycol, glycerin, hexanetriol, ethylene glycol monomethyl ether, ethylene glycol monoethyl ether, ethylene glycol monobutyl ether, diethylene glycol monomethyl ether, diethylene glycol monobutyl ether, N,N-dimethylacetamide, diemethylsulfoxide, sulfolane, 2-pyrrolidone, N-methyl-2-pyrrolidone, and acetonitrile. The near-infrared absorptive compound is preferably used in an aqueous dispersed fine-particle state. The term "aqueous dispersed fine-particle" herein refers to fine-particles dispersed in an aqueous solvent as a dispersing medium. In this case, the water-solubility of the near-infrared absorptive compound is preferably substantially zero.

When the near-infrared absorptive compound is used in an aqueous dispersed fine-particle state, molecules of the compound inside the fine-particles cause association and therefore a high light resistance and humidity-and-heat resistance can be imparted.

In the present invention, a device for measuring the particle diameter of fine-particles may be a nano-track UPA particle diameter analyzer (trade name: UPA-EX150, manufactured by Nikkiso Co., Ltd.). The measurement is made by putting 3 mL of a fine-particle-dispersion into a measuring cell, and then making an operation in accordance with a predetermined measuring method. As the viscosity and the dispersed particle density as parameters to be input at the time of the measurement, the solvent viscosity and the fine-particle density are to be used, respectively.

The average particle diameter of the fine-particles is preferably 0.5 µm or less, more preferably 250 nm or less, even more preferably 150 nm or less, and even more preferably 120 nm or less. The lower limit of the average particle diameter is not particularly limited, and is usually 1 nm or more. The average particle diameter of fine-particles means the average particle diameter of the fine-particles themselves, or the average particle diameter of the additive-adhering fine-particles in the case where an additive such as a dispersing agent adheres onto the fine-particles.

With respect to ordinary pigments and the like, the following is known: as the average particle diameter of dispersed fine-particles thereof becomes smaller, the surface area of the fine-particles becomes larger; as a result thereof, the color developability thereof becomes higher and the absorption spectrum becomes sharper; however, the fastness becomes lower at the same time. It is also known that as the average particle diameter of the dispersed fine-particles becomes smaller, the aggregative force of the fine-particles becomes stronger, and thus a fine-particle-dispersion higher in storage stability is not easily obtained. However, the dispersed fine-particles in the present invention are high in fastness and excellent in storage stability although the fine-particles are small in average particle diameter and exhibit a sharp absorption spectrum.

The content of the near-infrared absorptive compound in the liquid dispersion of the present invention is preferably from 0.01 to 30% by mass, more preferably from 0.1 to 5% by mass. When the content is set in the range, necessary near-infrared absorptive performance and properties, such as dispersion stability, can be obtained.

The maximum absorption wavelength of the liquid dispersion of the present invention is preferably in a range from 700 nm to 1200 nm, more preferably from 700 nm to 1000 nm.

The absorbance of the liquid dispersion of the present invention at 550 nm is preferably ¼ or less of the absorbance at the maximum absorption wavelength, more preferably ⅕ or less thereof.

When the aqueous dispersed fine-particles of the near-infrared absorptive compound are produced, the dispersion quality thereof may be improved by use of a surfactant and a dispersing agent. Examples of the surfactant include an anionic surfactant, a nonionic surfactant, a cationic surfactant, and an amphoteric surfactant. Any one of these surfactants may be used. Preferably, an anionic or nonionic surfactant is used.

Examples of the anionic surfactant include fatty acid salts, alkylsulfates, alkylbenzenesulfonates, alkylnaphthalenesulfonates, dialkylsulfosuccinates, alkyldiarylether disulfonates, alkylphosphates, polyoxyethylene alkylether sulfates, polyoxyethylene alkylarylether sulfates, naphthalenesulfonic acid/formalin condensates, polyoxyethylene alkylphosphates, glycerol borate fatty acid esters, and polyoxyethylene glycerol fatty acid esters.

Examples of the nonionic surfactant include polyoxyethylenealkyl ethers, polyoxyethylenealkylaryl ethers, polyoxyethyleneoxypropylene block copolymers, sorbitan fatty acid esters, polyoxyethylenesorbitan fatty acid esters, polyoxyethylenesorbitan fatty acid esters, glycerol fatty acid esters, polyoxyethylene fatty acid esters, polyoxyethylenealkylamines, fluorine-based surfactants, and silicon-based surfactants.

As a dispersing machine for producing the aqueous dispersed fine-particles, use can be made of, for example, a ball mill, a sand mill, a bead mill, a roll mill, a jet mill, a paint shaker, an attriter, an ultrasonic dispersing machine, or a Disper. The method for preparing the liquid dispersion of the present invention is preferably a method of adding the near-infrared absorptive compound to a dispersing medium, and then dispersing fine-particles of the compound into the medium in the dispersing machine.

Alternatively, the method of preparing the liquid dispersion by use of the near-infrared absorptive compound made into fine-particles in advance can be employed. Specifically, the fine-particles to be used may be fine-particles obtained by subjecting the near-infrared absorptive compound obtained as a crude crystal to fine-particle-controlling treatments (for example, a milling treatment such as solvent salt milling, salt milling, dry milling, solvent milling, or acid pasting, and a solvent heating treatment) followed by a surface treatment with a resin, a surfactant, a dispersing agent, or the like.

The ink of the present invention is an ink for inkjet recording or a printing ink which contains the aforementioned near-infrared absorptive liquid dispersion.

The ink of the present invention can be produced by use of the near-infrared absorptive liquid dispersion wherein fine-particles of the near-infrared absorptive compound are dispersed in an ink medium. In this case, it is preferred to use an aqueous medium. As required, another additive(s) may be incorporated. Examples of such an additive include a resin, a drying inhibitor (a wetting agent), a fading-preventing agent, an emulsion stabilizer, a penetration accelerator, a preservative, a mildew-proofing agent, a pH-adjusting agent, a surface-tension-adjusting agent, an antifoaming agent, a viscosity-adjusting agent, a dispersing agent, a dispersion stabilizer, a rust-proofing agent, a chelating agent, and the like. In the case of water-soluble ink, these various additives are directly added to the ink liquid. In the case that an oil-soluble dye is used in a dispersion form, the additives are generally added to a dye dispersion after its preparation but they may be added to an oily phase or an aqueous phase at the time of preparation.

The ink medium may be any one of ink media for lithographic ink, ink for gravure printing, ink for inkjet recording, ultraviolet curable ink, and others, and is not particularly limited. Of these ink media, a particularly preferred ink medium is an aqueous medium, which is made mainly of water. In the present invention, the water used in the ink is preferably ion exchanged water, or ion-exchanged distilled water.

The above resin is used to form a coating film on a material for printing, cause dye fine-particles to be dispersed therein, and protect the fine-particles. A preferred species of the resin is varied in accordance with the kind of the printing ink. The resin is preferably a water-soluble resin or a water-dispersible resin. Examples thereof include acrylic resin, styrene acrylic resin, styrene maleic acid resin, vinyl resin, polyester resin, polyurethane resin, epoxy resin, and phenol resin.

From the viewpoint of printing stability and physical properties of coated film, a water-dispersible resin is preferred, and examples thereof include acrylic resin, vinyl resin, polyurethane resin, and polyester resin.

Examples of the acrylic resin include a homopolymer of any monomer of acrylic acid, acrylate such as alkyl acrylate, acrylamide, acrylonitrile, methacrylic acid, methacrylate such as alkyl methacrylate, methacrylamide and methacrylonitrile, and a copolymer obtained through polymerization of two or more such monomers. Of those, preferred are a homopolymer of any monomer of acrylate such as alkyl acrylate and methacrylate such as alkyl methacrylate, and a copolymer obtained through polymerization of two or more such monomers. For example, they include a homopolymer of any monomer of acrylate and methacrylate having an alkyl group having 1 to 6 carbon atoms; and a copolymer obtained through polymerization of two or more such monomers. The acrylic resin is a polymer that comprises the above-mentioned composition as its essential ingredient and is obtained partly by the use of a monomer having any group of a methylol group, a hydroxyl group, a carboxyl group and an amino group so as to be crosslinkable with a carbodiimide compound.

Examples of the vinyl resin include polyvinyl alcohol, acid-modified polyvinyl alcohol, polyvinyl formal, polyvinyl butyral, polyvinyl methyl ether, polyolefin, ethylene/butadiene copolymer, polyvinyl acetate, vinyl chloride/vinyl acetate copolymer, vinyl chloride/(meth)acrylate copolymer and ethylene/vinyl acetate copolymer (preferably ethylene/vinyl acetate/(meth)acrylate copolymer). Of those, preferred are polyvinyl alcohol, acid-modified polyvinyl alcohol, polyvinyl formal, polyolefin, ethylene/butadiene copolymer, and ethylene/vinyl acetate copolymer (preferably ethylene/vinyl acetate/acrylate copolymer). The vinyl resin of polyvinyl alcohol, acid-modified polyvinyl alcohol, polyvinyl formal, polyvinyl butyral, polyvinyl methyl ether and polyvinyl acetate may be, for example, so designed that a vinyl alcohol unit is kept remaining in the polymer so that the polymer may have a hydroxyl group and is crosslinkable with a carbodiimide compound; and the other polymer may be modified, for example, partly by the use of a monomer having any group of a methylol group, a hydroxyl group, a carboxyl group and an amino group so that the polymer is crosslinkable with the compound.

Examples of the polyurethane resin include polyurethanes that are derived from at least any one of polyhydroxy compounds (e.g., ethylene glycol, propylene glycol, glycerin, trimethylolpropane), aliphatic polyester-type polyols obtained through reaction of polyhydroxy compounds and polybasic compounds, polyether polyols (e.g., poly(oxypropylene ether) polyol, poly(oxyethylene-propylene ether) polyol), polycarbonate-type polyols, and polyethylene terephthalate polyols, or their mixture and a polyisocyanate. In the polyurethane resin, for example, the remaining hydroxyl group (i.e., unreacted) after the reaction of polyol and polyisocyanate may be utilized as a functional group crosslinkable with a carbodiimide compound.

Examples of the polyester resin include a polymer generally obtained through reaction of a polyhydroxy compound (e.g., ethylene glycol, propylene glycol, glycerin, trimethylolpropane) and a polybasic acid. In the polyester resin, for example, the remaining hydroxyl group or the carboxyl group (i.e., unreacted) after the reaction of the polyol and the polybasic acid may be utilized as a functional group crosslinkable with a carbodiimide compound. Needless-to-say, a third component having a functional group such as a hydroxyl group may be added to it.

Of the polymers mentioned above, preferred are acrylic resin and polyurethane resin; and more preferred is polyurethane resin.

The dispersed state of the aqueous dispersion of the polymer may be one in which the polymer is emulsified in a dispersion medium, one in which the polymer underwent emulsion polymerization, one in which the polymer underwent micelle dispersion, one in which the polymer molecules partially have a hydrophilic structure. The aqueous dispersion of the polymer in the present invention (referred to singly as aqueous dispersion) is described in "Gosei Jushi Emulsion (Synthetic Resin Emulsion)", compiled by Taira Okuda and Hiroshi Inagaki, issued by Kobunshi Kanko Kai (1978); "Gosei Latex no Oyo (Application of Synthetic Latex)", compiled by Takaaki Sugimura, Yasuo Kataoka, Souichi Suzuki, and Keishi Kasahara, issued by Kobunshi Kanko Kai (1993); Soichi Muroi, "Gosei Latex no Kagaku (Chemistry of Synthetic Latex)", issued by Kobunshi Kanko Kai (1970); and so forth. The dispersed particles preferably have a mean particle size (diameter) of about 1 to 50,000 nm, more preferably about 5 to 1,000 nm. The particle size distribution of the dispersed particles is not particularly limited, and the particles may have either wide particle-size distribution or monodispersed particle-size distribution.

For the aqueous dispersion, commercially available polymers as described in the following may be used:

SUPER FLEX 830, 460, 870, 420, 420NS (polyurethanes manufactured by Dai-ichi Kogyo Seiyaku Co., Ltd.), BOND-ICK 1370NS and 1320NS, and HYDRAN Hw140SF, WLS201, WLS202, and WLS213 (polyurethanes manufactured Dainippon Ink & Chemicals, Inc.), OLESTER UD350, UD500, and UD600 (polyurethanes manufactured by Mitsui Chemicals, Inc.), NEOREZ R972, R966, and R9660 (polyurethanes manufactured by Kusumoto Chemicals, Ltd.), FINETEX Es650 and Es2200 (polyesters manufactured by Dainippon Ink & Chemicals, Inc.), VYLONAL MD1100, MD1400, and MD1480 (polyesters manufactured by Toyobo Co., Ltd.), JURIMAR ET325, ET410, AT-613, and SEK301 (acrylic resin manufactured by Nihon Junyaku Co., Ltd.), BONCOAT AN117, and AN226 (acrylic resin manufactured by Dainippon Ink & Chemicals, Inc.), LUCKSTAR DS616, DS807 (styrene-butadiene rubber manufactured by Dainippon Ink & Chemicals, Inc.), NIPPOL LX110, LX206, LX426, and LX433 (styrene-butadiene rubber manufactured by ZEON CORPORATION), and NIPPOL LX513, LX1551, LX550, and LX1571 (acrylonitrile-butadiene rubber manufactured by ZEON CORPORATION), each of which is a trade name.

The drying inhibitor is preferably used for the purpose of preventing clogging from being occurred at an ink injection port of a nozzle to be used in the inkjet recording system, in which the clogging may be caused due to drying of the inkjet ink.

The drying inhibitor is preferably a water soluble organic solvent having a vapor pressure lower than water. Specific examples thereof include polyhydric alcohols represented by ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin, trimethylol propane, and the like; lower alkyl ethers of polyhydric alcohols, such as ethylene glycol monomethyl (or monoethyl)ether, diethylene glycol monomethyl (or monoethyl)ether, triethylene glycol monoethyl (or monobutyl)ether, or the like; heterocyclic compounds such as 2-pyrrolidone, N-methyl-2-pyrrolidone, 1,3-dimethyl-2-imidazolidinone, N-ethylmorpholine, and the like; sulfur-containing compounds, such as sulfolane, dimethylsulfoxide, 3-sulfolene, and the like; polyfunctional compounds, such as diacetone alcohol, diethanolamine, and the like; and urea derivatives. Of these, polyhydric alcohols, such as glycerin, diethylene glycol, and the like are more preferable. The drying inhibitor may be used singly, or two or more of them may be used in combination. The drying inhibitor is preferably contained in the ink in an amount of 10 to 50% by mass.

The penetration accelerator is preferably used for the purpose of better penetration of the inkjet ink into paper. As the penetration accelerator, alcohols, such as ethanol, isopropanol, butanol, di(tri)ethylene glycol monobutyl ether, 1,2-hexanediol, and the like; sodium laurylsulfate, sodium oleate, nonionic surfactants, and the like can be used. When the penetration accelerator is contained in the ink in an amount of 5 to 30% by mass, sufficient effects are usually exhibited, and it is preferable to use it within a range of addition amount where bleeding of the printed characters or print-through do not occur.

The fading-preventing agent is used for the purpose of enhancing the storability of the resultant image. As the fading-preventing agent, various organic or metal complex-based fading-preventing agents can be used. Examples of the organic fading-preventing agents include hydroquinones, alkoxyphenols, dialkoxyphenols, phenols, anilines, amines, indanes, chromans, alkoxyanilines, heterocyclic compounds, and the like. Examples of metal complex fading-preventing agents include nickel complexes, zinc complexes, and the like. More concretely, use may be made of compounds described in the patents cited in Research Disclosure No. 17643 Chapter VII, items I to J, ibid., No. 15162, ibid., No. 18716, page 650, left column, ibid., No. 36544, page 527, ibid., No. 307105, page 872, ibid., No. 15162; compounds falling within formulas of representative compounds and compound examples described in JP-A-62-215272, pages 127 to 137.

Examples of the mildew-proofing agent include sodium dehydroacetate, sodium benzoate, sodium pyridinethion-1-oxide, ethyl p-hydroxybenzoate, 1,2-benzisothiazolin-3-one, and salts thereof. It is preferable to use the mildew-proofing agent in the ink in an amount of 0.02 to 1.00% by mass.

As the pH-adjusting agent, the above neutralizing agents (organic bases and inorganic alkalis) can be used. For the purpose of enhancing the storage stability of the inkjet ink, the pH-adjusting agent is added such that the inkjet ink preferably has a pH of 6 to 10, and more preferably a pH of 7 to 10.

Examples of the surface-tension-adjusting agent include nonionic, cationic, or anionic surfactants. The surface tension of the inkjet ink of the present invention is preferably from 20 to 60 mN/m, and more preferably from 25 to 45 mN/m. The viscosity of the inkjet ink of the present invention is preferably set to 30 mPa·s or less, more preferably 20 mPa·s or less. Examples of the preferable surfactant include anionic surfactants, such as fatty acid salts, alkylsulfuric acid ester salts, alkylbenzenesulfonic acid salts, alkylnaphthalenesulfonic acid salts, dialkylsulfosuccinic acid salts, alkylphosphoric acid ester salts, naphthalenesulfonic acid formalin condensates, polyoxyethylene alkylsulfuric acid ester salts, and the like; and nonionic surfactants, such as polyoxyethylene alkyl ethers, polyoxyethylene alkyl allyl ethers, polyoxyethylene fatty acid esters, sorbitan fatty acid esters, polyoxyethylene sorbitan fatty acid esters, polyoxyethylene alkylamines, glycerin fatty acid esters, oxyethylene/oxypropylene block copolymers, and the like. Also, SURFYNOLS (trade name, manufactured by Air Products & Chemicals), which is an acetylene-type polyoxyethyleneoxide surfactant, can be preferably used. Moreover, an amine oxide-type amphoteric surfactant, such as N,N-dimethyl-N-alkylamine oxide, and the like, is also preferable. Furthermore, surfactants described in JP-A-59-157636, pp. (37)-(38), and Research Disclosure No. 308119 (1989) can also be used.

As the antifoaming agent, fluorine-containing compounds, silicone type compounds, and chelating agents represented by EDTA can be used, if necessary.

As described above, the ink of the present invention preferably contains an aqueous medium. As the aqueous medium, a mixture containing water as a main component and a water-miscible organic solvent as an optional component may be used. Examples of the water-miscible organic solvent include alcohols (e.g., methanol, ethanol, propanol, iso-propanol, butanol, isobutanol, sec-butanol, t-butanol, pentanol, hexanol, cyclohexanol, and benzylalcohol), polyhydric alcohols (e.g., ethylene glycol, diethylene glycol, triethylene glycol, polyethylene glycol, propylene glycol, dipropylene glycol, polypropylene glycol, butylene glycol, hexanediol, pentanediol, glycerin, hexanetriol, and thiodiglycol), glycol derivatives (e.g., ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, and ethylene glycol monophenyl ether), amines (e.g., ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, and tetramethylpropylenediamine), and other polar solvents (e.g., formamide, N,N-dimethylformamide, N,N-dimethylacetamide, dimethyl sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, and acetone). These water-miscible organic solvents may be used as a mixture of two or more.

The details of methods of preparing the inkjet-recording ink are described in JP-A-5-148436, JP-A-5-295312, JP-A-7-97541, JP-A-7-82515, JP-A-7-118584, JP-A-11-286637, and the publications of Japanese Patent Applications No. 2000-87539, No. 2000-80259, No. 2000-78491 and No. 2000-203857. These methods can also be utilized in the preparation of the ink of the present invention.

As the ink of the present invention, it is preferable that the near-infrared absorptive compound is contained in an amount of 0.2 to 20 mass %, more preferably 0.1 to 10 mass %. The ink of the present invention may contain another dye(s), together with the near-infrared absorptive compound. In the case where two or more kinds of dyes are used in combination, it is preferable that the total content of the above dye and said another dye(s) falls within the aforementioned range.

Furthermore, in the case where a single-color image is to be formed or even in the case where a full-color image is to be formed, the near-infrared absorptive liquid dispersion of the present invention may contain a visible absorptive dye or pigment, which is used in the usual inkjet-recording ink. Alternatively, the ink composed of the near-infrared absorptive liquid dispersion of the present invention may be used together with any of those inks for inkjet recording. For the formation of a full-color image, a magenta-tone ink, a cyan-tone ink, and a yellow-tone ink can be used. In addition, for adjustment of color tone, a black-tone ink may also be used.

The recording medium to which the ink of the present invention is to be applied is not particularly limited, and may be a paper such as ordinary uncoated paper or coated paper, a nonabsorptive resin material of various types, which is used in the so-called soft packaging, or a resin film obtained by forming the resin material into a film shape. Examples of the paper include pure white roll paper, craft paper, paperboard, fine quality paper, OCR paper, art paper, coated paper, mirror coated paper, condenser paper, and paraffin paper. A composite paper material may also be used, the material being, for example, a processed paper, wherein a paper is combined with a film made of a plastic such as polyester, polypropylene, cellophane, acetate, vinyl chloride, polycarbonate, or acrylic resin, or a metal such as copper or aluminum. Examples of the plastic film include a PET film, an OPS film, an OPP film, an ONy film, a PVC film, a PE film, and a TAC film.

In the following, the near infrared absorptive composition and near infrared absorptive coated material of the second embodiment of the present invention will be explained.

In the near-infrared absorptive composition of the present invention, the content by percentage of the near-infrared absorptive compound is preferably 5% or more by mass of the solid content of the transparent resin (binder), more preferably 10% or more by mass thereof in order for the composition to effectively gain infrared ray shielding effect. In order for the composition to keep physical properties of the transparent resin, the content by percentage of the near-infrared absorptive dye is preferably controlled into 50% or less by mass.

The near-infrared absorptive compound for the near-infrared absorptive layer is preferably in a state of fine particles, forming an aqueous dispersion.

The term "aqueous dispersed fine-particles" herein refers to such fine particles dispersed in a dispersing medium, e.g. water.

When the near-infrared absorptive compound is used in an aqueous dispersed fine-particle state, it enables to provide the near-infrared absorptive layer with a high fastness to light and a high humidity-and-heat resistance, owing to association of the compounds inside the fine particles.

When the aqueous dispersed fine-particles of the near-infrared absorptive compound are produced, the dispersion quality thereof may be improved by use of a surfactant and a dispersing agent. Examples of the surfactant include an anionic surfactant, a nonionic surfactant, a cationic surfactant, and an amphoteric surfactant. Any one of these surfactants may be used. An anionic or nonionic surfactant is preferably used.

Examples of the above anionic surfactant and nonionic surfactant are the same as those described for use in the preparation of the liquid dispersion according to the first embodiment of the present invention.

A dispersing machine for producing the aqueous dispersed fine-particles is, for example, a ball mill, a sand mill, a bead mill, a roll mill, a jet mill, a paint shaker, an attriter, an ultrasonic dispersing machine, or a Disper.

The volume-average particle diameter of the fine-particles is preferably 10 nm or more and 250 nm or less, more preferably 20 nm or more and 200 nm or less. The volume-particle diameter of fine-particles means the particle diameter of the fine-particles themselves, or the following when an additive such as a dispersing agent adheres onto the fine-particles: the particle diameter of the additive-adhering fine-particles.

In the present invention, a device for measuring the volume-average particle diameter of fine-particles may be nanotrack UPA particle diameter analyzer (trade name: UPA-EX150, manufactured by Nikkiso Co., Ltd.). The measurement is made by putting 3 mL of a fine-particle-dispersion into a measuring cell, and then making an operation in accordance with a predetermined measuring method.

Viscosity and dispersed particle density as parameters to be input at the time of the measurement, ink viscosity and fine-particle density are used, respectively.

If the number-average particle diameter of the fine-particles in the dye (pigment)-dispersion is less than 10 nm, the storage stability may not be ensured. On the other hand, if the diameter is more than 250 nm, the optical density may be lowered.

(ii) Hydrophobic Polymer

As described above, the near-infrared absorptive composition of the present invention contains at least a hydrophobic polymer.

As the hydrophobic polymer used in the near-infrared absorptive composition of the present invention, a single kind thereof may be used alone or, if necessary, two or more kinds thereof may be used in a mixture form.

The molecular weight of the hydrophobic polymer used in the near-infrared absorptive composition of the present invention is not particularly limited. Usually, the weight-average molecular weight is preferably from about 3,000 to about 1,000,000. If the weight-average molecular weight is less than 3,000, the composition may give a coated (or painted) layer insufficient in strength. If the molecular weight is more than 1,000,000, the composition may give a poor coating (or painted) surface state.

The hydrophobic polymer used in the present invention preferably forms an aqueous dispersion of a hydrophobic organic resin (polymer), wherein the organic resin is dispersed in a dispersing medium (referred to as a solvent in the specification as the case may be) that is comprised mainly of water.

The water content by percentage in the solvent is preferably from 30 to 100% by mass, more preferably from 50 to 100% by mass, and even more preferably from 70 to 100% by mass. The solvent other than water is preferably a solvent having a water-solubility, for example, alcohols such as methanol, ethanol or isopropyl alcohol, ketones such as acetone or methyl ethyl ketone, tetrahydrofuran, or butyl cellosolve.

In the near-infrared absorptive composition of the present invention, the content of the hydrophobic polymer (preferably, the content of the aqueous dispersion of the polymer) is preferably from 0.2 to 10 g/m$^2$. If the content is less than 0.2 g/m$^2$, at the time of forming a near-infrared absorptive coated material, which will be detailed later, the film strength of its near-infrared absorptive layer or the adhesion thereof on its support may become small or weak. If the content is more than 10 g/m$^2$, there may be caused the following problems: a fall in the coatability (paintability), coating-(or painting-) unevenness, and a rise in the haze at high temperature and high humidity.

The hydrophobic organic resin (polymer) may be one out of various resins, such as an acrylic resin, a vinyl resin, a polyurethane resin and a polyester resin. However, only a water-soluble polymer (such as gelatin, polyvinyl alcohol or carboxymethylcellulose) cannot be used as a binder in the present invention. If only a water-soluble polymer is used as the binder, there is caused a problem that the near-infrared absorptive compound decomposes at high temperature and high humidity. When a water-soluble polymer is incorporated into the near-infrared absorptive layer, the aqueous dispersion of the polymer needs to be present in the same layer. Preferably, the aqueous dispersion is coated to give a solid content of 0.2 to 10 g/m$^2$. When a water-soluble polymer is added thereto, the amount thereof is preferably 0.2 g/m$^2$ or less.

When a near-infrared absorptive coated material, which will be detailed later, is formed, in order to make good the adhesion between its organic resin (polymer) layer and its support, it is allowable to incorporate a hardener (such as a carbodiimide compound) into the near-infrared absorptive composition of the present invention, and harden the composition with the hardener at the time of the formation of the coated material. In the present invention, from the viewpoint of maintaining good working environments and of preventing air pollution, it is preferable that both the polymer and the hardener such as carbodiimide compound are used as an aqueous dispersion state of an emulsion form.

It is preferred that the polymer having a crosslinkable group of any one of a methylol group, a hydroxyl group, a carboxyl group and an amino group in order that it may crosslink with a hardener such as a carbodiimide compound. Preferred are a hydroxyl group and a carboxyl group; and more preferred is a carboxyl group. The content of the crosslinkable group such as the hydroxyl group and the carboxyl group in the polymer is preferably from 0.0001 to 1 equivalent/kg, more preferably from 0.001 to 1 equivalent/kg.

Examples and preferred examples of the acrylic resin, vinyl resin, polyurethan resin, and polyester resin, and those of the dispersed state of the aqueous dispersion of the above-mentioned polymers, and examples of the commercially available polymers usable in preparing an aqueous dispersion are the same as those described for the aqueous ink according to the first embodiment of the present invention.

(iii) Coated Film

The following will describe the near-infrared absorptive coated material of the present invention, which may be referred to as the near-infrared absorptive coated film hereinafter.

The near-infrared absorptive coated film of the present invention may be produced by preparing the near-infrared absorptive composition, which contains the near-infrared absorptive compound and the aqueous dispersion of the polymer, and then coating the near-infrared absorptive composition onto a support so as to form a near-infrared absorptive layer.

The method for coating the near-infrared absorptive layer may be selected from a dip coating method, a roller coating method, a spray coating method, a gravure coating method, a bar coating method, a die coating method, and other coating methods. According to these coating methods, a continuous process can be attained. Thus, the methods are better in productivity than a vapor deposition method and other batch-type methods. Spin coating, which makes it possible to form a thin and even coated film, may be adopted.

The support on which the coated layer is carried may be a support (such as a plastic film made of a polyester or the like) before successive biaxial drawing, before simultaneous biaxial drawing, after monoaxial drawing and before re-drawing, or after biaxial drawing. The surface of the plastic support onto which the coating liquid is to be coated is preferably subjected, in advance, to a surface treatment such as an ultraviolet radiating treatment, a corona discharge treatment, or a glow discharge treatment.

As the near-infrared absorptive layer, two or more layers may be laid. The film thickness of the near-infrared absorptive layer(s) is preferably 0.1 μm or more per layer in order for the layer to effectively gain a near-infrared ray shielding effect. The film thickness is preferably 10 μm or less, particularly preferably from 0.3 to 3 μm per layer since the solvent does not remain easily at the time of the formation of the film and the operation for forming the film is easy.

When the near-infrared absorptive coated film of the present invention is formed, it is preferred that after the near-infrared absorptive composition is applied to coating, the coated composition is heated and dried. According to the heating and drying, molecules of the polymer are melted so as to be bonded to each other so that the light resistance and the humidity-and-heat resistance of the coated film can be improved. Conditions for the heating and drying are not particularly limited. Specifically, the heating and drying are conducted preferably at 100 to 150° C. for 1 to 10 minutes, more preferably at 100 to 130° C. for 1 to 5 minutes.

When the near-infrared absorptive coated film of the present invention is applied onto a transparent support to form an optical filter, the support may be a plastic film, a plastic plate, a glass plate, or the like.

Examples of the raw material of the plastic film or the plastic plate include polyesters such as polyethylene terephthalate (PET), and polyethylene naphthalate; polyolefins such as polyethylene (PE), polypropylene (PP), polystyrene, and EVA; vinyl resins such as polyvinyl chloride, and polyvinylidene chloride; and other resins, such as polyetheretherketone (PEEK), polysulfone (PSF), polyethersulfone (PES), polycarbonate (PC), polyamide, polyimide, acrylic resin, triacetylcellulose (TAC).

In the present invention, the plastic film is preferably a polyethylene terephthalate film or triacetylcellulose (TAC) film from the viewpoint of transparency, heat resistance, handleability and cost.

For an application for which transparency is required, such as a near-infrared absorptive filter for a display, it is preferred that the transparency of the support is high. With respect to the plastic film or plastic plate in this case, the overall visible ray transmittance is preferably from 70 to 100%, more preferably from 85 to 100%, and in particular preferably from 90 to 100%. In the present invention, a film or plate colored to a degree that the attainment of the objects of the present invention is not hindered may be used as the plastic film or plastic plate.

The plastic film or plastic plate in the present invention may be a monolayered film or plate, or multilayered film or plate, wherein two or more layers are combined with each other.

When a glass plate is used as the support in the present invention, the kind thereof is not particularly limited. When the coated material of the present invention is used for an electromagnetic wave shield film for a display, it is preferred to use a hardened glass piece, wherein a hardened layer is laid on each surface of a glass piece. Hardened glass has a higher possibility that the glass can be prevented from being broken than glass not subjected to hardening treatment. Furthermore, even if hardened glass yielded by the rapid air-cooling method is broken, broken pieces thereof are small and further broken faces thereof are not sharp. Thus, the glass is preferred for safety.

With respect to the near-infrared absorptive coated material of the present invention, the absorptivity in the near-infrared range is preferably 50% or more, more preferably 70% or more. The absorptivity in the visible range (450 nm to 650 nm) is preferably 30% or less, more preferably from 20 to 0%.

The absorptivity is a value representing the percentage of the absorbance at a measurement wavelength, relative to the absorbance at λmax to be 100%.

(iv) Other Functional Layers

The different functionality may be imparted to the near-infrared absorptive coated film of the present invention, if necessary. Alternatively, a functional layer having a functionality different from that of the near-infrared absorptive layer may be arranged thereon. Such a functional layer may be made into various types in accordance with the use purpose of the coated film. For example, for an electromagnetic wave shield material for a display, the following may be arranged: an anti-reflection layer having an anti-reflection function by the adjustment of the refractive index or film thickness; a non-glare layer or an anti-glare layer (both of the layers have a glare-preventing function); a layer which absorbs visible rays in a specific wavelength range to exhibit a color tone adjusting function; a stainproof layer having a function of causing stains, such as fingerprints, to be easily removed; a hard coat layer, which is not easily scratched; a layer having an impact absorbing function; a layer having a function of preventing a glass piece from scattering when the piece is broken; or some other layer. The functional layer may be laid on the near-infrared absorptive layer side of the support or the reverse side of the support.

(Antireflection Properties/Antiglare Properties)

The light-transmitting electromagnetic wave shield film is preferably provided with any of functionalities such as anti-reflection (AR) properties for inhibiting reflection of external light, antiglare (AG) properties for preventing reflection of mirror image and anti-reflection/anti-glare (ARAG) properties having both of the two properties in combination.

These properties can prevent the display screen from being difficultly viewed due to the reflection of illuminating unit. Further, the reduction of the visible light reflectance of the surface of the film makes it possible to not only prevent reflection but also enhance contrast or the like. The visible light reflectance of the light-transmitting electromagnetic wave shield film having a functional film having anti-reflection properties/anti-glare properties bonded thereto is preferably 2% or less, more preferably 1.3% or less, even more preferably 0.8% or less.

The aforementioned functional film can be formed by providing a functional film having anti-reflection properties/anti-glare properties on a proper transparent substrate.

The anti-reflection layer can be formed by forming a single thin layer of a fluorine-based transparent polymer resin, magnesium fluoride, silicon-based resin or silicon oxide to an optical thickness of ¼ wavelength or forming a laminate of two or more thin layers, whose refractive indexes are different from each other, of an inorganic compound such as metal oxide, fluoride, silicide, nitride or sulfide, silicon-based resin or organic compound such as acrylic resin and fluorine-based resin.

The anti-glare layer may be formed by a layer having a fine surface roughness of from about 0.1 μm to 10 μm. Specifically, the anti-glare layer can be formed by spreading an ink prepared by dispersing particles of an inorganic or organic compound such as silica, organic silicon compound, melamine and acrylic in a thermosetting or photosetting resin such as acrylic resin, silicon-based resin, melamine-based resin, urethane-based resin, alkyd-based resin and fluorine-based resin over the substrate, and then curing the resultant coat. The average particle diameter of the particles is preferably from about 1 μm to 40 μm.

The anti-glare layer can also be formed by spreading the aforementioned thermosetting or photosetting resin followed by pressing a mold having a desired gloss value or surface condition to the resultant and curing the resultant.

The haze of the light-transmitting electromagnetic wave shield film having an anti-glare layer provided thereon is preferably 0.5% or higher and 20% or lower, more preferably 1% or higher and 10% or lower. When the haze of the light-transmitting electromagnetic wave shield film is too small, the resulting light-transmitting electromagnetic wave shield film exhibits insufficient anti-glare properties. When the haze of the light-transmitting electromagnetic wave shield film is too great, the resulting light-transmitting electromagnetic wave shield film tends to have a lowered sharpness of transmitted image.

(Hard Coat Properties)

In order to render the near-infrared absorptive filter scratch-proof, it is also preferred that the functional film has hard coat properties. Examples of the hard coat layer include a hard coat formed by a thermosetting or photosetting resin such as acrylic resin, silicon-based resin, melamine-based resin, urethane-based resin, alkyd-based resin and fluorine-based resin. However, neither the kind of the material of the hard coat layer nor the method for forming the hard coat layer is specifically limited. The thickness of the hard coat layer is preferably from about 1 µM to 50 µm. When the aforementioned anti-reflection layer and/or anti-glare layer are formed on the hard coat layer, a functional film having scratch-proofness, anti-reflection properties and/or anti-glare properties can be obtained to advantage.

The surface hardness of the light-transmitting electromagnetic wave shield film thus provided with hard coat properties is preferably at least H, more preferably 2H, even more preferably 3H or harder as measured in terms of pencil hardness according to JIS (K-5400).

In the present invention, it is preferred that the near-infrared absorptive coated material has at least one of the electromagnetic wave shield layer, the hard coat layer, the anti-reflection layer, and the anti-glare layer, on the side reverse to the near-infrared absorptive layer side of the transparent support. In other words, the near-infrared absorptive layer is first formed on one of the surfaces of the transparent support. Thereafter, at least one of the electromagnetic wave shield layer, the hard coat layer, the anti-reflection layer and the anti-glare layer is formed on the other surface of the transparent support. Preferably, all of these layers are formed.

(Stainproofness)

A near-infrared absorptive filter which is stainproof can be protected against stain such as finger print or can be easily freed of any attached stain to advantage.

The stainproof functional film can be obtained, for example, by providing the transparent substrate with a stainproof compound. As the stainproof compound, use may be made of any compound which is nonwettable with water and/or oil and fat. Examples of such a compound include fluorine-containing compounds and silicon-containing compounds. Specific examples of the fluorine-containing compound include Optool (trade name, produced by DAIKIN INDUSTRIES, LTD.). Specific examples of the silicon-containing compound include Takata Quontum (trade name, produced by NOF Corporation).

(Ultraviolet Ray Blocking Properties)

The near-infrared absorptive filter is preferably provided with ultraviolet ray blocking properties for the purpose of preventing the deterioration of dyes or transparent substrate described later. The functional film having ultraviolet ray blocking properties can be formed by incorporating an ultraviolet absorber in the transparent substrate itself or by providing an ultraviolet-absorbing layer on the transparent substrate.

Referring to the ultraviolet blocking capability required to protect the dyes, the transmittance in the ultraviolet region of wavelength shorter than 380 nm is generally 20% or less, preferably 10% or less, more preferably 5% or less. The functional film having ultraviolet ray blocking properties can be obtained by forming a layer containing an ultraviolet absorber or an ultraviolet ray reflecting or absorbing inorganic compound on the transparent substrate. As the ultraviolet absorber, use may be made of any ultraviolet absorber such as benzotriazole-based compound and benzophenone-based compound. The kind and concentration of the ultraviolet absorber to be used herein depend on the dispersibility or solubility in the medium in which it is dispersed or dissolved, the desired absorption wavelength and absorption coefficient and the thickness of the medium and thus are not specifically limited.

The functional film having ultraviolet blocking properties preferably has little absorption in the visible light region and exhibits no remarkable drop of visible light transmittance or assumes no yellow color.

In the case where the functional film has a layer containing dyes described later formed therein, it is preferred that the layer having ultraviolet ray blocking properties be present outside the dye-containing layer.

As described in detail above, the near-infrared absorptive composition of the present invention or the coated film using the composition may be used for or as an optical filter. For example, it can be used as a filter for a plasma display that does not remarkably damage the brightness of the plasma display, cuts effectively near-infrared rays of wavelengths of about 800 to 1000 nm emitted from the display, and does not produce an adverse effect onto the wavelength used in a remote control switch of a surrounding electronic device, or in a transmission-system optical communication, or in some other device, to prevent a malfunction thereof. Alternatively, a near-infrared absorptive filter excellent in light resistance and humidity and heat resistance can be provided at low costs with a low environmental load.

In the following, the near infrared absorptive image-forming composition, ink composition, printed material, and electrophotographic toner of the third embodiment of the present invention will be explained.

The amount to be added of the compound represented by formula (1) in the near-infrared absorptive image-forming composition of the present invention can be appropriately adjusted according to a need, and the amount is preferably 0.01 to 50% by mass, more preferably 0.1 to 30% by mass in the near-infrared absorptive image-forming composition. When this amount is set to the lower limit or more, a significant near-infrared absorptivity can be favorably given to the composition. When the amount is set to the upper limit or less, invisibility can be favorably given thereto.

Methods of producing the solid fine-particle dispersion of the compound represented by formula (1) (preferably, the compound represented by any one of formulae (2) to (4)) are described in detail, for example, in "Ganryou Bunsan Gijyutsu—Hyoumenshori to Bunsanzai no Tsukaikata oyobi Bunsanseihyouka—(Technology of Pigment Dispersion—Surface Treatment and Way of Using Dispersant and Evaluation of Dispersion Properties—)" published by Kabushiki-kaisha Gijutsu Jouhoukyoukai; "Ganryou no Jiten (Encyclopedia of Pigment)" published by Kabushiki-kaisha Asakura Shoten; and "Saisin [Ganryou Bunsan] Jitsumu Nouhau-Jireisyu (The Newest [Pigment Dispersion] Practical Know-how and Case Examples" published by Kabushiki-kaisha Gijutsu Jouhoukyoukai. In order to obtain the dispersion of solid fine-particles, a usual dispersion machine can be used. Examples of the dispersion machine include a ball mill, a vibration ball mill, a planetary ball mill, a sand mill, a colloid mill, a jet mill, and a roller mill. JP-A-52-92716 and WO88/074794 disclose such dispersion machines. It is preferable to employ a medium dispersion machine of upright or lateral type.

The dispersion process may be carried out in the presence of an appropriate medium. The dispersion process may also be carried out with using a surfactant for dispersion. Preferred examples of the dispersing medium and the surfactant for dispersion vary in accordance with how the near-infrared absorptive image-forming composition is used, such as a printing ink or an electrophotographic toner.

When the near-infrared absorptive image-forming composition of the present invention is prepared, an ordinary surfactant or dispersing agent for pigment can be added to the composition, in order to improve the dispersibility of the solid fine-particle dispersion of the compound represented by any one of formula (1) to (4). Such a dispersant to be used can be selected from a wide variety of compounds, and examples thereof include phthalocyanine derivatives (e.g., EFKA-745 (trade name), a commercial product manufactured by EFKA); organosiloxane polymers (e.g., KP341 (trade name), produced by Shin-etsu Chemical Industry Co., Ltd.); (meth) acrylic (co)polymers (e.g., Polyflow No. 75, No. 90 and No. 95 (trade names), produced by Kyoei-sha Yushi Kagaku Kogyo); cationic surfactants (e.g., W001 (trade name), produced by Yusho Co., Ltd.); nonionic surfactants, such as polyoxyethylene lauryl ether, polyoxyethylene stearyl ether, polyoxyethylene oleyl ether, polyoxyethylene octyl phenyl ether, polyoxyethylene nonyl phenyl ether, polyethylene glycol dilaurate, polyethylene glycol distearate, and sorbitan fatty acid esters; anionic surfactants, such as WO04, WO05 and WO17 (trade names) (produced by Yusho Co., Ltd.); polymeric dispersants, such as EFKA-46, EFKA-47, EFKA-47EA, EFKA POLYMER 100, EFKA POLYMER 400, EFKA POLYMER 401, and EFKA POLYMER 450 (trade names, produced by Morishita Industries Co., Ltd.), and Disperse Aid 6, Disperse Aid 8, Disperse Aid 15, and Disperse Aid 9100 (trade names, produced by San Nopco Limited); various kinds of Solsperse dispersants, such as Solsperse 3000, 5000, 9000, 12000, 13240, 13940, 17000, 24000, 26000, 28000, and 55000 (trade names, produced by Zeneka); ADEKA PLURONIC L31, F38, L42, L44, L61, L64, F68, L72, P95, F77, P84, F87, P94, L101, P103, F108, L121, P-123 (trade names, product by Asahi Denka Co., Ltd.), and Isonet S-20 (trade name, produced by Sanyo Chemical Industries Co., Ltd.).

In addition, the graft copolymers, as described in JP-A-10-254133, containing, as the main chain unit thereof, a monomer unit having a particular acid amido group or a monomer unit having a quaternary ammonium salt group, have excellent function in finely dispersing a pigment or dye, and may be used as the dispersant. By using the graft copolymer above, it is possible to disperse the pigment or dye finely while the consumption of energy and period of time is reduced, as well as to prevent aggregation and sedimentation of the dispersed pigment or dye with the lapse of time, and to keep the dispersion stable for a long period of time.

These dispersants may be used singly or as a mixture of two or more thereof. The amount of dispersant to be added in the composition of the present invention, is preferably about 1 to 150 parts by mass, per 100 parts by mass of the solid fine-particle dispersion of the compound represented by formula (1) (preferably, the compound represented by any one of formulae (2) to (4)).

With respect to the solid fine-particles of the compound represented by formula (1) (preferably, the compound represented by any one of formulae (2) to (4)), the average particle diameter is preferably 500 µm or less, more preferably from 0.001 µm to 50 µm, and in particular preferably from 0.001 µm to 10 µm. When the average particle diameter is, in particular, from 0.001 µm to 0.2 µm, a near-infrared absorptive image-forming composition showing a very sharp absorption spectrum can be obtained since the effect of particle scattering becomes small.

(Ink)

An ink containing the near-infrared absorptive image-forming composition of the present invention is preferably composed of a resin constituting a vehicle, the near-infrared absorptive image-forming composition of the present invention, a plasticizer, a solvent and others. Examples of the vehicle-constituting resin generally include natural resins such as proteins, rubbers, celluloses, shellacs, copals, starches and rosins; thermoplastic resins such as vinyl resins, acrylic resins, styrene resins, polyolefin resins and novolac type phenol resins; and thermosetting resins such as resol type phenol resins, urea resins, melamine resins, polyurethane resins, epoxy resins and unsaturated polyester resins. If necessary, into the vehicle may be added a plasticizer for stabilizing the flexibility and the strength of the printed film, a solvent for adjusting the viscosity or the dryability, and an auxiliary, such as a reactant that may be of various types, for adjusting the dryability, the viscosity, the dispersibility or the like.

An ink composition comprised of the near-infrared absorptive image-forming composition of the present invention may be prepared as a photopolymerization curable or electron ray curable ink wherein oil and fat that are in a liquid state at normal temperature are not used, since it is undesired that the near-infrared absorptive image formed therefrom adsorbs pollutants of oil and fat components. A main component of the cured product of the ink is generally an acrylic resin; accordingly, the ink preferably contains an acrylic monomer.

The ink comprised of the resin or monomer is generally solvent-free, and it undergoes chain polymerization reaction when irradiated with electromagnetic waves or an electron beam, thereby being cured. To the ink of an ultraviolet irradiation type, a photopolymerization initiator, an optional sensitizer, and an optional auxiliary, such as a polymerization inhibitor or a chain transfer agent, may be appropriately added. For the ink of an electron beam irradiation type, no photopolymerization initiator is required, and the same resin or monomer as for the ultraviolet irradiation type ink can be used, and various auxiliaries can be optionally added.

The manner of printing with using a printing ink composition employing the near-infrared absorptive image-forming composition of the present invention is not particularly limited, and examples thereof include typographic printing, lithographic printing, flexographic printing, gravure printing, and silk printing. The printing may be made by use of an ordinarily used printer. The ink composition of the present invention is preferably a composition for lithographic ink or gravure ink.

(Lithographic Ink)

The lithographic ink of the present invention will be described hereinafter. The lithographic ink may be a web offset ink, or the like. However, the ink may be a sheetfed offset ink in many cases. When a lithographic ink that requires use of wetting water is used to form a pattern, the outline thereof may not be vivid or a few ink dots or several ink dots for the pattern may drop out by effect of fine water droplets so that the pattern may be made uneven or the pattern precision may be lowered. Thus, in order to make the precision of an information pattern high, the ink of the present invention is preferably a waterless lithographic ink. As compared with the use of ordinary lithographic ink using wetting water, use of a waterless lithographic ink enables to form an information pattern which is more even in thickness and has a sharper outline, make the contrast at the boundary region between the substrate and the information pattern higher, and make the pattern minuter, thinner and uniform with good precision. Lithographic ink is usually oxidation-polymerizable ink containing a drying oil or a semi-drying oil (unsaturated oil) in many cases. However, as described above, the lithographic ink of the present invention may be an active ray curable ink such as ultraviolet curable ink.

The oxidation-polymerizable lithographic ink may contain a binder resin, oil and fat, a high boiling point solvent, a dryer, a drying restrainer, an auxiliary and the like in accordance with the kind of the ink.

More specifically, examples of the binder resin in the oxidation-polymerizable lithographic ink include phenolic resins (such as phenolic resins, and rosin-modified phenolic resins, in which rosin, hardened rosin, polymerized rosin or some other rosin is used), maleic acid resins (such as rosin-modified maleic acid resins, and rosin ester resins), alkyd resins, modified alkyd resins, and petroleum resins. These may be used alone or in combination of two or more thereof arbitrarily.

The oil and fat are generally vegetable oils and compounds originating from vegetable oils. Examples thereof include triglycerides made from glycerin and aliphatic acids wherein at least one of the aliphatic acids is an aliphatic acid having at least one carbon-carbon unsaturated bond, aliphatic acid monoesters each obtained by esterifying reaction between such a triglyceride and a saturated or unsaturated alcohol, aliphatic monoesters each obtained by direct esterifying reaction between an aliphatic acid of vegetable oil and a monoalcohol, or ethers.

Typical examples of the vegetable oil include hempseed oil, linseed oil, perilla oil, oiticica oil, olive oil, cacao oil, kapok oil, Japanese torreya nuts oil, mustard oil, apricot kernel oil, tung oil, kukui oil, walnut oil, poppy seed oil, sesame oil, safflower oil, Japanese radish seed oil, soybean oil, chaulmoogra oil, camellia oil, corn oil, rapeseed oil, niger seed oil, rice bran oil, palm oil, castor oil, sunflower oil, grape seed oil, almond oil, pine cone oil, cottonseed oil, coconut oil, peanut oil, and dehydrated castor oil.

The drier is generally an oxidative polymerization catalyst for promoting oxidative polymerization, and may be a compound known or used in this field. The compound is, for example, a metal salt (e.g. a calcium, cobalt, lead, iron, manganese, zinc, or zirconium salt) of an organic carboxylic acid, such as acetic acid, propionic acid, butyric acid, isopentanoic acid, hexanoic acid, 2-ethylbutyric acid, napthenic acid, octylic acid, nonanoic acid, decanoic acid, 2-ethylhexanoic acid, isooctanoic acid, isononanoic acid, lauric acid, palmitic acid, stearic acid, oleic acid, linoleic acid, neodecanoic acid, versatic acid, secanoic acid, tall oil aliphatic acid, linseed oil aliphatic acid, soybean oil aliphatic acid, dimethylhexanoic acid, 3,5,5-trimethylhexanoic acid, or dimethyloctanoic acid. Two or more of these compounds may also be used in an appropriate combination in order to promote the hardening of the surface or the inside of the printing ink.

The drying restrainer is generally a polymerization inhibitor having an effect of inhibiting oxidative polymerization reaction. Examples thereof include hydroquinone, hydroquinone derivatives such as 2-methylhydroquinone and 2-tert-butylhydroquinone, phenol derivatives such as 2,6-di-tert-butyl-4-hydroxytoluene, and vitamin compounds having antioxidative effect, such as ascorbic acid and tocopherol. These may be used alone or in combination of two or more thereof arbitrarily.

Examples of the auxiliary include an anti-abrasion agent, an anti-blocking agent, a lubricant, a pigment dispersing agent, a natural wax such as carnauba wax, Japan wax, lanoline wax, montan wax, paraffin wax, and microcrystalline wax, synthetic waxes such as Fisher Tropsch synthetic wax, polyethylene wax, polypropylene wax, polytetrafluoroethylene wax, or polyamide wax; a silicone additive, a leveling agent. These may be appropriately used alone or in combination.

The ultraviolet curable lithographic ink may contain a binder resin, a monomer, an oligomer, a photopolymerization initiator, an auxiliary and others in accordance with the kind thereof.

Examples of the binder resin in the ultraviolet curable lithographic ink include polyvinyl chlorides, poly(meth) acrylic acid esters, epoxy resins, polyester resins, polyurethane resins, cellulose derivatives (e.g., ethylcellulose, cellulose acetate, and nitrocellulose), vinyl chloride/vinyl acetate copolymers, polyamide resins, polyvinyl acetal resins, diallyl phthalate resins, alkyd resins, rosin-modified alkyd resins, petroleum resins, urea resins, and synthetic rubbers such as butadiene/acrylonitrile copolymer. These may be used alone or in combination of two or more thereof. Use may be made of a resin which is soluble in a monomer having an ethylenically unsaturated double bond.

Examples of the monomer include monofunctional and polyfunctional (meth)acrylates. By use of one or more of these monomers appropriately, the viscosity of the ink composition can be adjusted.

The oligomer may be an alkyd acrylate, an epoxy acrylate, an urethane-modified acrylate or the like.

To the ultraviolet curable ink may be appropriately added one or more photopolymerization initiators as a component for promoting the curability of the ink.

Examples of the photopolymerization initiator include benzophenone, 4-methylbenzophenone, 4,4-diethylaminobenzophenone, diethylthioxanthone, 2-methyl-1-(4-methylthio)phenyl-2-morpholinopropane-1-one, 4-benzoyl-4'-methyldiphenylsulfide, 1-chloro-4-propoxythioxanthone, isopropylthioxanthone, 2-hydroxy-2-methyl-1-phenylpropane-1-one, 1-hydroxy-cyclohexyl-phenylketone, bis-2,6-dimethoxybenzoyl-2,4,4-trimethylpentylphosphine oxide, 1-[4-(2-hydroxyethoxy)-phenyl]-2-hydroxy-2-methyl-1-propane-1-one, 2,2-dimethyl-2-hydroxyacetophenone, 2,2-dimethoxy-2-phenylacetophenone, 2,4,6-trimethylbenzyldiphenylphosphine oxide, and 2-benzyl-2-dimethylamino-1-(morpholinophenyl)-butane-1-one. Together with the photopolymerization initiator, a photopolymerization promoter may be used, examples thereof including ethyl p-dimethylaminobenzoate and pentyl-4-dimethylamino benzoate.

Examples of the auxiliary include an anti-abrasion agent, an anti-blocking agent, a lubricant, a pigment dispersing agent, a natural wax such as carnauba wax, Japan wax, lanoline wax, montan wax, paraffin wax, and microcrystalline wax, synthetic waxes such as Fisher Tropsch synthetic wax, polyethylene wax, polypropylene wax, polytetrafluoroethylene wax, and polyamide wax; a silicone additive, a leveling agent. These may be appropriately used alone or in combination.

To the lithographic ink may be further added an extender pigment such as calcium carbonate, barium sulfate, alumina white or silica. The average particle diameter of the extender pigment should be, for example, from 0.01 to 1 μm (preferably from 0.01 to 0.1 μm) in many cases. Calcium carbonate may be used in many cases. If necessary, the lithographic ink for forming an information pattern may contain an infrared transmissible or infrared absorptive pigment (e.g., a white pigment such as titanium oxide, a yellow pigment such as disazo yellow, a red pigment such as brilliant carmine 6B, a blue pigment such as phthalocyanine blue, or a black pigment, in particular, a black colorant prepared from plural colorant components by use of subtractive color mixing) as far as the substrate and the information pattern cannot be distinguished from each other with the naked eye.

In the lithographic ink of the present invention, the content of the near-infrared absorptive material (herein the term "material" in this context means "the near-infrared absorptive compound" per se or "composition thereof") may be any value as far as the information pattern and the substrate can be optically discerned or distinguished from each other through their near-infrared reflectivities (or absorptivities). The content is preferably from about 0.1 to 20% by mass of the whole of the lithographic ink, more preferably from about 0.2 to 15% by mass thereof, and further more preferably from about 0.5 to 10% by mass thereof.

If the content of the near-infrared absorptive material is too small, the consistency, the viscosity property or the like of the lithographic ink is changed so that the precision of the information pattern may be declined. Thus, the lithographic ink containing the near-infrared absorptive material may not contain the extender pigment in accordance with the kind of the near-infrared absorptive material; however, it is preferred to combine the near-infrared absorptive material with the extender pigment. The extender pigment may or may not have near-infrared absorptivity. The content of the extender pigment is preferably from 1 to 30% by mass of the whole of the lithographic ink, more preferably from 5 to 25% thereof. The ratio by mass of the near-infrared absorptive material to the extender pigment is preferably from 5/95 to 50/50, more preferably from 10/90 to 45/55, still more preferably from 15/85 to 40/60, and in particular preferably from 20/80 to 30/70.

In the lithographic ink, the proportions of the individual components are preferably as follows: the amount of the near-infrared absorptive material is from 0.5 to 10 parts by mass, that of the extender pigment is from 5 to 25 parts by mass, that of the binder resin is from 10 to 40 parts by mass, that of oils and fats is from 20 to 30 parts by mass, that of a mineral oil is from 20 to 30 parts by mass, and the total amount of these components including additives such as the auxiliary is 100 parts by mass.

According to a cone plate viscometer, the viscosity of the lithographic ink is preferably 100.0 Pa·s or less, more preferably from 40.0 to 80.0 Pa·s, at 25° C. and a share rate of 100/s. If the viscosity becomes too large, the fluidity and the transferability are lowered and such an ink has a tendency to give rough feel to entire a printed material. With an increase in the viscosity, the tackiness of the ink also rises. Thus, picking, paper release defect (an insufficiency of the separation of paper from a lithographic plate), and other defects are easily caused. The viscosity of the waterless lithographic ink is preferably 150 Pa·s or less, more preferably from 60.0 to 120 Pa·s, at 25° C. under a share rate of 100/s, according to a cone plate viscometer. If the viscosity is too large, the similar tendency as in the case of the lithographic ink is produced. Furthermore, it also liable to lead to insufficient inking (a failure of the adhesion of the ink) so that ink dots drop out or other drawbacks are caused to result in a fall in print quality, causing a problem about the precision of reading by an infrared sensor. If the viscosity becomes too small, scumming is easily caused. As a result, the information pattern formed on the printed paper becomes unclear so that the precision of reading by an infrared sensor can be lowered. Additionally, the ink gives an obstacle to printing itself.

The reflectivity of an infrared ray on images printed with the lithographic ink of the present invention is, for example, from about 0 to 60% of the infrared ray radiated (for example, an infrared ray having a wavelength of 850 nm), preferably from about 0 to 50% thereof, and more preferably from about 0 to 40% thereof.

The substrate is not particularly limited as far as the substrate has an infrared-reflective surface. The substrate may be a paper substrate such as printing paper, gravure paper, high quality paper, coated paper, baryta paper, art paper or cast-coated paper; a synthetic paper; a plastic substrate (or plastic sheet) made of polyolefin resin, styrene resin, polyester resin, polyamide resin or the like; or a laminate wherein plural layers are laminated onto each other (e.g., a laminate wherein a paper sheet is laminated on a plastic sheet, or a vapor-deposited film). The substrate may be colored as far as the substrate has infrared-reflectivity. Usually, the substrate may be a paper substrate, in particular, a white paper substrate, such as white coated paper, in many cases. The infrared reflectivity of the substrate is preferably from 60 to 100% of a radiated infrared ray (e.g., an infrared ray having a wavelength of 850 nm), more preferably from 70 to 100% thereof.

(Gravure Ink)

The following will describe the gravure ink of the present invention.

The gravure ink may be any one of gravure printing ink for publication, gravure printing ink for wrapping and paper, gravure printing ink for cellophane, gravure printing ink for plastic films, and others. The gravure ink of the present invention can be used for any of the printing inks. With respect to the constitution of the gravure ink of the present invention, the ink contains the near-infrared absorptive material according to the present invention, a binder resin and a solvent, and may further contain, as other auxiliaries, an extender pigment, a plasticizer, an ultraviolet preventive, a pigment dispersing agent, an antioxidant, an antistatic agent, a leveling agent, an antifoaming agent, a wax and others.

Examples of the binder resin include gum rosins, wood rosins, tall oil rosins, rosin esters, lime-cured rosins, zincated cured rosins, maleated rosins, fumarated rosins, cellulose derivatives, polyamides, polyurethanes, cyclized rubbers, chlorinated rubbers, and acrylic resins. These may be used alone or in combination of two or more thereof arbitrarily. Of these examples, preferred are cellulose derivatives and polyamides.

The polyamide resin is preferably a resin obtained by causing an acid component which is comprised mainly of a polymerized aliphatic acid, and may further contain, as one or more partial components, an aliphatic, alicyclic, or aromatic dicarboxylic acid and/or an aliphatic monocarboxylic acid, to react with an amine component which is comprised mainly of a single substance or mixture composed of one or more selected from aliphatic, alicyclic, aromatic aliphatic, or aromatic polyamines, and may further contain, as one or more partial components, a primary monoamine and/or a secondary monoamine.

The polymerized aliphatic acid referred to herein is generally an acid obtained by polymerizing an unsaturated aliphatic acid having 16 to 20 carbon atoms or an ester thereof. Examples thereof include monobasic aliphatic acids, dimerized polymerized aliphatic acids, and trimerized polymerized aliphatic acids. Examples of the aliphatic dicarboxylic acid include succinic acid, adipic acid, azelaic acid, maleic acid. Examples of the alicyclic dicarboxylic acid include cyclohexanedicarboxylic acid, and examples of the aromatic dicarboxylic acid include isophthalic acid and terephthalic acid. Examples of the aliphatic monocarboxylic acid include acetic acid, stearic acid, oleic acid, and linolic acid.

Examples of the aliphatic polyamine out of the amine components include aliphatic diamines such as ethylenediamine, propylenediamine, hexamethylenediamine and methylaminopropylamine, and aliphatic polyamines such as diethylenetriamine and triethylenetetramine. Examples of the alicyclic polyamine include cyclohexylenediamine, and isophoronediamine. Examples of the aromatic aliphatic polyamine include xylylenediamine. Examples of the aromatic polyamine include phenylendiamine, and diaminodiphenylmethane.

Examples of the primary and secondary monoamines include butylamine, octylamine, diethylamine, monoethanolamine, monopropanolamine, diethanolamine, and dipropanolamine. In particular, in the case of using only a polyamide resin as the binder resin of the ink, it is preferred that an alkanolamine is used as the primary or secondary monoamine component and a polyamide resin having in the molecule thereof a hydroxyl group is used together, in order to cause the resin to have reactivity with a crosslinking agent. As the method for synthesizing the polyamide resin from the acid component(s) and the amine component(s), preferred is a method conducted under the following conditions: the ratio of the carboxyl groups of the reactive components to the amine groups thereof is set into the range of 0.9/1.0 to 1.0/0.9, preferably into 1.0/1.0, and the reaction temperature is set to the range of 160 to 280° C., preferably 180 to 230° C.; and in the final stage, the reaction is conducted desirably under a reduced pressure of about 100 torr.

Examples of the cellulose derivatives include nitrocellulose as a nitro-substituted cellulose; cellulose acetate and cellulose acetate propionate as lower-acyl-substituted celluloses; and methylcellulose and ethylcellulose as lower-alkyl-substituted celluloses. On the molecular weight, the substitution degree, and other properties of these cellulose derivatives, those used for ordinary paint or ink compositions may be applied in the present invention without causing any trouble. When only a cellulose derivative is used as the binder of the ink, it is preferred that the cellulose derivative has a hydroxyl group in its molecule and has a substitution degree of from about 30 to 85%. From the viewpoint of heat resistance, the use of a nitro-substituted cellulose is favorable. From the viewpoint of adhesive property, the use of a lower-acyl-substituted cellulose or a lower-alkyl-substituted cellulose is favorable. It is therefore preferred to use one or more selected appropriately from these substituted celluloses in accordance with the use purpose.

Examples of the solvent in the ink include alcohols such as methanol, ethanol and propanol; aromatic hydrocarbons such as toluene, and xylene; glycol derivatives such as methylcellosolve, cellosolve, and butylcellosolve; ketones such as acetone, and methyl ethyl ketone; esters such as methyl acetate, and ethyl acetate; and mixtures thereof.

The use amount of the near-infrared absorptive material used in the ink composition of the present invention is usually from about 1 to 50% by mass of the ink composition. The use amount of the binder resin is usually from about 5 to 40% by mass of the ink composition. Preferred is the system wherein the polyamide resin is used together with the cellulose derivative, and the ratio by mass of the former to the latter is from 1.0/0.1 to 1.0/0.5.

The gravure ink of the present invention may be used as an ink wherein the use amount of an aromatic solvent is reduced, or as a low-polluting and low-toxic printing ink wherein the use amount of an organic solvent itself is restrained. Such inks may be prepared with reference to JP-A-9-296143 and JP-A-2004-331894.

(Electrophotographic Toner)

The electrophotographic toner of the present invention comprises the above-mentioned near-infrared absorptive image-forming composition, and preferably at least further contains a binder resin. It is preferred to use the toner as a toner for optical fixation or an invisible toner.

Herein, the "invisible toner" means a toner for use in decoding an image by use of invisible ray such as infrared ray. When the invisible toner is fixed as a toner image onto a sheet of paper or the like, the toner image may or may not be perceived with the naked eye. Thus, the invisible toner means to include any toner that can form an image which can be read out through invisible light. In other words, the invisible toner means a toner for forming an invisible image, for example, an infrared absorptive pattern, such as a bar code. Even if a coloring agent is added to the toner, the resultant toner can be even called an invisible toner when the added amount of the coloring agent is, for example, 1 mass % or less, which is clearly at such a level that the presence of the coloring agent cannot be perceived. The invisible toner includes one that is to be optically fixed.

The electrophotographic toner of the present invention may contain an ordinary binder resin. The binder resin is preferably composed mainly of a polyester or polyolefin. The following may be used singly or in combination thereof: a copolymer of styrene and acrylic acid or methacrylic acid, a polyvinyl chloride, a phenolic resin, an acrylic resin, a methacrylic resin, a polyvinyl acetate, a silicone resin, a polyester resin, a polyurethane, a polyamide resin, a furan resin, an epoxy resin, a xylene resin, a polyvinyl butyral, a terpene resin, a cumarone indene resin, a petroleum resin, a polyether polyol resin, and the like. From the viewpoint of durability, translucency and the like, it is preferred to use a polyester-based resin or a norbornene polyolefin resin. The glass transition temperature (Tg) of the binder resin used in the toner is preferably within the range of from 50 to 70° C.

If necessary, a charge controlling agent or a wax may be added to the electrophotographic toner of the present invention. Examples of the charge controlling agent include calixarene, nigrosine dyes, quaternary ammonium salts, amino group-containing polymers, metal-containing azo dyes, complex compounds of salicylic acid, phenol compounds, azo chromium compounds, and azo zinc compounds. Alternatively, the toner may include a magnetic material, such as iron powder, magnetite, and ferrite, and the resultant toner can be a magnetic toner.

The wax that can be contained in the electrophotographic toner of the present invention is most preferably an ester wax, polyethylene, polypropylene, or an ethylene/propylene copolymer, but may be another wax. Examples of the aforementioned another wax include polyglycerin wax, microcrystalline wax, paraffin wax, carnauba wax, sasol wax, montanic acid ester wax, deoxidized (or deacidified) carnauba wax; unsaturated fatty acids, e.g. brassidic acid, eleostearic acid, parinaric acid, palmitic acid, stearic acid, and montanic acid; saturated alcohols, e.g. stearyl alcohol, aralkyl alcohol, behenyl alcohol, carnaubyl alcohol, ceryl alcohol, melissyl alcohol, and long-chain-alkyl alcohols whose alkyl moiety is longer than that of the above-mentioned alcohols; polyhydric alcohols, e.g. sorbitol; fatty acid amides, e.g. linoleic acid amide, oleic acid amide, and lauric acid amide; saturated fatty acid bisamides, e.g. methylenebisstearic acid amide, ethylenebiscapric acid amide, ethylenebislauric acid amide, and hexamethylenebisstearic acid amide; unsaturated fatty acid amides, e.g. ethylenebisoleic acid amide, hexamethylenebisoleic acid amide, N,N'-dioleyladipic acid amide, and N,N'-dioleylsebacic acid amide; aromatic bisamides, e.g. m-xylenebisstearic acid amide, and N,N'-distearylisophthalic acid amide; metal salts of fatty acids (generally called as metallic soap), e.g. calcium stearate, calcium laurate, zinc stearate, and magnesium stearate; waxes obtained by graft-copolymerizing an aliphatic hydrocarbon wax with a vinyl-based monomer (e.g. styrene or acrylic acid); partially-esterified compounds of a polyhydric alcohol and a fatty acid, e.g. behenic acid monoglyceride; and methyl ester compounds containing a hydroxyl group obtained by, for example, hydrogenating a vegetable fat or oil.

The electrophotographic toner of the present invention can be produced, by using, for example, a kneading-pulverization method or a wet granulation method, each of which is a usually utilized method. Examples of the wet granulation method that can be used include a suspension polymerization method, an emulsion polymerization method, an emulsion polymerization aggregation method, a soap-free emulsion polymerization method, a non-aqueous dispersion polymerization method, an in-situ polymerization method, an interfacial polymerization method, and an emulsion dispersion granulation method.

When the electrophotographic toner of the present invention is produced by the kneading pulverization method, the target toner can be obtained by: thoroughly mixing a binder resin, the compound represented by formula (1), a wax, a charge controlling agent, and another additive(s) if any, in a mixer, such as a HENSCHEL mixer or a ball mill; melt-kneading the resultant mixture with a heat kneader, such as a heating roll, a kneader, or an extruder, to disperse or dissolve the aforementioned agents in the resins which have been compatibilized or dissolved each other; cooling down the resultant, to solidify the same; and pulverizing and classifying the resultant particles, thereby to give the toner. The compound represented by formula (1) may be added before or after the melt-kneading. To improve the dispersibility of the compound represented by formula (1), a master batch treatment may be conducted.

In the electrophotographic toner of the present invention, the content of the compound represented by formula (1) is not particularly limited, and is preferably from 0.1 to 30% by mass, more preferably from 0.5 to 10% by mass.

The electrophotographic toner of the present invention preferably has a volume average particle diameter (D50v) in the range of 3 to 10 μm, and more preferably in the range of 4 to 8 μm. The toner preferably has a ratio (D50v/D50p) of the volume average particle diameter (D50v) to the number average particle diameter (D50p) in the range of 1.0 to 1.25. Thus, by using such a toner having a small particle diameter and a narrow diameter distribution, it is possible to suppress unevenness in chargeability of the toner, to form an image with a reduced level of fogging, and to improve fixability of the toner. Further, the aforementioned toner can improve reproducibility of fine lines and reproducibility of dots with respect to the resulting image formed with the toner.

The electrophotographic-recording method in the present invention can be conducted in accordance with an ordinary embodiment in a copying machine, a printer, a printing machine, or the like. For example, an image can be formed as follows. First, an electrifying step is conducted where a positive or negative uniform electrostatic charge is given onto the surface of a photoconductive insulator on a photosensitive drum. After this electrifying step, for example, a laser beam is radiated onto the resultant photoconductive insulator surface, to erase the electrostatic charge on the insulator surface partially, thereby forming an electrostatic latent image corresponding to image data. Next, for example, fine powder of a developing agent called a toner (or an electrostatic image developing toner) is caused to adhere onto the latent image region, in where the electrostatic charge remains, on the photoconductive insulator surface, thereby making the latent image visible to convert into a toner image. In order to make the thus-obtained toner image into an image on a printed material, the toner image is generally transferred electrostatically onto a recording medium, such as recording paper, and then the toner image is fixed onto the recording medium.

The method for fixing the toner image after the transferring is, for example, a method of melting the toner by applying pressure or heat or combined use of these, and then solidifying/fixing the toner image; or a method of radiating optical energy onto the toner to melt the toner, and then solidifying/fixing the toner image.

The image formed by use of the ink or the electrophotographic toner of the present invention may be made of a fine pattern that may be in various forms that are not easily recognizable or illegible with the naked eye. Examples of the forms include a dot form and a fine line form.

Since the fine pattern is not easily recognizable with the naked eye, the region on the substrate to which the pattern can be provided is not restricted and the pattern may be applied to any region of the substrate. Thus, even when an information pattern (the fine pattern) is provided to an image region formed with a process color ink which has no infrared absorptivity or a low infrared absorptivity, or some other ink, the quality of the image is not damaged. The image quality can be made much higher, in particular, by use of an ink that can give an information pattern which is not easily distinguished from the substrate from the viewpoint of color.

An image formed with a process ink is not necessarily required for the present invention. In many cases, however, on the substrate surface on which the information pattern is formed, a predetermined infrared-transmissible image may be formed, by at least one chromatic or achromatic ink, and particularly by process inks in at least three colors. The ink for forming this image is not particularly limited, and may be a printing ink such as lithographic ink, relief printing ink, gravure ink, flexographic ink or screen ink; ink for inkjet printing, or ink for heat-sensitive transfer method. The above matters are similarly applicable to the case of the toner for developing an electrostatic image.

The chromatic process ink or three-color process inks may each contain an infrared-transmissible colorant, e.g., a yellow pigment such as disazo yellow or condensed azo pigment, a red pigment such as lake red C, brilliant carmine 6B, rhodamine 6G, rhodamine B or watchung red, a blue pigment such as phthalocyanine blue, a green pigment such as phthalocyanine green, or some other pigment. The colorant of the achromatic ink or black ink is preferably a black colorant prepared by combining plural infrared-transmissible colorants with each other, using subtractive color mixing. Examples of the combined colorants include a combination of yellow, red and blue pigments, a combination of an orange pigment with a blue pigment, a combination of a green pigment with a red pigment, and a combination of a yellow pigment with a purple pigment.

EXAMPLES

The present invention will be described in more detail based on the following examples. Materials, amounts to be used, proportions, details and procedures of treatment and processing, or the like, as shown in the examples, may appropriately be modified without departing from the spirit and scope of the present invention. It is therefore understood that the present invention is by no means intended to be limited to the specific examples below. In the following examples and comparative examples, the term "part(s)" and the symbol "%" denote "part(s) by mass" and "% by mass", respectively, unless otherwise specified.

Synthetic Example 1

Preparation of Exemplified Compound (D-17)

An exemplified compound (D-17) was prepared in accordance with the following scheme 1.

In the present specification, "Pr" represents a propyl group.

Scheme 1

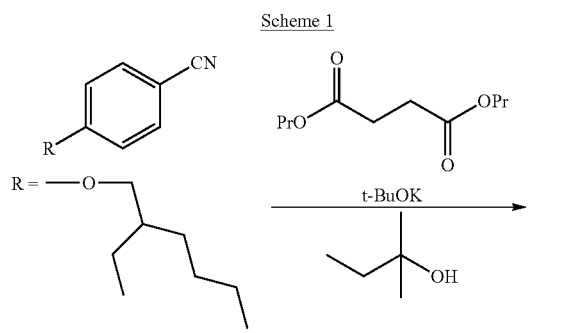

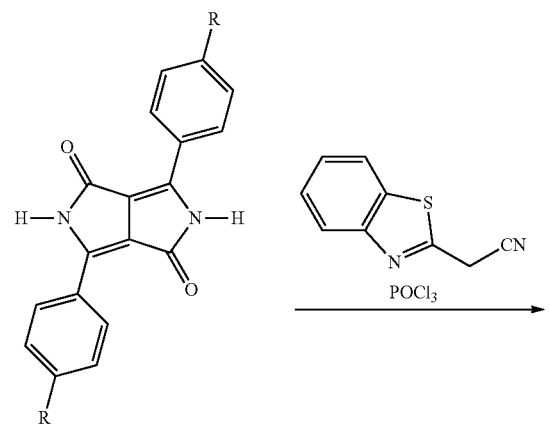

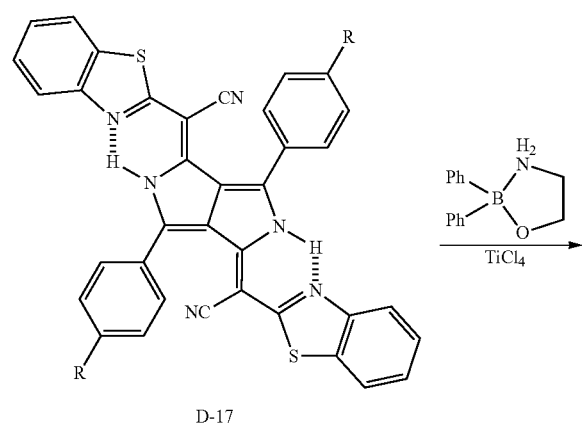

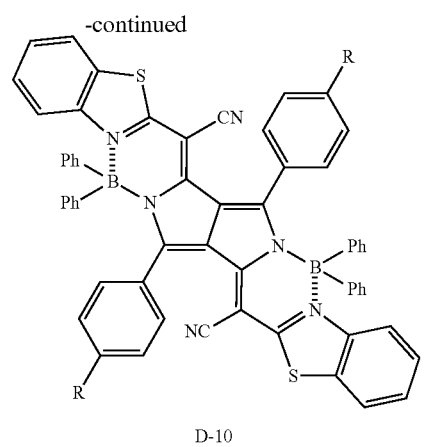

D-10

First, a diketopyrrolopyrrole compound (DPP) was synthesized in accordance with a method described in U.S. Pat. No. 5,969,154, using 4-(2-ethylhexyloxy)benzonitrile as a starting material.

In 60 mL of toluene, 3 g (1 equivalent by mol) of the diketopyrrolopyrrole compound, and 1.6 g (2.5 equivalents by mol) of 2-benzothiazoleacetonitrile were stirred, and then thereto was added 6.5 g (8 equivalents by mol) of phosphorus oxychloride. The solution was heated and refluxed for 4 hours. The solution was cooled to room temperature (25° C.), and then thereto were added 50 mL of chloroform and 20 mL of water. Furthermore, the solution was stirred for 30 minutes. Therefrom, the organic layer was taken out by a liquid-separating operation. The organic layer was washed with an aqueous sodium hydrogen carbonate solution, and then the solvent was distilled off under reduced pressure. The obtained crude product was purified by silica gel column chromatography (solvent: chloroform), and further a chloroform/acetonitrile solvent was used to recrystallize the purified product to yield 3.3 g of the target compound (D-17) (yield: 70%).

$^1$H-NMR (CDCl$_3$): δ 0.9-1.0 (m, 12H), 1.35-1.6 (m, 16H), 1.8 (m, 2H), 3.95 (d, 4H), 7.1 (d, 4H), 7.4-7.5 (m, 4H), 7.7 (d, 4H), 7.75 (d, 2H), 8.0 (d, 2H)

Synthetic Example 2

Preparation of Exemplified Compound (D-10)

An exemplified compound (D-10) was prepared in accordance with the scheme 1.

Titanium chloride (0.9 mL, 3 equivalents by mol) was added to a 1.2 M solution of 2-aminomethyl diphenylborinate (1.4 g, 3 equivalents by mol) in toluene, and then the solution was stirred at a circumscribing temperature of 100° C. for 30 minutes. Next, a 0.2 M solution of exemplified compound (D-17) (2.3 g) in toluene was added thereto, and further the solution was stirred for 2 hours under heating and refluxing conditions. The solution was cooled to room temperature, and methanol was added thereto. As a result, a crystal precipitated. The crystal was collected by filtration, and was recrystallized with chloroform/methanol. This process gave 3.0 g of the exemplified compound (D-10) (yield: 93%).

The λmax of the exemplified compound (D-10) was 779 nm in chloroform. The molar absorption coefficient of the exemplified compound (D-10) was 2.06×10$^5$ dm$^3$/mol·cm.

$^1$H-NMR (CDCl$_3$): δ 0.9-1.0 (m, 12H), 1.35-1.6 (m, 16H), 1.8 (m, 2H), 3.85 (d, 4H), 6.45 (s, 8H), 7.0 (d, 4H), 7.15 (m, 12H), 7.2 (m, 2H), 7.25 (m, 4H+4H), 7.5 (m, 2H)

Synthetic Example 3

Preparation of Exemplified Compound (D-28)

An exemplified compound (D-28) was prepared in the same manner as the above, except that the starting materials were changed. $^1$H-NMR results for identifying the structure thereof are shown below.

Exemplified Compound (D-28)

$^1$H-NMR (CDCl$_3$): δ 1.9 (s, 6H), 6.65 (d, 2H), 6.7-6.8 (m, 6H), 6.95 (m, 8H), 7.0-7.1 (m, 4H), 7.25-7.35 (m, 12H), 7.5 (m, 2H), 7.85 (d, 2H)

The λmax of the exemplified compound (D-28) was 752 nm in chloroform. The molar absorption coefficient of the exemplified compound (D-28) was 1.53×10$^5$ dm$^3$/mol·cm in chloroform.

Synthetic Example 4

Preparation of Exemplified Compound (D-133)

An exemplified compound (D-133) was prepared in the same manner as the above, except that the starting materials were changed. $^1$H-NMR results for identifying the structure thereof are shown below.

Exemplified Compound (D-133)

$^1$H-NMR (CDCl$_3$): δ 0.9-1.0 (m, 12H), 1.35-1.6 (m, 16H), 1.8 (m, 2H), 3.85 (d, 4H), 6.4 (m, 4H), 6.5-6.65 (m, 8H), 7.1 (d, 2H), 7.15-7.3 (m, 4H), 7.65 (d, 2H)

The λmax of the exemplified compound (D-133) was 716 nm in chloroform. The molar absorption coefficient of the exemplified compound (D-133) was 1.24×10$^5$ dm$^3$/mol·cm in chloroform.

Synthetic Example 5

Preparation of Exemplified Compound (D-142)

An exemplified compound (D-142) was prepared in the same manner as the above, except that the starting materials were changed. The exemplified compound (D-142) had low solubility to DMSO and chloroform, and thus it was impossible to conduct $^1$H-NMR measurement of the exemplified compound (D-142). MALDI-MASS spectrum result for identifying the structure thereof is shown below. Calculated value: [M+]=1100.42, Measured value: [M-H]=1099.5

Synthetic Example 6

Preparation of Exemplified Compound (D-146)

An exemplified compound (D-146) was prepared in the same manner as the above, except that the starting materials were changed. $^1$H-NMR results for identifying the structure thereof are shown below.

Exemplified Compound (D-146)

$^1$H-NMR (CDCl$_3$): δ 0.9-1.0 (m, 12H), 1.35-1.6 (m, 64H), 1.8 (m, 2H), 3.85 (d, 4H), 6.45 (s, 8H), 7.0 (d, 4H), 7.15 (m, 12H), 7.2 (m, 2H), 7.25 (m, 4H+4H), 7.5 (m, 2H)

The λmax of the exemplified compound (D-146) was 779 nm in chloroform. The molar absorption coefficient of the exemplified compound (D-146) was 1.60×10$^5$ dm$^3$/mol·cm in chloroform.

The solution absorption spectra of exemplified compounds (D-10) and (D-28) are shown in FIG. 1.

It was understood that each of exemplified compounds (D-10) and (D-28) was good in the absorptivity of near-infrared rays and was small in absorptivity in the range of 400 to 500 nm so as to be excellent in invisibility.

Example 1

Figure 2:
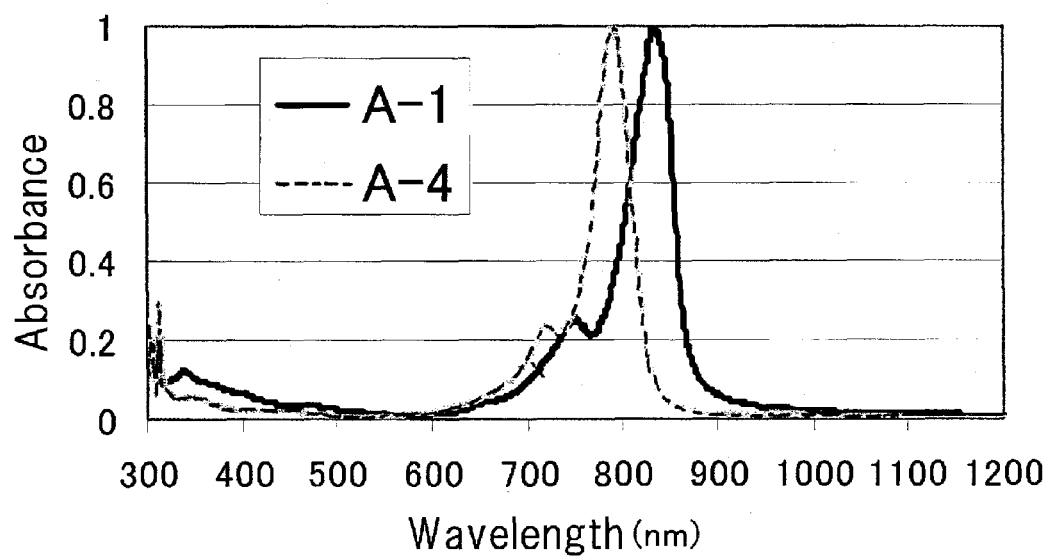
FIG. 2 is a graph showing transmission spectra of the aqueous liquid dispersions A-1 and A-4 described in the below.
Figure 9:
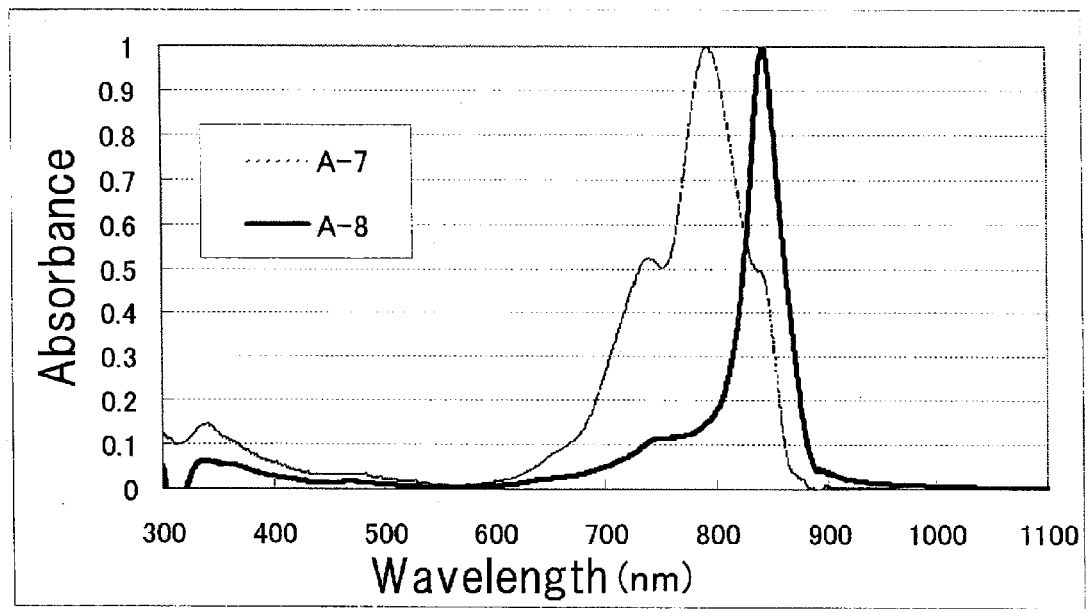
FIG. 9 is a graph showing transmission spectra of the aqueous liquid dispersions A-7 and A-8 described in the below.

Production of Aqueous Dispersed Fine-Particles of Near-Infrared Absorptive Compounds To a near-infrared absorptive compound and a dispersing agent of which amounts (parts by mass) and kinds are shown in Table 1, water was added to make the total amount to 500 parts by mass. Thereto were added 500 parts by mass of zirconia beads of 0.1 mmϕ, and the resultant was treated using a planet type ball mill at 300 rpm for 5 hours. The beads were separated by filtration, so as to produce each of aqueous liquid dispersions A-1 to A-8 comprised of fine particles. The absorption spectra of the aqueous liquid dispersions A-1, A-4, A-7, and A-8 were each standardized with the maximum absorption wavelengths thereof, and the standardized spectra are shown in FIG. 2 and FIG. 9. From FIG. 2 and FIG. 9, it was understood that each of the aqueous liquid dispersions A-1, A-4, A-7, and A-8 had an absorbance of 0.1 or less at 550 nm, and hardly showed any absorption in the visible range to have a high invisibility. Additionally, it was understood that the absorptions thereof in the infrared range were very sharp.

Furthermore, Nanotrac UPA particle diameter analyzer (trade name: UPA-EX150, manufactured by Nikkiso Co., Ltd.) was used to measure the particle diameter of fine particles in each of the aqueous liquid dispersions A-1 to A-8. The average particle diameter is shown in the below Table 1. As shown in Table 1, the aqueous liquid dispersions A-1 to A-8 were each a fine-particle liquid dispersion wherein the fine particles had an average particle diameter of 50 nm or less.

TABLE 1

| Entry | Near-infrared absorptive compound | | Dispersing agent | | Average particle diameter (nm) |
|---|---|---|---|---|---|
| | Exemplified compound No. | Part by mass | Kind | Part by mass | |
| A-1 | D-10 | 15 | W-1 | 10 | 21.5 |
| A-2 | D-10 | 5 | W-2 | 2 | 19.7 |
| A-3 | D-10 | 15 | W-3 | 9 | 33.1 |
| A-4 | D-28 | 15 | W-1 | 10 | 39.4 |
| A-5 | D-28 | 5 | W-2 | 2 | 16.6 |
| A-7 | D-142 | 5 | W-1 | 2 | 49.1 |
| A-8 | D-146 | 5 | W-3 | 2 | 46.5 |

W-1. Sodium dodecylbenzenesulfonate (trade name: Neogen SC, manufactured by DAI-ICHI KOGYO SEIYAKU CO., LTD., Effective ingredient: 66%)
W-2. Dodecylbenzenesulfonate (manufactured by Tokyo Chemical Industry Co., Ltd.)
W-3. Disperbyk-2090 (trade name) (manufactured by BYK-Chemie, Anionic polyalkylate in a star-shaped structure, Effective ingredient: 81%)

(Evaluation of Storage Stability of Aqueous Liquid Dispersion)

The aqueous liquid dispersion A-1 were allowed to stand still at 4° C., 25° C. and 60° C., respectively, for 14 days, and then variations in a liquid dispersion viscosity, in an average particle diameter, and in a HPLC purity thereof were measured. The results of the individual changes are shown in FIGS. 3 to 5.

Figure 3:
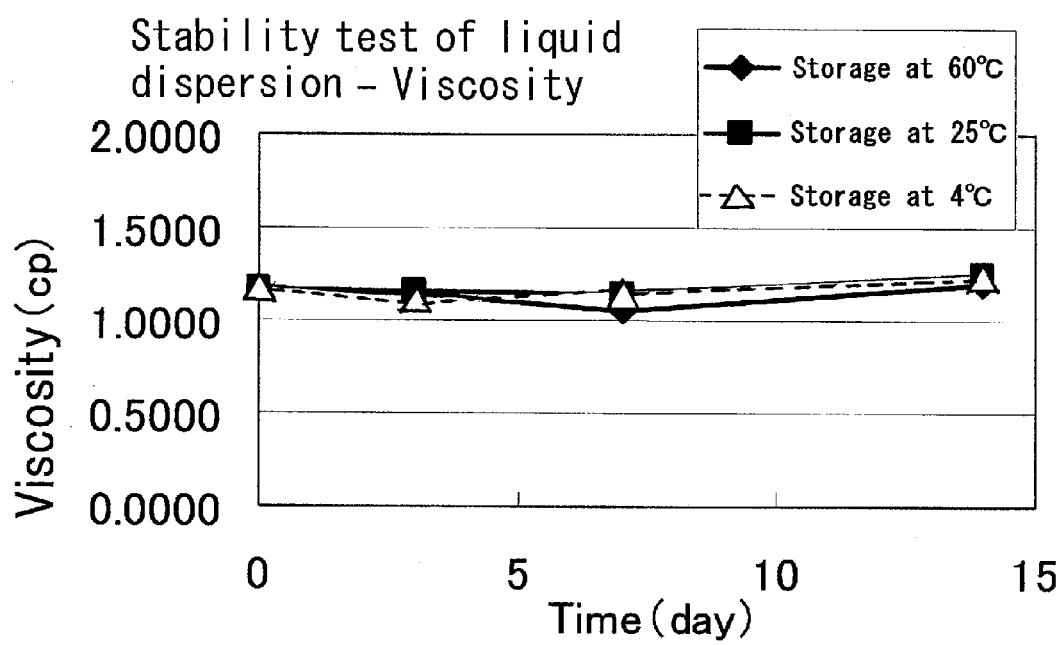
FIG. 3 is a graph showing a change in the viscosity of the aqueous liquid dispersion A-1 with the passage of time.
Figure 4:
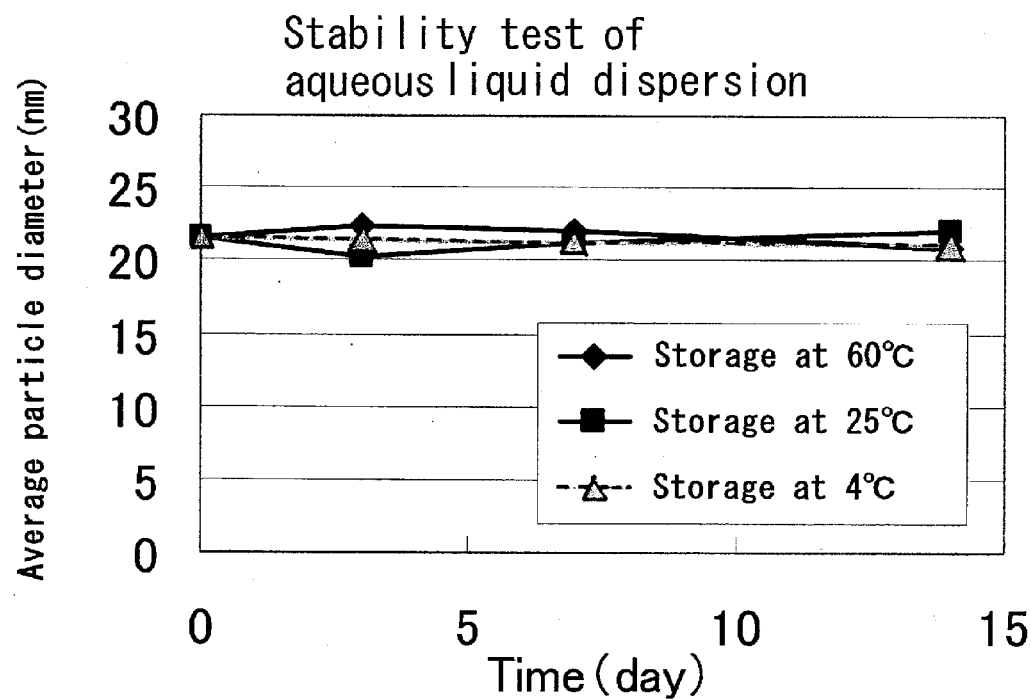
FIG. 4 is a graph showing a change in the average particle diameter of the aqueous liquid dispersion A-1 with the passage of time.
Figure 5:
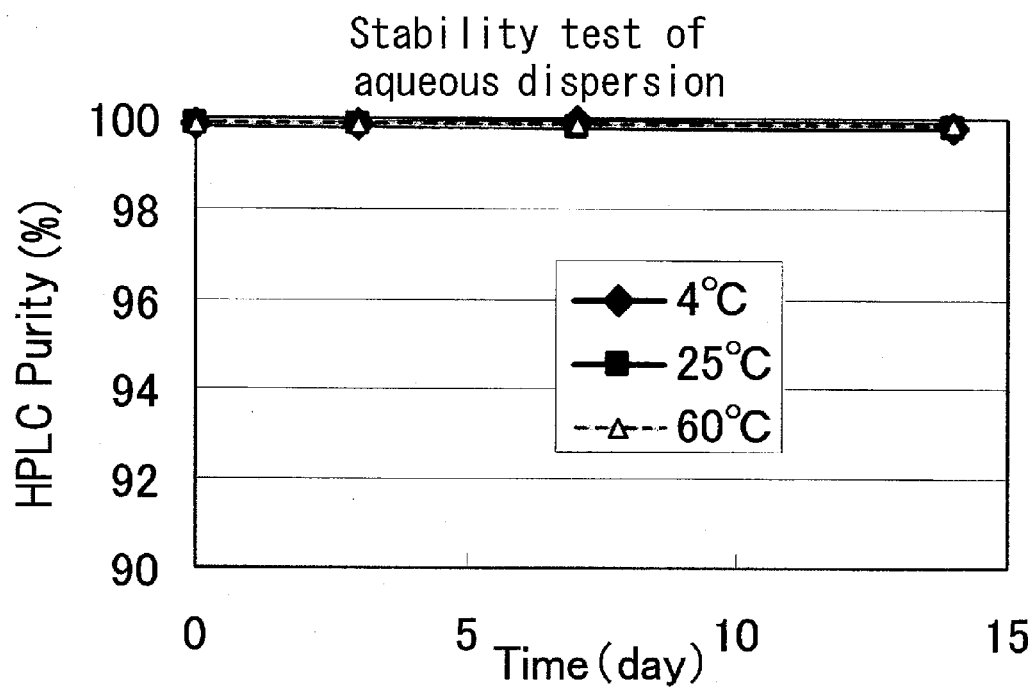
FIG. 5 is a graph showing a change in the HPLC purity of the aqueous liquid dispersion A-1 with the passage of time.

As shown in FIGS. 3 to 5, the liquid dispersion viscosity, the average particle diameter and the HPLC purity of the aqueous liquid dispersion A-1 were hardly varied in the 14 days. Thus, it was understood that the aqueous liquid dispersion A-1 was exceedingly high in storage stability.

The residual rate of the measured absorbance to the absorbance before the irradiation with the light was calculated, and the light resistance was evaluated. The results are shown in the below Table 2.

(Humidity-and-Heat Resistance Test)

The obtained near-infrared absorptive films B-1 to B-17 were each allowed to stand still in a humidity-and-heat test machine 60° C. in temperature and 90% in relative humidity for 120 hours. The absorbance of each of the near-infrared absorptive films B-1 to B-17 was measured at the spectral maximum absorption wavelength. The residual rate of the measured absorbance to the absorbance before the humidity-and-heat test was calculated, and the humidity-and-heat resistance was evaluated. The results are shown in Table 2.

TABLE 2

| Entry | Liquid dispersion A | Polymer liquid Kind | Part by mass | Drying method | Remarks | Light resistance Residual rate (%) | Humidity-and-heat resistance Residual rate (%) |
|---|---|---|---|---|---|---|---|
| B-1 | A-1 | Gelatin | 54 | Dried in the air | Comparative example | 62 | 82 |
| B-2 | A-1 | Gelatin | 54 | 130° C., 5 min | Comparative example | 64 | 81 |
| B-3 | A-1 | R-9660 | 27 | Dried in the air | This invention | 86 | 88 |
| B-4 | A-1 | R-9660 | 27 | 130° C., 5 min | This invention | 95 | 97 |
| B-5 | A-1 | ET-410 | 30 | Dried in the air | This invention | 78 | 90 |
| B-6 | A-1 | ET-410 | 30 | 130° C., 5 min | This invention | 85 | 98 |
| B-7 | A-2 | Gelatin | 28 | Dried in the air | Comparative example | 63 | 83 |
| B-8 | A-2 | R-9660 | 12 | Dried in the air | This invention | 76 | 89 |
| B-9 | A-2 | ET-410 | 13 | Dried in the air | This invention | 70 | 91 |
| B-10 | A-3 | Gelatin | 54 | Dried in the air | Comparative example | 32 | 77 |
| B-11 | A-3 | R-9660 | 27 | Dried in the air | This invention | 65 | 91 |
| B-12 | A-3 | R-9660 | 27 | 130° C., 5 min | This invention | 81 | 95 |
| B-13 | A-4 | Gelatin | 54 | Dried in the air | Comparative example | 80 | 78 |
| B-14 | A-4 | R-9660 | 27 | Dried in the air | This invention | 93 | 88 |
| B-15 | A-4 | R-9660 | 27 | 130° C., 5 min | This invention | 96 | 93 |
| B-16 | A-5 | Gelatin | 28 | Dried in the air | Comparative example | 74 | 74 |
| B-17 | A-5 | R-9660 | 12 | Dried in the air | This invention | 85 | 88 |

Gelatin: 10% gelatin aqueous solution
R9660: manufactured by KUSUMOTO CHEMICALS, Ltd., Effective ingredient: 33%, Aqueous dispersion of urethane-based polymer
ET-410: manufactured by NIHON JUNYAKU CO., LTD., Effective ingredient: 30%, Aqueous dispersion of acryl-based polymer (Production of Near-Infrared Absorptive Films)

Each polymer shown in the below Table 2 described below was added to the aqueous liquid dispersions A-1, A-2, A-3, A-4, and A-5 to set the amount of the whole to 100 parts by mass. To the thus-prepared undiluted coating liquid was added pure water to adjust the concentration. The resultant was coated onto a polyethylene terephthalate (PET) plate. Furthermore, the coated film was dried by each drying method shown in the below Table 2. In this way, each of near-infrared absorptive films B-1 to B-17 was produced. With respect to the concentration of the coating liquid, the absorption spectrum of the obtained film was measured, and then the concentration was adjusted to set the optical density of the near-infrared absorptive compound at the λmax to 1.5.

Figure 6:
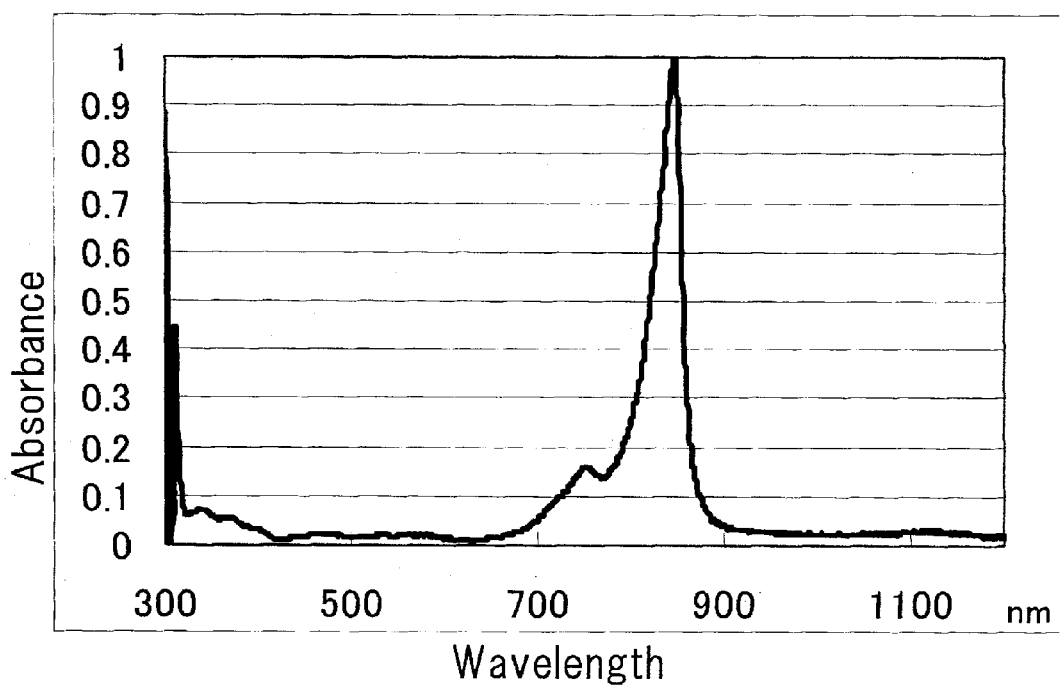
FIG. 6 is a graph showing the absorption spectrum of the near-infrared absorptive film B-4 produced in Example 1.

FIG. 6 shows the absorption spectrum of the near-infrared absorptive film B-4.

As is apparent from FIG. 6, the λmax was 848 nm, and a good infrared absorptivity was obtained. It was also understood that the film hardly showed absorption in the range of 400 to 700 nm to have an excellent invisibility.

(Light Resistance Test)

The obtained near-infrared absorptive films B-1 to B-17 were each irradiated with light having an illuminance of 220000 1x from a xenon lamp for 72 hours. The absorbance of each of the near-infrared absorptive films B-1 to B-17 was measured at the spectral maximum absorption wavelength.

As is apparent from Table 2, the near-infrared absorptive films B-3 to B-6, B-8, B-9, B-11, B-12, B-14, B-15, and B-17 in the scope of the present invention each exhibited a good light resistance and humidity-and-heat resistance. In particular, the near-infrared absorptive films B-4, B-12 and B-15, which employed a binder of a urethane resin and were each obtained through drying by heating (at 130° C. for 5 minutes), each exhibited a very high light resistance and humidity-and-heat resistance.

Example 2

Production of Aqueous Ink, and Application of Aqueous Ink on Paper

To the aqueous liquid dispersion A-1 was added a polyester-based urethane resin R9660 (trade name, manufactured by KUSUMOTO CHEMICALS Ltd.), and the mixture was diluted with water to set the concentration of the solid content of the exemplified compound (D-10) and that of the solid content of the resin R9660 to 1% by mass and 3% by mass, respectively. In this way, an aqueous ink was produced.

The produced aqueous ink was coated onto a commercially available photographic mat paper sheet by use of a bar coater No. 3 to yield a coated sample B-21. The reflection spectrum of the coated sample B-21 is shown in FIG. 7.

Figure 7:
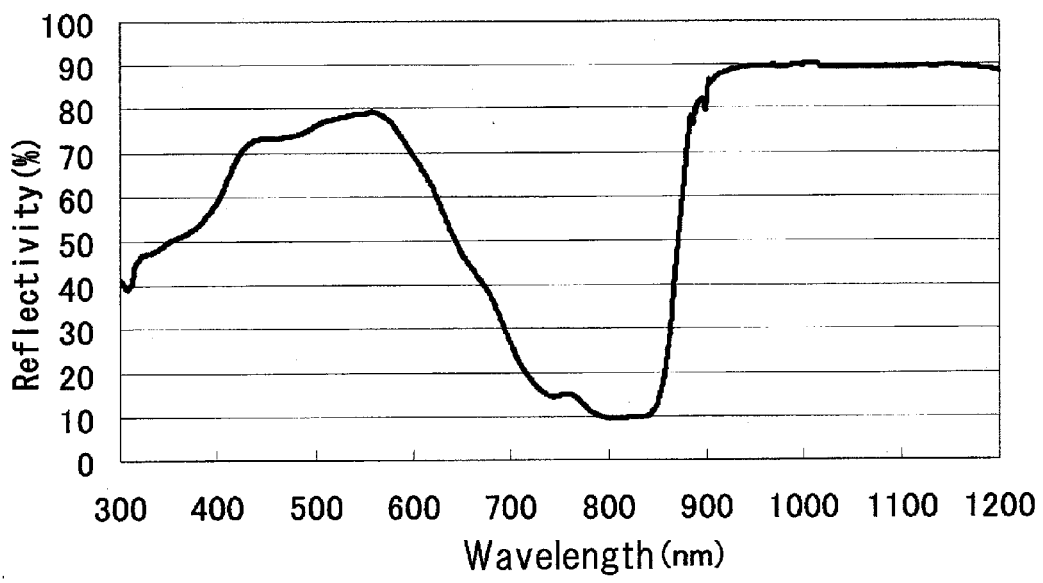
FIG. 7 is a graph showing the reflection spectrum of the coated sample B-1 described in the below.

As shown in FIG. 7, the average reflectivity of rays having wavelengths of 800 to 850 nm on the coated sample B-1 was as low as 10%, and that of rays having wavelengths of 450 nm to 650 nm in the visible range was as high as 71%. Thus, boundaries between the coated regions and the uncoated region were inconspicuous with the naked eye. When the sample B-1 was observed through a CCD camera having a visible ray cutting filter, the boundaries between the coated regions and the uncoated region were recognized vividly.

Comparative Example 1

A naphthalocyanine compound (R-1) used in JP-A-2002-138203 was used to produce an aqueous liquid dispersion A-6 in the similar manner as the aqueous liquid dispersion A-1 in Example 1. Thereto was added a polyester-based urethane resin R9660 (trade name, manufactured by KUSUMOTO CHEMICALS Ltd.), and the mixture was diluted with water to set the concentration of the solid content of the compound R-1 and that of the solid content of the resin R9660 to 1% by mass and 3% by mass, respectively. In this way, an aqueous ink was produced.

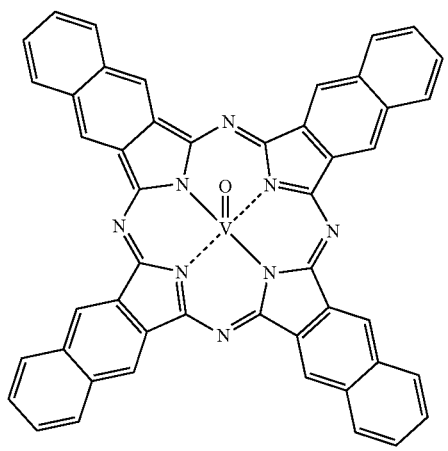

R-1

The produced aqueous ink was coated onto the commercially available photographic mat paper sheet by use of the bar coater No. 3 to yield a coated sample B-22. The average reflectivity of rays having wavelengths of 800 to 850 nm on the coated sample B-22 was 16%, and that of rays having wavelengths of 450 nm to 650 nm in the visible range was 58%. From these results, it was understood that the coated sample B-21 in the scope of the present invention was much better in invisibility than the comparative coated sample B-22.

Example 3

Production of Inkjet Printing Ink and Inkjet Printing Thereof on Paper

To 80 parts by mass of the aqueous liquid dispersion A-1 were added 5 parts by mass of glycerin, 10 parts by mass of triethylene glycol monobutyl ether, and 5 parts by mass of 2-pyrrolidone, so as to produce an aqueous inkjet recording ink wherein the concentration of the solid content of the exemplified compound (D-10) was 2.4% by mass.

The produced inkjet recording ink was filled into an empty ink cartridge, and an inkjet printer (trade name: PX-V630, manufactured by Seiko Epson Corp.) was used to make a print on a photographic mat paper sheet with the ink. In this way, an inkjet printed sample C-1 was yielded. The reflection spectrum of the sample C-1 is shown in FIG. 8.

Figure 8:
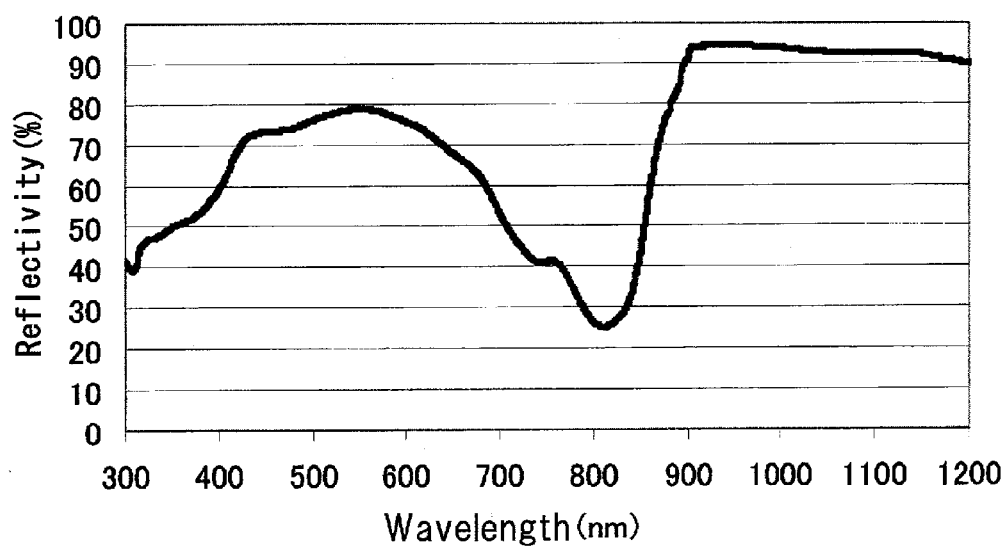
FIG. 8 is a graph showing the reflection spectrum of the inkjet printed sample C-1 described in the below.

As shown in FIG. 8, the inkjet printed sample C-1 had a low reflectivity of rays having wavelengths of 800 to 850 nm while the sample C-1 had a high reflectivity of visible rays in the visible range. Thus, boundaries between the coated regions and the uncoated region were entirely inconspicuous with the naked eye. When the sample C-1 was observed through the CCD camera having a visible ray cutting filter, the boundaries between the coated regions and the uncoated region were recognized vividly.

Comparative Example 2

An aqueous inkjet recording ink was produced in the same manner as Example 2 except that the aqueous liquid dispersion A-1 was replaced with that A-6. The ink was used to yield an inkjet printed sample C-2.

(Light Resistance Test)

The obtained coated sample B-21, the inkjet printed sample C-1, and the comparative samples B-22 and C-2 were irradiated with light having an illuminance of 220,000 1× from a xenon lamp for 48 hours. In the below Table 3 is shown a variation in the minimum reflectivity of each of the samples at wavelengths of 800 to 850 nm before and after the irradiation. The residual rate was calculated by use of the conversion of the reflectivities to absorbances. Specifically, the residual rate was calculated from the equation: the residual rate (%)= (the absorbance after the irradiation)/(the absorbance before the irradiation)×100.

TABLE 3

| Sample | Forming method | Minimum reflectivity Before irradiation | Minimum reflectivity After irradiation | Residual rate | Remarks |
|---|---|---|---|---|---|
| B-21 | Bar coating | 9.4% | 11.7% | 91% | This invention |
| B-22 | Bar coating | 14.2% | 20.1% | 82% | Comparative example |
| C-1 | Inkjet printing | 26.1% | 32.5% | 84% | This invention |
| C-2 | Inkjet printing | 30.2% | 42.0% | 72% | Comparative example |

Irradiation test under super xenon (220,000 1x) for 48 hours

As is apparent from Table 3, it was understood that the sample B-21 in the scope of the present invention was better in light resistance than the comparative sample B-22. The inkjet printed sample C-1 in the scope of the present invention was better in light resistance than the comparative sample C-2.

Examples 4 to 8 and Comparative Examples 3 to 5

Printing by Use of Waterless Lithographic Ink (Rosin-Modified Phenol Resin)

Into a four-necked flask equipped with a stirrer, a condenser (or cooler), and a thermometer were charged 720 parts of p-octylphenol, 375 parts of p-dodecylphenol, 290 parts of paraformaldehyde, 60 parts of 93%-purity sodium hydroxide, and 800 parts of xylene, and the reactive components therein were caused to react with each other at 80 to 90° C. for 5 hours. Thereafter, thereto was added an aqueous hydrochloric acid solution composed of 125 parts of 6-N hydrochloric acid and 200 parts of tap water, and the resultant was stirred and allowed to stand still. The upper layer was taken out to yield 2,000 parts of a solution of a resol-type phenol resin in xylene, the content by percentage of nonvolatile matters in the solution being 63%. This was used as a resol liquid. Subsequently, into a four-necked flask equipped with a stirrer, a condenser to which a water separator was attached, and a thermometer were charged 600 parts of gum rosin. While nitrogen gas was blown into the flask, the rosin was dissolved at 200° C. Thereto were added 770 parts of the resol liquid produced as described above. While toluene was removed therefrom, the reactive components were caused to react with each other at 220° C. for 4 hours, and then thereto were charged 67 parts of glycerin. The reactive components therein were then caused to react with each other at 250° C. for 12 hours to yield a rosin-modified phenol resin for waterless lithographic ink. The mass-average molecular weight thereof was 200,000, the white turbidity temperature of the rosin-modified phenol resin was 100° C. in a solvent AF SOLVENT No. 6 (trade name) manufactured by Nippon Petrochemicals Co., Ltd., and the resin viscosity of the rosin-modified phenol resin was 23.0 Pa·s.

(Varnish)

The following were heated and stirred at 190° C. for 1 hour: 42 parts of the rosin-modified phenol resin; 28 parts of soybean oil; 5 parts of an isobutyl ester of soybean aliphatic acid (manufactured by Toei Chemicals Co., Ltd.); 10 parts of DIAREN 168 (trade name, manufactured by Mitsubishi Chemical Corporation, a mixture of 1-hexadecene and 1-octadecene); 14 parts of AF SOLVENT No. 6 (trade name, manufactured by Nippon Petrochemicals Co., Ltd.); and 1.0 part of ALCH (trade name, manufactured by Kawaken Fine Chemicals Co., Ltd., a gelatinizer). In this way, a varnish for waterless lithographic ink was yielded.

(Medium Base Ink)

A three-roll mill was used to knead 33.5 parts of the varnish for waterless lithographic ink, 22 parts of calcium carbonate, and 8.2 parts of the solvent AF SOLVENT No. 6 at a temperature of 60° C. until the particle diameters were made into 7.5 μm or less according to a dispersed-particle diameter measuring device (grind meter). In this way, a medium base ink for waterless lithographic ink was yielded.

Example 4

Near-Infrared Absorptive Based Ink 1

A three-roll mill was used to knead 22 parts of the varnish for waterless lithographic ink, and 2 parts of the exemplified compound (D-10) at a temperature of 30° C. until the particle diameters were made into 7.5 μm or less according to the dispersed-particle diameter measuring device (grind meter). In this way, a near-infrared absorptive base ink 1 for waterless lithographic ink was yielded. According to the particle size measurement with the grind meter, coarse particles having a particle diameter of 7.5 μm or more were not recognized. The dispersibility of the exemplified compound (D-10) in the varnish was excellent.

At a temperature of 30° C. in a three-roll mill, the medium base ink, the near-infrared absorptive base ink 1, a metal drier, the AF SOLVENT, a compound (i.e. an additive for adjusting ink property comprised mainly of wax), and a polymerization inhibitor were mixed to adjust the proportions thereof as follows: 64%, 22.5%, 1%, 5%, 7% and 0.5%, respectively. In this way, a near-infrared absorptive ink NIR-1 for waterless lithography having a viscosity of 95.0 Pa·s was yielded.

Example 5

Near-Infrared Absorptive Base Ink 2

A near-infrared absorptive base ink 2 for waterless lithographic ink was yielded in the same manner as the near-infrared absorptive base ink 1 except that the exemplified compound (D-10) was replaced with the exemplified compound (D-28). The particle sizes were measured with the grind meter. As a result, coarse particles having a particle diameter of 7.5 μm or more were not recognized. The dispersibility of the exemplified compound (D-28) in the varnish was excellent.

The same manner as Example 4 was carried out except that the near-infrared absorptive base ink 1 was replaced with the near-infrared absorptive base ink 2. In this way, a near-infrared absorptive ink NIR-2 for waterless lithography was yielded. The near-infrared absorptive ink NIR-2 had a viscosity of 90.0 Pa·s.

Comparative Example 3

Near-Infrared Absorptive Base Ink 3

A near-infrared absorptive base ink 3 for waterless lithographic ink was yielded in the same manner as the near-infrared absorptive base ink 1 except that the exemplified compound (D-10) was replaced with an exemplified compound 1-2 described in JP-A-11-231126 described above. The particle sizes were measured with the grind meter. As a result, coarse particles having a particle diameter of 7.5 μm or more were not recognized. Thus, the dispersibility of the compound 1-2 in the varnish was excellent.

The same manner as Example 4 was carried out except that the near-infrared absorptive base ink 1 was replaced with the near-infrared absorptive base ink 3. In this way, a near-infrared absorptive ink NIR-3 for waterless lithography ink was yielded. The near-infrared absorptive ink NIR-3 had a viscosity of 88.0 Pa·s.

The inks yielded in Examples 4 and 5 and Comparative Example 3 were each used to make offset printing on a polyethylene terephthalate film (thickness: 200 μm). With respect to the resultant printed material, a measurement of the spectral reflection density was made and a light resistance test was made. In this way, the invisibility of the printed material and the light resistance of the printed material were evaluated.

<Condition for Measuring Spectral Reflection Density>

Measuring device: UV3100 (trade name, manufactured by Shimadzu Corp., ultraviolet, visible and near infrared spectrometer)

Wavelength range: 350 to 1,000 nm

Sampling pitch: 0.50 nm

Scanning speed: high velocity

Slit width: 20 nm

Detector: integrating sphere (trade name: ISR-3100, manufactured by Shimadzu Corp.)

With respect to each of the measured spectral reflection spectra, the ratio of the reflection density (Dir) at the maximum absorption wavelength in the near-infrared range to the reflection density (Dvis) at a wavelength of 550 nm (the value of Dir/Dvis) was defined as the invisibility degree thereof. Using this value, the invisibility of the near-infrared absorptive image was evaluated. As the invisibility degree is larger, the invisibility of the near-infrared absorptive image is better.

<Condition for Measuring Light Resistance>

A whether meter (trade name: ATLAS C. I65, manufactured by Atlas) was used to radiate xenon light (illumination:

85,000 1x) onto each of the printed materials for 3 days. The device UV-3100 was used to measure the image density before the irradiation of the xenon light and that after the radiation. The residual rate of the dye was calculated from the equation: the dye residual rate (%)=(the density at the maximum absorption wavelength in the near-infrared range after the irradiation)/(the density before the irradiation)×100. Using this rate, the light resistance was evaluated.

The results of the above-mentioned measurement and test are shown in Table 4.

TABLE 4

| | Waterless lithographic ink | | | |
|---|---|---|---|---|
| | Spectral reflection density | | Invisibility | Light |
| | Dir | Dvis | Dir/Dvis | resistance | Remarks |
| NIR-1 | 1.18 | 0.05 | 24 | 95% | Example 4 |
| NIR-2 | 0.83 | 0.02 | 42 | 91% | Example 5 |
| NIR-3 | 0.95 | 0.10 | 10 | 62% | Comparative example 3 |

As shown in Table 4, the printed materials each using the lithographic ink in the scope of the present invention were each larger in invisibility degree than the comparative example, and had an excellent near-infrared absorptive image. It was also understood that the printed materials each using the lithographic ink in the scope of the present invention were each much better in light resistance than the comparative example.

[Printing by Use of Gravure Ink]

<Preparation of Polyamide Varnish>

Forty parts of a polyamaide (trade name: RHEOMIDE S2310, manufactured by Kao Corporation) were mixed and dissolved into 3.0 parts of toluol, 20 parts of isopropyl alcohol, and 10 parts of ethyl acetate to yield a polyamaide varnish for a test (PA varnish).

<Preparation of a Nitrocellulose Varnish>

Thirty parts of a nitrocellulose (¼, manufactured by TAIHEI CHEMICALS LIMITED) were mixed and dissolved into 30 parts of ethyl acetate, and 40 parts of isopropyl alcohol to yield a nitrocellulose varnish for a test (NC varnish).

Example 6

A sand grinder mill was used to knead a mixture of 3 parts of the exemplified compound (D-10), 1 part of a Solsperse 55000 (trade name, manufactured by Zeneka), 50 parts of the PA varnish, 10 part of the NC varnish, 15 parts of toluol, 8 parts of ethyl acetate, and 3 parts of isopropyl alcohol. In this way, a near-infrared absorptive gravure ink NIR-4 was yielded.

Comparative Example 4

A near-infrared absorptive gravure ink NIR-5 was yielded in the same manner as Example 6 except that instead of the exemplified compound (D-10), an exemplified compound 1-2 described in JP-A-2002-146254, which is illustrated below, is used.

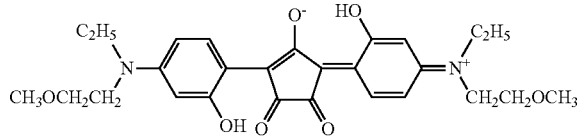

Figure 10:
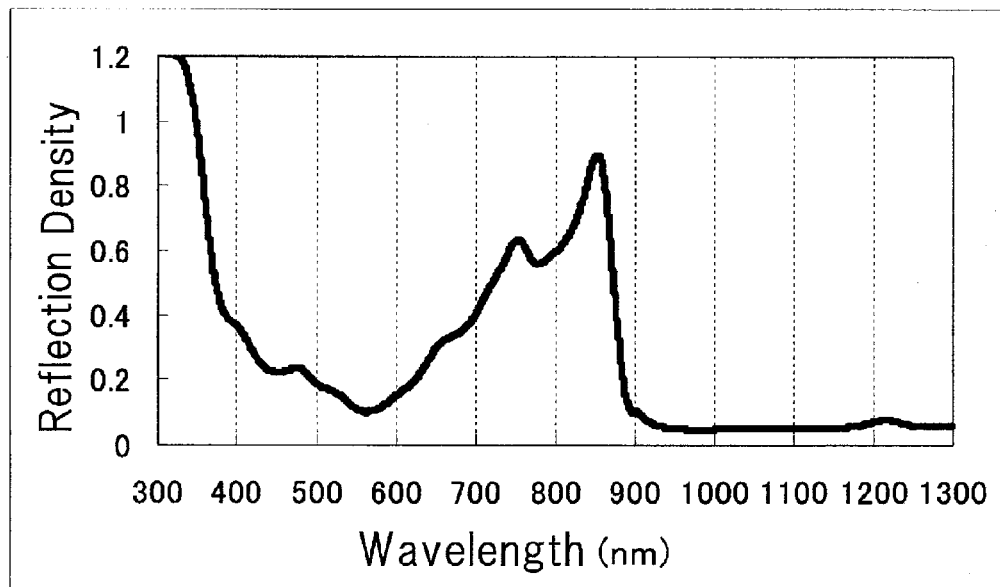
FIG. 10 is a graph showing the reflection spectrum of a gravure printed material using Exemplified compound D-10.

A print was formed with each of the near-infrared absorptive gravure inks of Example 6 and Comparative Example 4 on the front surface side of a support described in paragraphs [0200] to [0203] of JP-A-2008-246989. The print was formed by using a small-sized proofreading device with a gravure plate having an imaging line depth of 35 μm at a printing speed of 50 m/minute and a drying temperature of 60° C. With respect to the obtained printed material, a measurement of the spectral reflection density was made and a light resistance test was made. In this way, the invisibility of the printed material and the light resistance of the printed material were evaluated. A method for each of the evaluations was the same as that used for evaluating the printed materials obtained by use of the lithographic inks. The results are shown in Table 5. The reflection spectrum of the image printed by use of the near-infrared absorptive gravure ink NIR-4 is shown in FIG. 10.

TABLE 5

| | Gravure ink | | | | |
|---|---|---|---|---|---|
| | Spectral reflection density | | Invisibility | Light | |
| | Dir | Dvis | Dir/Dvis | resistance | Remarks |
| NIR-4 | 0.91 | 0.12 | 8 | 89% | Example 6 |
| NIR-5 | 0.82 | 0.20 | 4 | 52% | Comparative Example 4 |

As shown in Table 5, the printed material wherein the gravure ink in the scope of the present invention was used was larger in invisibility than the comparative example, and had an excellent near-infrared absorptive image. It was also understood that the printed material wherein the gravure ink in the scope of the present invention was used was much better in light resistance than the comparative example.

[Printing by Use of Electrophotographic Toner]

Example 7

Preparation of Toner NIR-6

In an Eiger motor mill, a mixture of 1.0 g of Neogen SC (trade name, manufactured by Dai-ichi Kogyo Seiyaku Co., Ltd.), 5.0 g of the exemplified compound (D-10) and 50.0 g of ion exchange water was dispersed for 3 hours. The solid content was collected by filtration, and dried to yield a powdery composition A in the scope of the present invention containing the exemplified compound (D-10). Next, an Eiger motor mill was used to mix 37.5 g of styrene, 8.7 g of butyl acrylate, 1.1 g of acrylic acid, 0.5 g of dodecanetiol, 0.2 g of 1,10-diacryloyloxide decane, and 1.5 g of the powdery composition A, and disperse the solid components for 3 hours to obtain a liquid dispersion. To an aqueous solution obtained by dissolving 0.4 g of DEMOL SNB (trade name, manufactured by Kao Corporation) into 55 g of ion exchange water was slowly added 40 g of the liquid dispersion, and the solid components therein were dispersed and emulsified in the flask. While the dispersion or emulsion was slowly stirred for 10 minutes to mix the individual components with each other, 5 g of ion exchange water into which 0.6 g of ammonium persulfate was dissolved was charged into the flask. Next, the gas in the flask was replaced with nitrogen. While the dispersion or emulsion was stirred, the flask was heated until the internal temperature replaced to 70° C. The system was kept as it was for 5 hours to continue the emulsion polymerization to yield an anionic fine-particle-resin liquid dispersion. This liquid dispersion was cooled and filtrated, and then the collected solid was washed with ion exchange water. The obtained solid was again dispersed into ion exchange water, and then the dispersion was filtrated. The collected solid was dried under reduced pressure, and pulverized to yield a near-infrared absorptive toner sample NIR-6.

Example 8

Preparation of Toner NIR-7

A near-infrared absorptive toner sample NIR-7 was yielded in the same manner as Example 7 except that the exemplified compound (D-10) was replaced with that (D-28).

Comparative Example 5

A near-infrared absorptive toner sample NIR-8 was yielded in the same manner as Example 7 except that instead of the exemplified compound (D-10), the above exemplified compound 1-2 described in JP-A-2002-146254, was used.

With using the obtained toner samples NIR-6, NIR-7 and NIR-8, printing was conducted, with using a plain paper sheet as a recording medium, with an image-forming machine capable of attaining thermal fixation, to form printed materials. The image-forming device employed was an image-forming device (trade name: Docucentre 402FS, manufactured by Fuji Xerox Co., Ltd.) equipped with a heating roller as a thermally fixing device. The invisibility and the light resistance of the printed material were measured and evaluated in the same manner as the printed materials wherein the lithographic inks and the gravure inks were used. Evaluation was made with the region where the adhesion amount of the toner was in the range of "0.7±0.05" mg/cm². The results are shown in Table 6.

TABLE 6

| | Toner | | | | |
|---|---|---|---|---|---|
| | Spectral reflection density | | Invisibility | Light | |
| | Dir | Dvis | Dir/Dvis | resistance | Remarks |
| NIR-6 | 0.72 | 0.06 | 12 | 88% | Example 7 |
| NIR-7 | 0.69 | 0.01 | 69 | 97% | Example 8 |
| NIR-8 | 0.78 | 0.15 | 5 | 59% | Comparative Example 5 |

As is apparent from Table 6, the toners in the scope of the present invention were better in invisibility and light resistance than the comparative example.

From the above-mentioned results, it is understood that the near-infrared absorptive composition of the present invention, and a near-infrared absorptive film obtained therefrom have excellent characteristics that they have not only a good near-infrared absorptivity and invisibility but also a high light resistance and humidity-and-heat resistance, and they are applicable as optical filters or information recording materials.

From the above-mentioned results, it is also understood that the near-infrared absorptive liquid dispersion of the present invention has excellent characteristics that the liquid has a good near-infrared absorptivity and invisibility and further has a high storage stability and a printed material obtained by use of an ink using the liquid dispersion has a high light resistance. The near-infrared absorptive liquid dispersion of the present invention makes it possible to prepare a good near-infrared absorptive aqueous ink or inkjet recording ink that can give such a printed material.

Having described our invention as related to the present embodiments, it is our intention that the invention not be limited by any of the details of the description, unless otherwise specified, but rather be construed broadly within its spirit and scope as set out in the accompanying claims.

This non-provisional application claims priority under 35 U.S.C. §119(a) on Patent Application No. 2008-263220 filed in Japan on Oct. 9, 2008, Patent Application No. 2009-042756 filed in Japan on Feb. 25, 2009, Patent Application No. 2009-087585 filed in Japan on Mar. 31, 2009, each of which is entirely herein incorporated by reference.

The invention claimed is:

1. A near-infrared absorptive liquid dispersion, which contains a near-infrared absorptive compound represented by formula (1) that is dispersed in a form of fine particles in a dispersing medium:

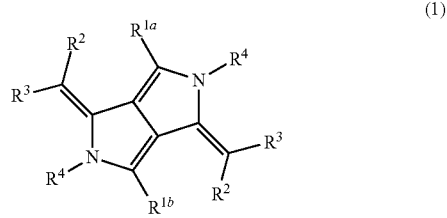

wherein $R^{1a}$ and $R^{1b}$ may be the same or different, and each independently represent an aryl group or a heteroaryl group, each of which has an alkoxy group in which an alkyl moiety of the alkoxy group is a branched alkyl group; $R^2$ represents a cyano group and $R^3$ represents a benzothiazolyl group or a naphthothiazolyl group; and $R^4$ represents a hydrogen atom, an alkyl group, an aryl group, a heteroaryl group, a substituted boron, or a metal atom, and $R^4$ may be covalently bonded or coordinately bonded to at least one among $R^{1a}$, $R^{1b}$ and $R^3$.

2. The near-infrared absorptive liquid dispersion according to claim 1, wherein $R^4$ in formula (1) is a substituted boron.

3. The near-infrared absorptive liquid dispersion according to claim 1, wherein the dispersing medium is an aqueous solvent.

4. The near-infrared absorptive liquid dispersion according to claim 1, wherein an average particle diameter of the fine-particles is 0.5 μm or less.

5. The near-infrared absorptive liquid dispersion according to claim 1, which has a maximum absorption wavelength for rays in a range of 700 nm to 1000 nm.

6. The near-infrared absorptive liquid dispersion according to claim 1, wherein the absorbance at 550 nm is ⅕ or less of the absorbance at the maximum wavelength.

7. An aqueous ink, which contains the near-infrared absorptive liquid dispersion according to claim 1.

8. A printed material, which has a near-infrared absorptive image printed with the aqueous ink according to claim 7.

9. An aqueous ink for inkjet recording, which contains the near-infrared absorptive liquid dispersion according to claim 1.

10. A printed material, which has a near-infrared absorptive image printed with the aqueous ink for inkjet recording according to claim 8.

11. A near-infrared absorptive composition, at least containing a near-infrared absorptive compound represented by formula (1) and a hydrophobic polymer:

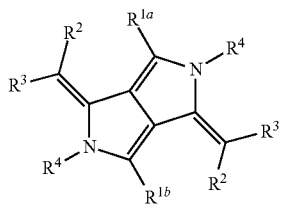

(1)

wherein $R^{1a}$ and $R^{1b}$ may be the same or different, and each independently represent an aryl group or a heteroaryl group, each of which has an alkoxy group in which an alkyl moiety of the alkoxy group is a branched alkyl group; $R^2$ represents a cyano group, and $R^3$ represents a benzothiazolyl group or a naphthothiazolyl group; and $R^4$ represents a hydrogen atom, an alkyl group, an aryl group, a heteroaryl group, a substituted boron, or a metal atom, and $R^4$ may be covalently bonded or coordinately bonded to at least one among $R^{1a}$, $R^{1b}$ and $R^3$.

12. The near-infrared absorptive composition according to claim 11, wherein the near-infrared absorptive compound is present in a state of aqueous fine-particle dispersion.

13. The near-infrared absorptive composition according to claim 11, wherein the hydrophobic polymer is an organic resin forming an aqueous fine-particle dispersion.

14. The near-infrared absorptive composition according to claim 11, wherein the hydrophobic polymer comprises an acrylic resin or a urethane resin.

15. A near-infrared absorptive coated material, having a substrate, and a near-infrared absorptive layer formed on the substrate with the near-infrared absorptive composition according to claim 11.

16. The near-infrared absorptive coated material according to claim 15, wherein in the course of forming the near-infrared absorptive layer, drying by heating is performed.

17. The near-infrared absorptive coated material according to claim 15, wherein the absorptivity of visible rays is 30% or less.

18. A near-infrared absorptive compound represented by formula (1):

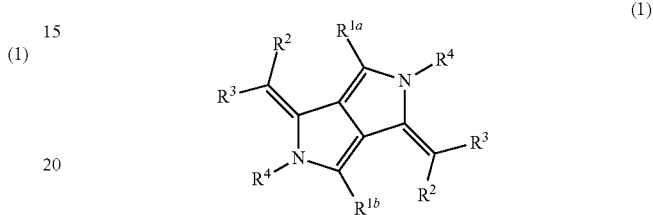

(1)

wherein $R^{1a}$ and $R^{1b}$ may be the same or different, and each independently represent an aryl group or a heteroaryl group, each of which has an alkoxy group in which an alkyl moiety of the alkoxy group is a branched alkyl group; $R^2$ represents a cyano group and $R^3$ represents a benzothiazolyl group or a naphthothiazolyl group; and $R^4$ represents a hydrogen atom, an alkyl group, an aryl group, a heteroaryl group, a substituted boron, or a metal atom, and $R^4$ may be covalently bonded or coordinately bonded to at least one among $R^{1a}$, $R^{1b}$ and $R^3$.

19. The near-infrared absorptive compound according to claim 18, wherein $R^{1a}$ and $R^{1b}$ each independently represent an aryl group or heteroaryl group, each of which has an alkoxy group in which an alkyl moiety of the alkoxy group is a branched alkyl group, at a position other than the an ortho position.

20. The near-infrared absorptive compound according to claim 18, wherein $R^{1a}$ and $R^{1b}$ each independently represent a phenyl group having an alkoxy group in which an alkyl moiety of the alkoxy group is a branched alkyl group.

21. The near-infrared absorptive compound according to claim 18, wherein the compound represented by formula (1) is a compound selected from the group consisting of:

D-10

D-15
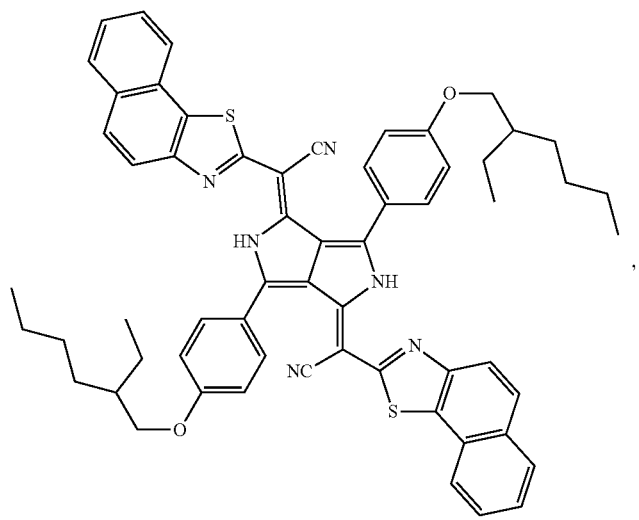
D-17
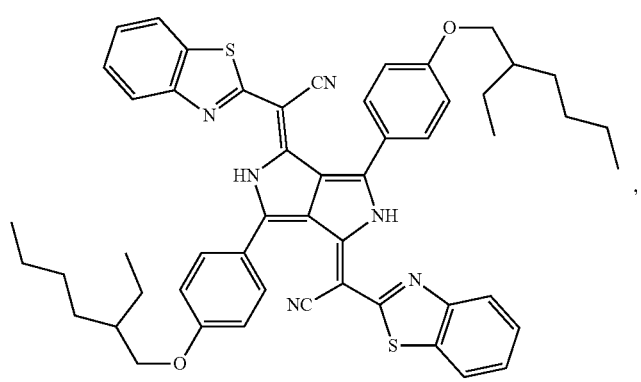
D-21
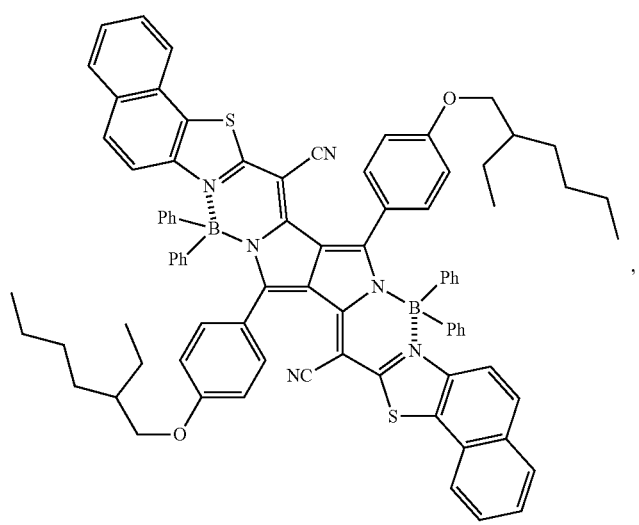

-continued
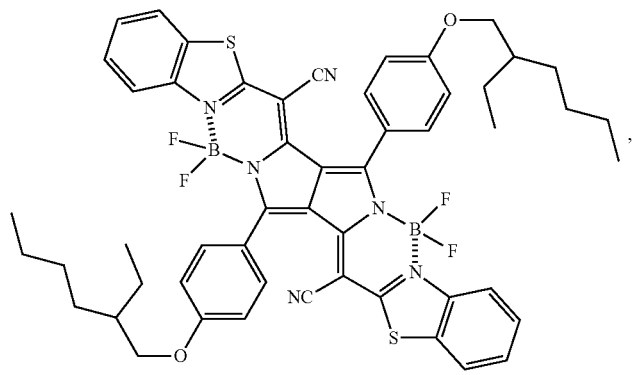
D-33
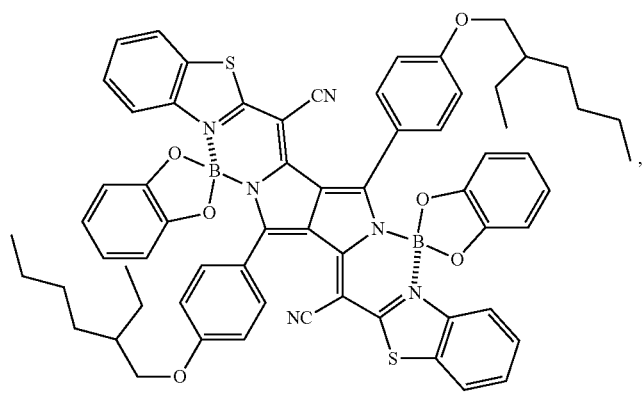
D-131
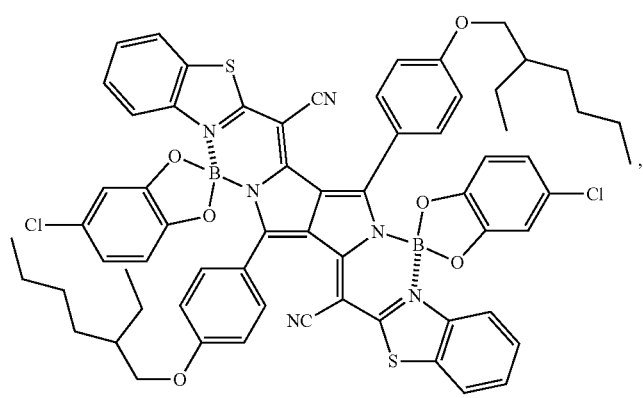
D-134

-continued
D-135
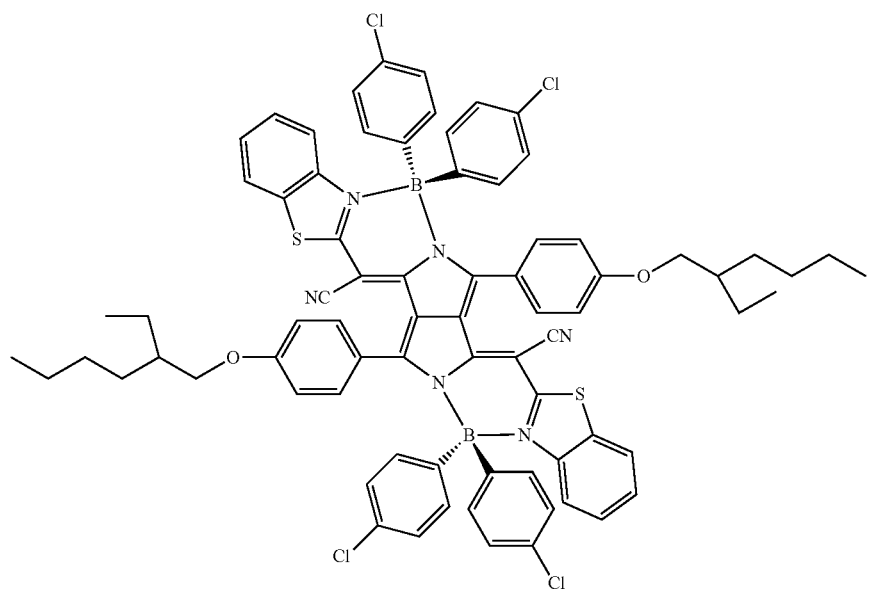
D-136
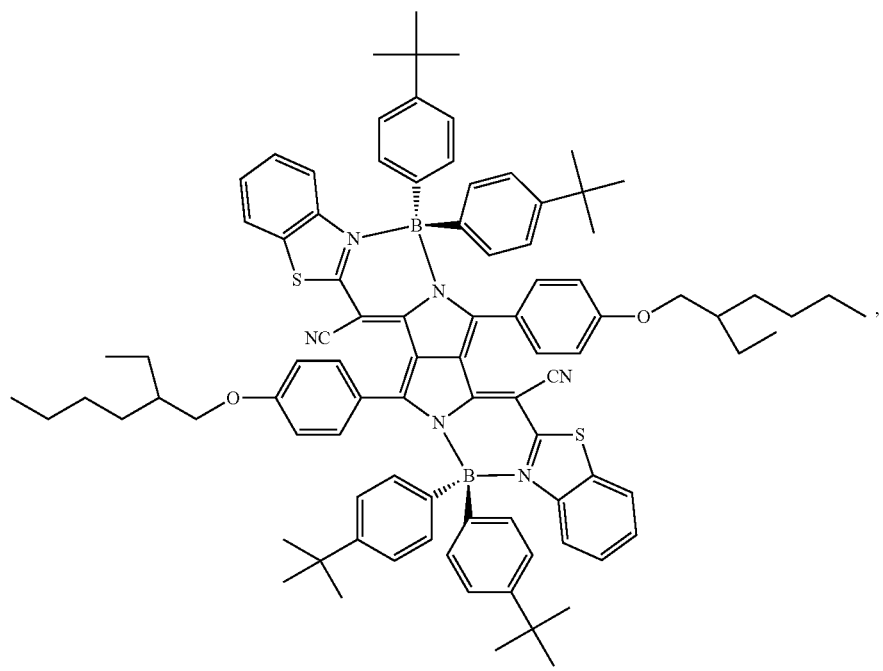
D-137
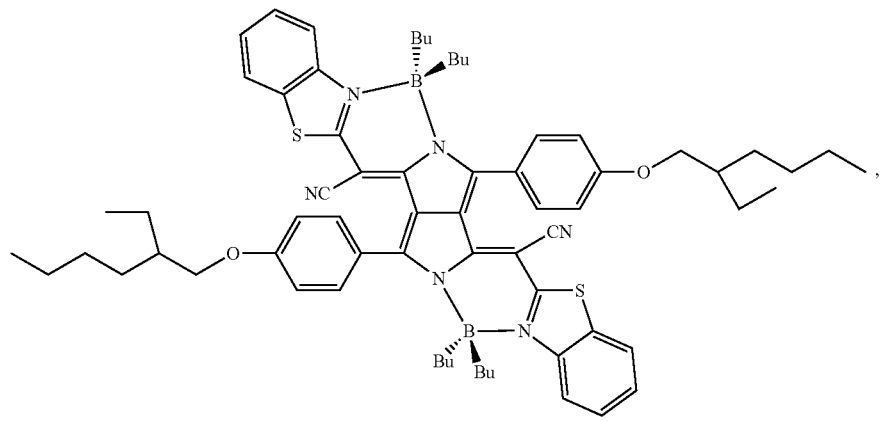

D-138
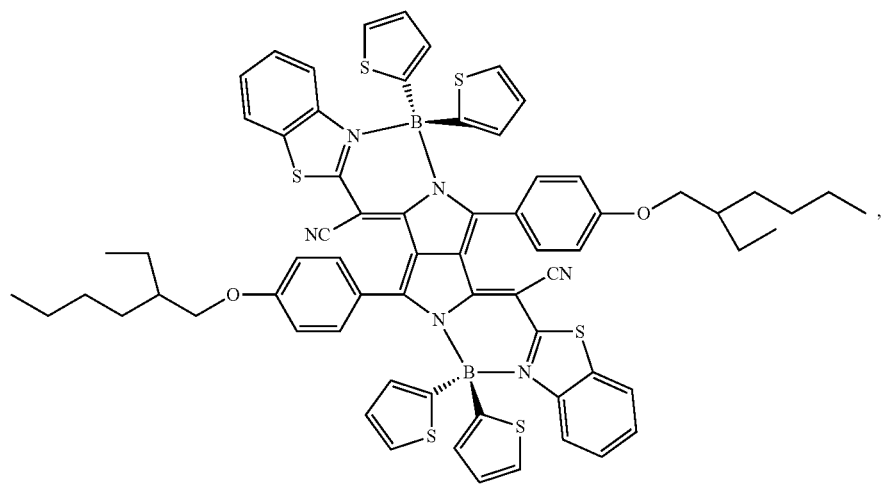
D-139
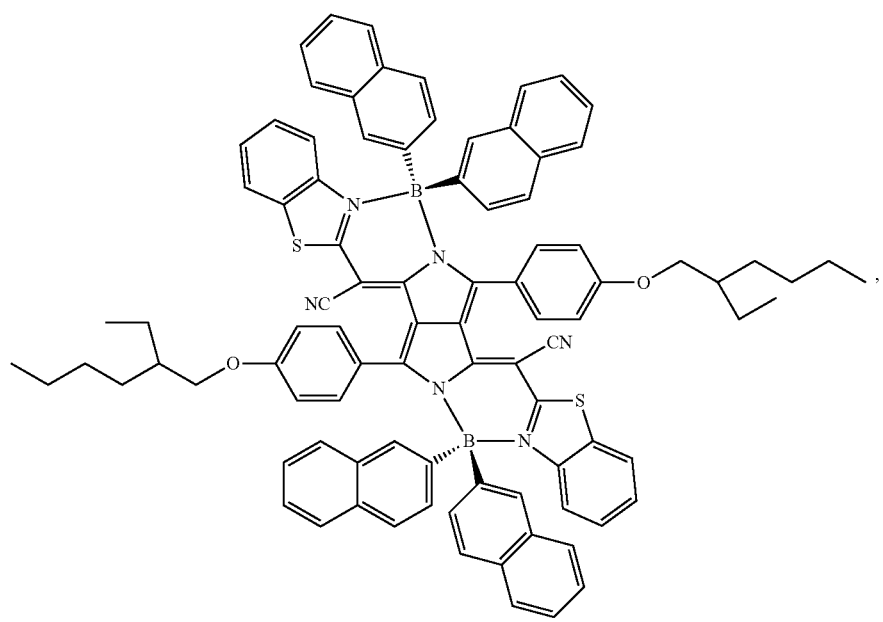
D-141A, D-142
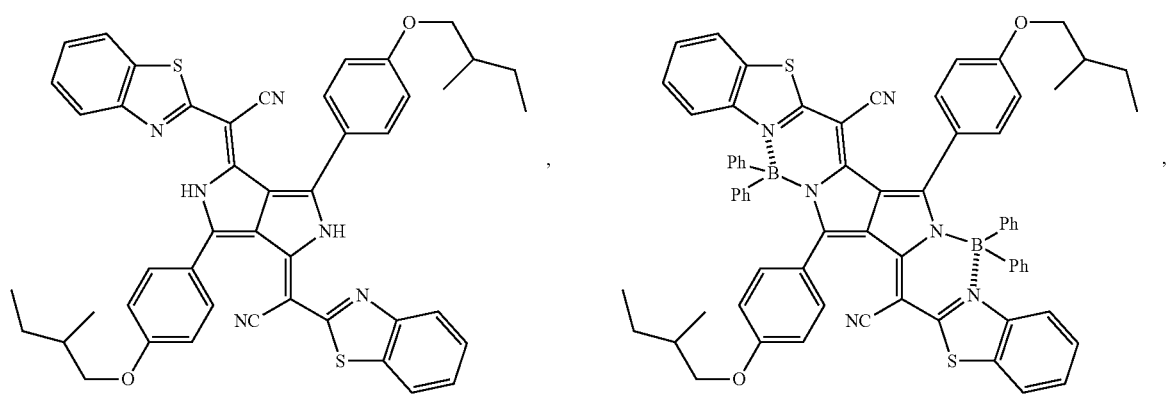

-continued
D-143
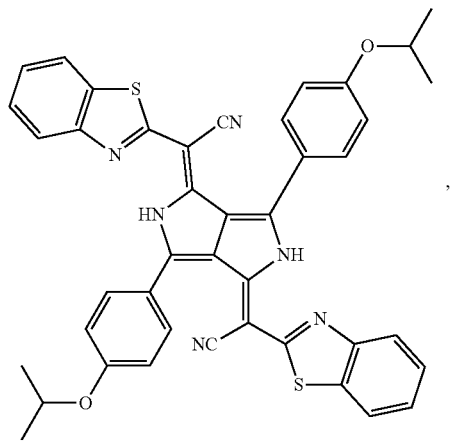
D-145
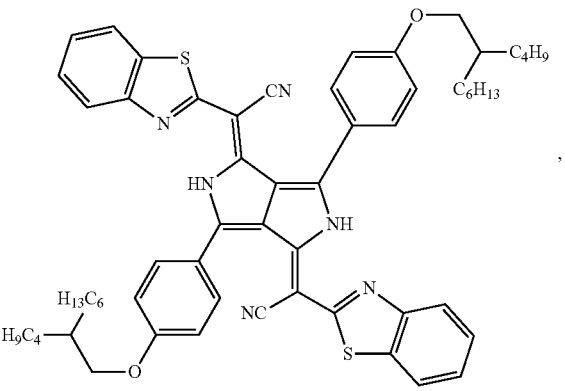
D-146
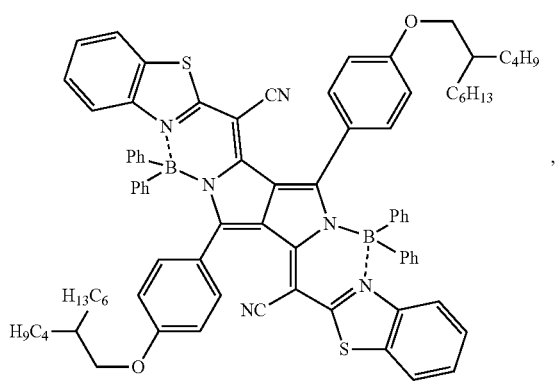
D-147
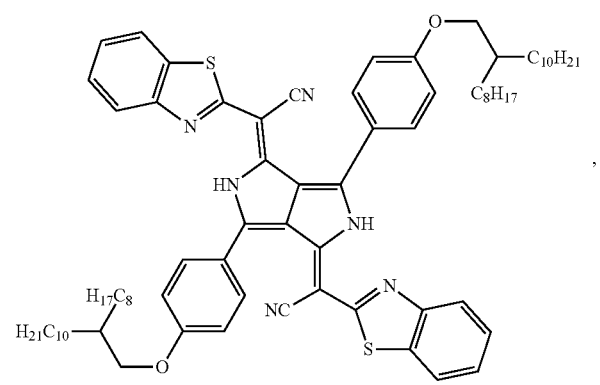
D-148
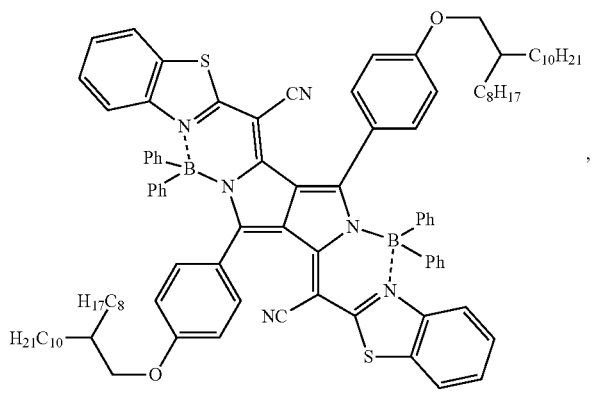
D-149
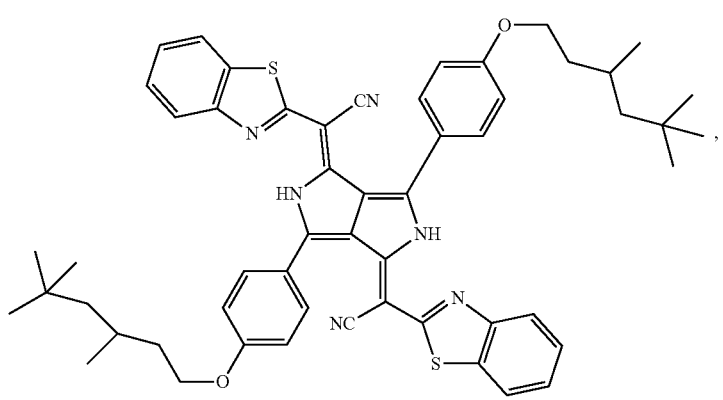

-continued
D-151
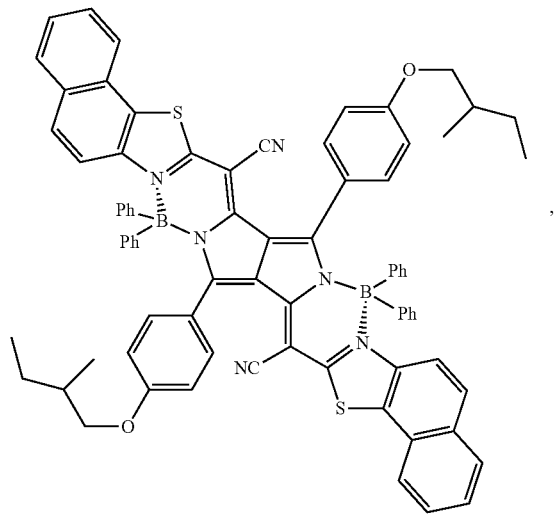
D-152
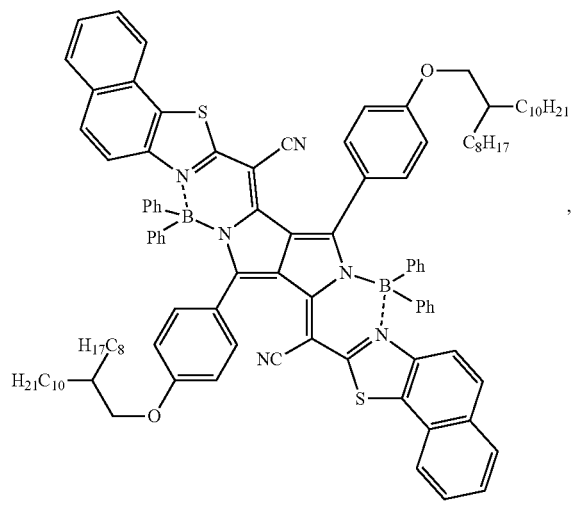
D-154
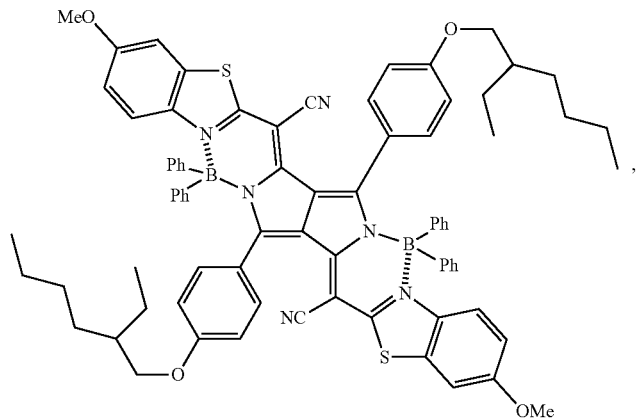

-continued

D-155

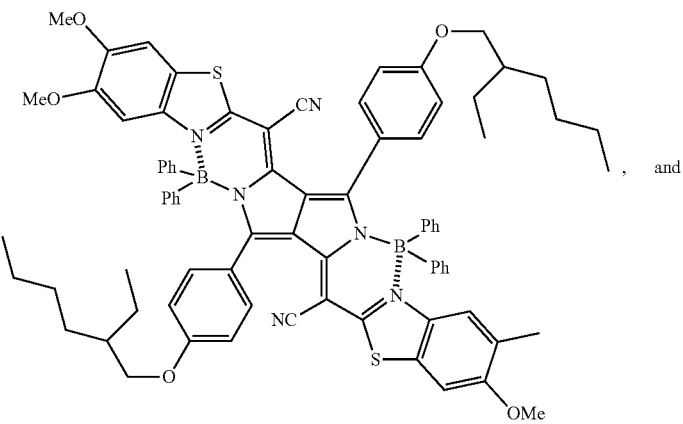

, and

D-156

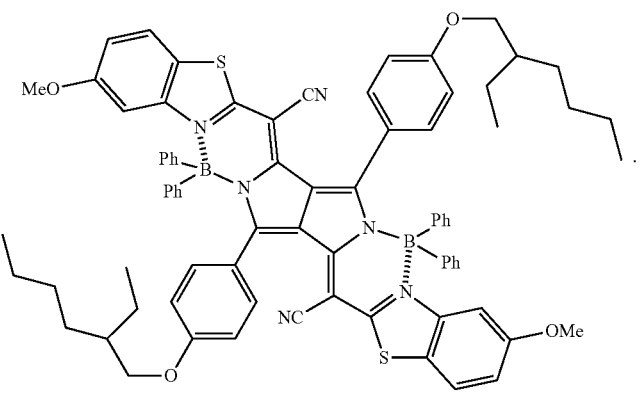

.

22. A near-infrared absorptive compound represented by formula (2):

Formula (2)

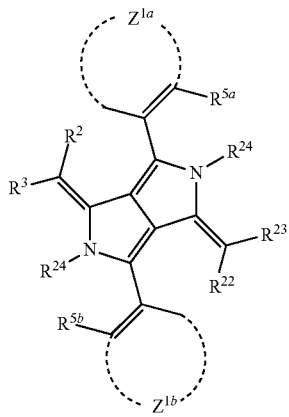

wherein, $Z^{1a}$ and $Z^{1b}$ each independently represent an atomic group that forms an aryl ring or a heteroaryl ring; $R^{5a}$ and $R^{5b}$ each independently represent an alkoxy group having 1 to 20 carbon atoms in which an alkyl moiety of the alkoxy group is a branched alkyl group; $R^{22}$ represents a cyano group and $R^{23}$ represents a benzothiazolyl group or a naphthothiazolyl group; $R^{24}$ represents a hydrogen atom, an alkyl group having 1 to 20 carbon atoms, an aryl group having 6 to 20 carbon atoms, a heteroaryl group having 4 to 20 carbon atoms, a metal atom, or a substituted boron having at least one substituent selected from the group consisting of a halogen atom, an alkyl group having 1 to 10 carbon atoms, an aryl group having 6 to 20 carbon atoms, and a heteroaryl group having 4 to 20 carbon atoms, wherein $R^{24}$ may be covalently bonded or coordinately bonded to $R^{23}$.

23. The near-infrared absorptive compound according to claim 22, wherein $Z^{1a}$ and $Z^{1b}$ each independently represent a benzene ring.

24. A near-infrared absorptive compound represented by formula (3):

Formula (3)

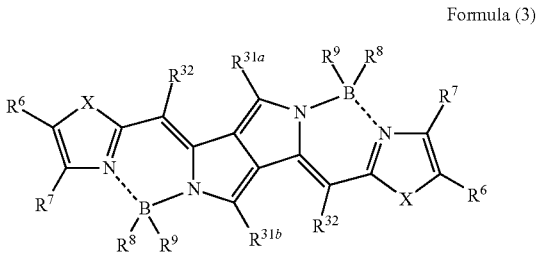

wherein $R^{31a}$ and $R^{31b}$ each independently represent an aryl group or a heteroaryl group, each of which has an alkoxy group in which an alkyl moiety of the alkoxy group is a branched alkyl group; $R^{32}$ represents a cyano group; $R^6$ is bonded to $R^7$ to form a ring, and the formed ring is a benzene or naphthalene ring; $R^8$ and $R^9$ each independently represent an alkyl group having 1 to 10 carbon atoms, an alkoxy group having 1 to 10 carbon atoms, an aryl group having 6 to 20 carbon atoms, or a heteroaryl group having 3 to 10 carbon atoms; X represents a sulfur atom.

25. The near-infrared absorptive compound according to claim 24, wherein $R^{31a}$ and $R^{31b}$ each independently represent an aryl group having 6 to 20 carbon atoms or a heteroaryl group having 3 to 20 carbon atoms, each of which has an alkoxy group in which an alkyl moiety of the alkoxy group is a branched alkyl group, at the position other than the ortho position.

26. The infrared absorptive compound according to claim 24, wherein $R^{31a}$ and $R^{31b}$ each independently represent a phenyl group having an alkoxy group in which an alkyl moiety of the alkoxy group is a branched alkyl group.

27. A near-infrared absorptive compound represented by formula (4):

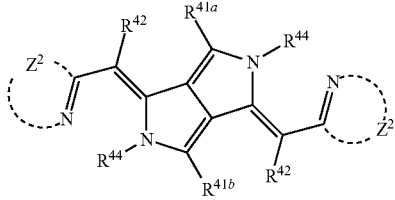

Formula (4)

wherein $R^{41a}$ and $R^{41b}$ represent groups different from each other and each represent an aryl group having 6 to 20 carbon atoms or a heteroaryl group having 3 to 20 carbon atoms, each of which has an alkoxy group in which an alkyl moiety of the alkoxy group is a branched alkyl group; $R^{42}$ represent a cyano group; $Z^2$ represents an atomic group which is combined with —C=N— to form a benzo-condensed thiazole ring or a naphtho-condensed thiazole ring; $R^{44}$ represents a hydrogen atom, an alkyl group having 1 to 20 carbon atoms, an aryl group having 6 to 20 carbon atoms, a heteroaryl group having 4 to 20 carbon atoms, a metal atom, or a substituted boron having at least one substituent selected from a halogen atom, an alkyl group having 1 to 10 carbon atoms, an aryl group having 6 to 20 carbon atoms, and a heteroaryl group having 4 to 20 carbon atoms, and $R^{44}$ may be covalently bonded or coordinately bonded to the benzo-condensed thiazole ring or the naphtho-condensed thiazole ring which $Z^2$ forms.

28. The infrared absorptive compound according to claim 27, wherein $R^{41a}$ and $R^{41b}$ each independently represent a phenyl group having an alkoxy group in which an alkyl moiety of the alkoxy group is a branched alkyl group.

* * * * *